(12) United States Patent
Bruce

(10) Patent No.: US 11,382,444 B2
(45) Date of Patent: Jul. 12, 2022

(54) ADJUSTABLE MOUNTING BRACKET APPARATUS AND METHOD

(71) Applicant: Branded Seats USA, LLC, San Diego, CA (US)

(72) Inventor: Shad E. Bruce, San Diego, CA (US)

(*) Notice: Subject to any disclaimer, the term of this patent is extended or adjusted under 35 U.S.C. 154(b) by 0 days.

(21) Appl. No.: 16/843,543

(22) Filed: Apr. 8, 2020

(65) Prior Publication Data
US 2020/0315383 A1    Oct. 8, 2020

Related U.S. Application Data

(60) Provisional application No. 62/830,992, filed on Apr. 8, 2019.

(51) Int. Cl.
| A47G 23/02 | (2006.01) |
| A47G 19/08 | (2006.01) |
| F16M 13/02 | (2006.01) |

(52) U.S. Cl.
CPC ......... *A47G 23/0225* (2013.01); *A47G 19/08* (2013.01); *F16M 13/022* (2013.01)

(58) Field of Classification Search
CPC combination set(s) only.
See application file for complete search history.

(56) References Cited

U.S. PATENT DOCUMENTS

| 1,262,788 A * | 4/1918 | Heidenreich | B43K 29/007 |
| | | | 40/334 |
| 4,697,780 A * | 10/1987 | Wenkman | B60N 3/103 |
| | | | 248/558 |
| 4,872,022 A | 10/1989 | Schock | |
| D307,852 S | 5/1990 | Clark | |
| 4,951,596 A * | 8/1990 | Wallace, Jr. | G09F 3/16 |
| | | | 116/308 |
| 5,052,649 A | 10/1991 | Hunnicutt | |
| 5,153,042 A | 10/1992 | Indrelie | |
| 5,169,108 A * | 12/1992 | Carlson | A47B 13/16 |
| | | | 248/230.1 |
| D353,289 S | 12/1994 | Ayotte et al. | |
| 5,421,638 A * | 6/1995 | Ayotte | A47C 7/624 |
| | | | 297/188.04 |
| 5,435,511 A * | 7/1995 | Hsu | A01K 63/006 |
| | | | 248/206.3 |
| D365,250 S | 12/1995 | Bergin et al. | |
| D367,997 S | 3/1996 | Ayotte et al. | |
| D368,628 S | 4/1996 | Bergin | |

(Continued)

FOREIGN PATENT DOCUMENTS

| JP | 2006230818 A | 9/2006 |
| KR | 200258661 Y1 | 12/2001 |

OTHER PUBLICATIONS

Examiner Interview Summary for U.S. Appl. No. 11/854,328, U.S. Patent and Trademark Office, dated Sep. 23, 2009, 2 pages.

(Continued)

*Primary Examiner* — Monica E Millner
(74) *Attorney, Agent, or Firm* — Peter B. Scull; EIP US LLP

(57) ABSTRACT

An adjustable mounting bracket comprising a body portion adapted to be one or both of connected to or disposed on a support structure and an interchangeable and/or replaceable attachment, adapted to be one or both of connected to or disposed on the body portion.

20 Claims, 42 Drawing Sheets

(56) References Cited

U.S. PATENT DOCUMENTS

| | | | |
|---|---|---|---|
| D377,439 S | 1/1997 | Ayotte et al. | |
| 5,628,103 A | 5/1997 | Ayotte et al. | |
| D380,125 S | 6/1997 | Ayotte et al. | |
| D380,652 S | 7/1997 | Ayotte et al. | |
| D383,362 S | 9/1997 | Ayotte et al. | |
| 5,709,429 A * | 1/1998 | Bergin | A47C 7/68 297/188.04 |
| 5,745,565 A * | 4/1998 | Wakefield | B60R 11/0241 379/446 |
| D398,127 S | 9/1998 | Bergin et al. | |
| 5,813,644 A * | 9/1998 | Bergin | A47C 7/622 248/311.2 |
| D400,678 S | 11/1998 | Clark et al. | |
| 5,897,041 A | 4/1999 | Ney et al. | |
| 5,938,091 A | 8/1999 | Bergin et al. | |
| D423,836 S | 5/2000 | Bergin | |
| D425,012 S | 5/2000 | Bergin | |
| 6,186,382 B1 | 2/2001 | Bergin et al. | |
| 6,237,262 B1 | 5/2001 | Alvern | |
| 6,283,551 B1 | 9/2001 | Bergin | |
| D456,691 S | 5/2002 | Bergin | |
| 6,457,772 B1 * | 10/2002 | Forston | A47C 7/62 297/188.04 |
| 6,478,371 B1 * | 11/2002 | Clarke | A47C 7/62 297/188.11 |
| 6,641,101 B2 * | 11/2003 | Bergin | A47C 7/62 248/223.41 |
| 6,739,652 B2 * | 5/2004 | Welsh | A47C 1/0265 297/129 |
| D505,032 S | 5/2005 | Bergin | |
| 6,976,735 B1 * | 12/2005 | Bergin | A47C 7/68 211/88.01 |
| 7,090,085 B1 | 8/2006 | Vicendese et al. | |
| RE39,392 E | 11/2006 | Bergin | |
| 7,149,078 B2 | 12/2006 | Schedivy | |
| 7,275,729 B2 * | 10/2007 | Sherman | A47G 25/08 224/148.7 |
| 7,383,650 B2 * | 6/2008 | Duesler | G09F 23/00 40/310 |
| 7,445,185 B1 * | 11/2008 | Cicero | A47K 3/281 211/16 |
| 7,614,703 B2 | 11/2009 | Bergin | |
| 7,665,804 B1 | 2/2010 | Jeffrey | |
| 7,681,346 B2 * | 3/2010 | Bruce | G09F 27/00 40/324 |
| 7,766,293 B2 | 8/2010 | Seidi et al. | |
| 7,815,123 B2 | 10/2010 | Conner et al. | |
| 7,959,121 B1 | 6/2011 | Barnes, Jr. | |
| 8,231,094 B1 | 7/2012 | Bames, Jr. | |
| 8,441,779 B2 | 5/2013 | Floros | |
| 8,636,319 B1 | 1/2014 | Parker, Jr. | |
| 8,657,245 B2 | 2/2014 | Stangl et al. | |
| 8,714,505 B1 | 5/2014 | Stangl et al. | |
| 8,757,573 B1 | 6/2014 | Bames, Jr. | |
| 8,833,596 B2 * | 9/2014 | Sanguinet | B65D 25/22 220/647 |
| 8,955,242 B2 * | 2/2015 | Bruce | G09F 1/10 40/324 |
| 8,973,882 B2 | 3/2015 | Stangl et al. | |
| 9,032,651 B2 * | 5/2015 | Bruce | G09F 3/10 40/324 |
| 9,061,797 B2 * | 6/2015 | Goldburt | B65D 23/14 |
| 9,089,221 B2 | 7/2015 | Stangl et al. | |
| 9,161,644 B2 | 10/2015 | Williams | |
| 9,192,241 B1 | 11/2015 | Seidl | |
| 9,254,043 B1 | 2/2016 | Seidl | |
| 9,428,207 B2 * | 8/2016 | Hartenstine | B62B 7/10 |
| 9,532,654 B1 | 1/2017 | Adams, IV et al. | |
| 9,585,486 B2 | 3/2017 | Seidl | |
| 9,642,485 B2 | 5/2017 | Kuznicki, Jr. | |
| 9,824,611 B2 * | 11/2017 | Bruce | A47C 1/12 |
| D804,394 S | 12/2017 | Bergin | |
| 9,848,691 B1 | 12/2017 | Pedersen | |
| 9,867,471 B2 | 1/2018 | Seidl | |
| 9,944,209 B1 | 4/2018 | Carnevali | |
| 9,949,578 B2 | 4/2018 | Williams | |
| D820,050 S | 6/2018 | Bergin | |
| 10,019,917 B1 | 7/2018 | Mezzera | |
| D826,658 S | 8/2018 | Bergin | |
| 10,051,968 B2 | 8/2018 | Seidl | |
| 10,083,638 B2 | 9/2018 | Lin | |
| D837,002 S | 1/2019 | Nichols | |
| D837,613 S | 1/2019 | Nichols | |
| D837,614 S | 1/2019 | Nichols | |
| D869,911 S | 12/2019 | Bergin | |
| 10,621,850 B2 * | 4/2020 | Laidlaw | H04W 4/60 |
| 10,772,435 B2 | 9/2020 | Bergin | |
| 2002/0093228 A1 | 7/2002 | Forston | |
| 2002/0179795 A1 | 12/2002 | Bergin | |
| 2004/0118022 A1 | 6/2004 | Duesler | |
| 2005/0080674 A1 | 4/2005 | Howard | |
| 2005/0201080 A1 | 9/2005 | Seward | |
| 2008/0297997 A1 | 12/2008 | Anderson et al. | |
| 2009/0089841 A1 | 4/2009 | Hanlon et al. | |
| 2009/0249408 A1 | 10/2009 | Smallhorn | |
| 2010/0225654 A1 | 9/2010 | Theis | |
| 2011/0029998 A1 | 2/2011 | Yip | |
| 2011/0109134 A1 | 5/2011 | Filipour et al. | |
| 2011/0139948 A1 | 6/2011 | Bergin | |
| 2012/0212012 A1 | 8/2012 | Berger et al. | |
| 2012/0314353 A1 | 12/2012 | Williams | |
| 2014/0124632 A1 * | 5/2014 | Bouse | A47G 23/0225 248/205.1 |
| 2016/0171913 A1 * | 6/2016 | Sprinkle | A47G 23/0216 248/558 |
| 2016/0270561 A1 | 9/2016 | Williams | |
| 2016/0297526 A1 | 10/2016 | Everhart et al. | |
| 2017/0028874 A1 | 2/2017 | Castaing et al. | |
| 2017/0318974 A1 | 11/2017 | Bergin | |
| 2019/0014935 A1 | 1/2019 | Bergin | |
| 2019/0034976 A1 | 1/2019 | Hamedi et al. | |
| 2019/0082852 A1 | 3/2019 | Guschmer | |
| 2020/0205574 A1 | 7/2020 | Fiden | |
| 2021/0174344 A1 | 6/2021 | Fowler et al. | |

OTHER PUBLICATIONS

International Preliminary Report on Patentability for PCT International Appl No. PCT/US2008/076276 performed by the the International Bureau of WIPO, dated Mar. 16, 2010, 4 pages, Geneva, Switzerland.

International Search Report for PCT International Appl No. PCT/US2008/076276 performed by the Korean Intellectual Property Office, dated May 15, 2009, 4 pages, Daejeon, Republic of Korea.

Written Opinion of the International Searching Authority for PCT International Appl No. PCT/US2008/076276 performed by the Korean Intellectual Property Office, dated May 15, 2009, 6 pages, Daejeon, Republic of Korea.

Response to Office Action for U.S. Appl. No. 11/854,328, submitted to the U.S. Patent and Trademark Office dated Jul. 13, 2009, 19 pages.

Notice of Allowance for U.S. Appl. No. 11/854,328, U.S Patent and Trademark Office, dated Dec. 3, 2009, 21 pages, Alexandria, Virginia.

Office Action for U.S. Appl. No. 11/854,328, U.S Patent and Trademark Office, dated Sep. 2, 2009, 17 pages, Alexandria, VA.

Response to Office Action for U.S. Appl. No. 11/854,328, submitted to the U.S. Patent and Trademark Office dated Sep. 16, 2009, 10 pages.

Office Action for U.S. Appl. No. 11/854,328, U.S. Patent and Trademark Office, dated Jul. 20, 2009, 3 pages, Alexandria, VA.

Office Action for U.S. Appl. No. 11/854,328, U.S. Patent and Trademark Office, dated May 13, 2009, 18 pages, Alexandira, VA.

Office Action for U.S. Appl. No. 11/854,328, U.S. Patent and Trademark Office, dated Nov. 13, 2008, 18 pages, Alexandria, VA.

Response to Office Action for U.S. Appl. No. 11/854,328, submitted to the U.S. Patent and Trademark Office dated Aug. 13, 2009, 26 pages.

(56) References Cited

OTHER PUBLICATIONS

Post Allowance Communication for U.S. Appl. No. 11/854,328, submitted to the U.S. Patent and Trademark Office dated Feb. 4, 2010, 8 pages.
Response to Office Action for U.S. Appl. No. 11/854,328, submitted to the U.S. Patent and Trademark Office dated Feb. 13, 2009, 15 pages.

* cited by examiner

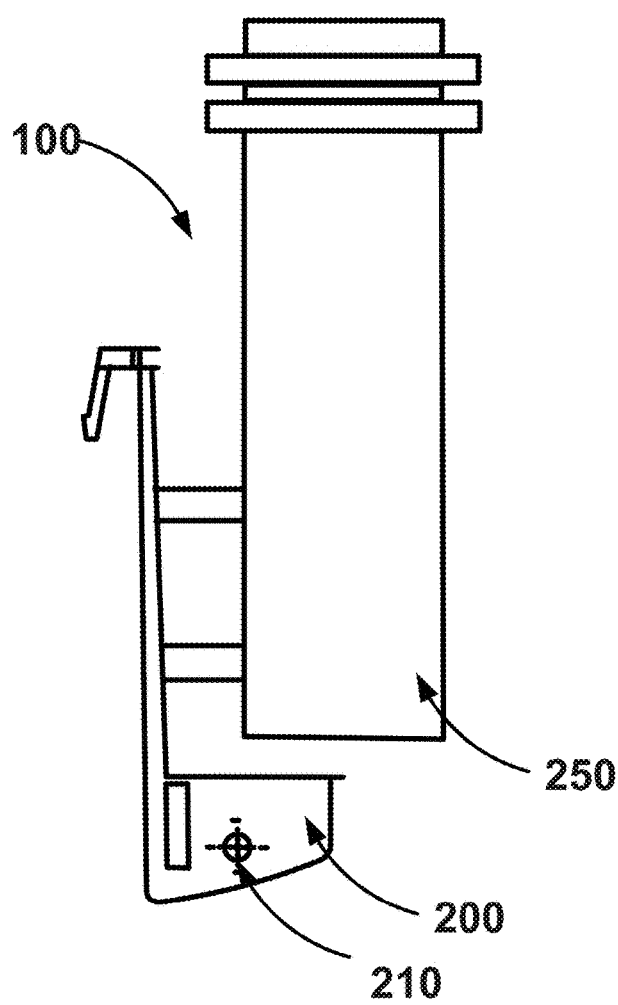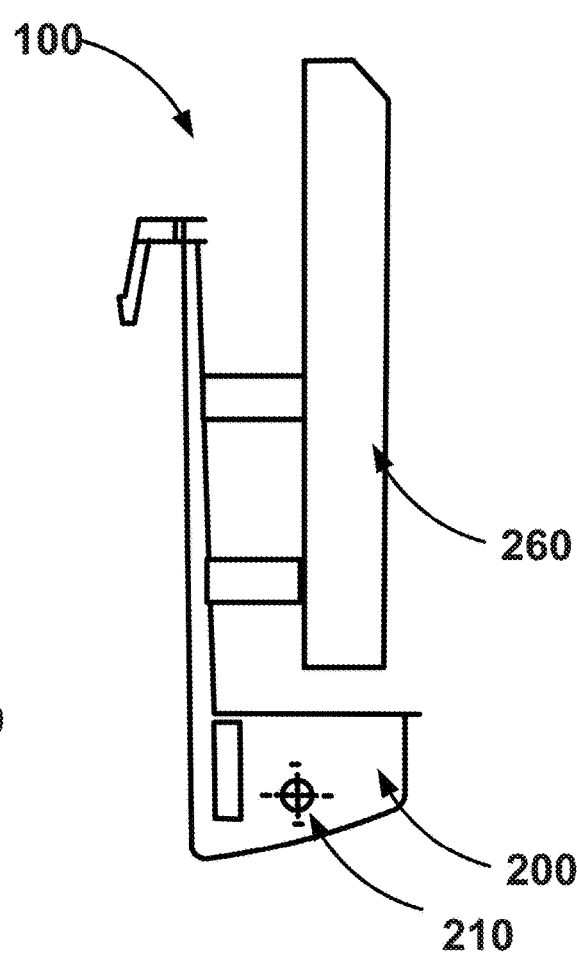

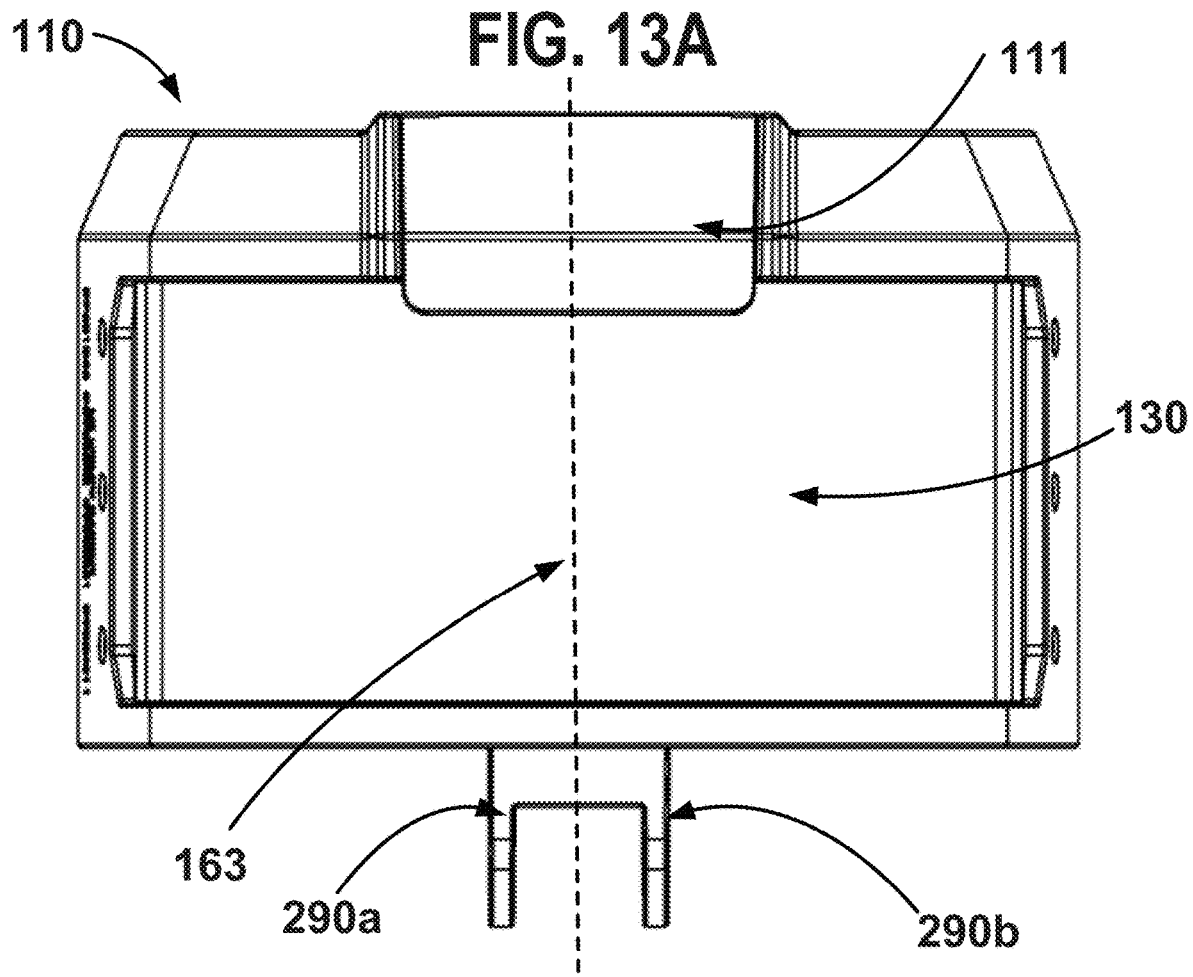
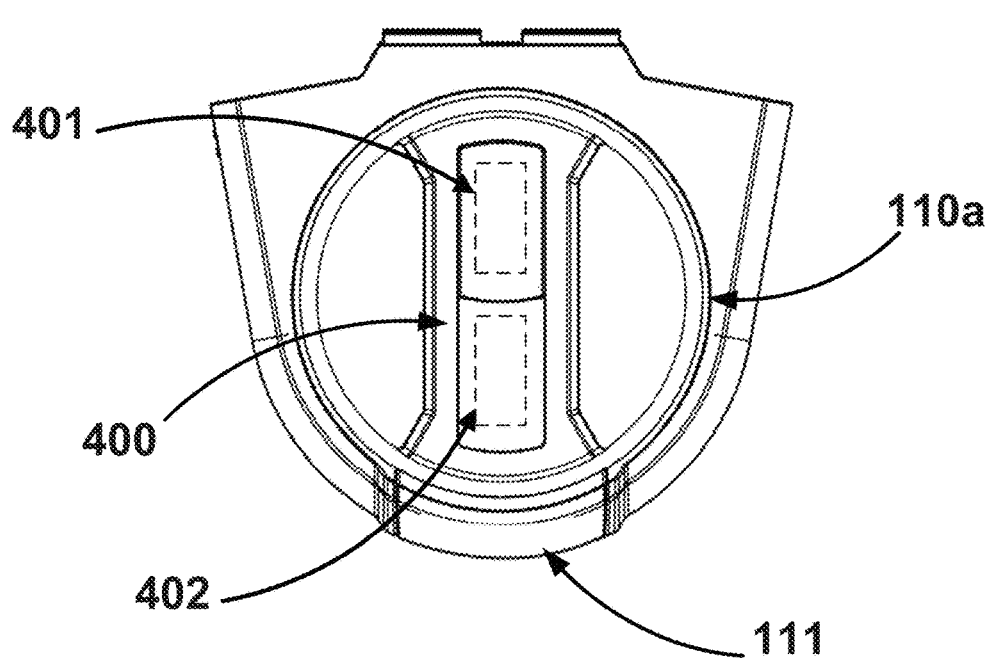

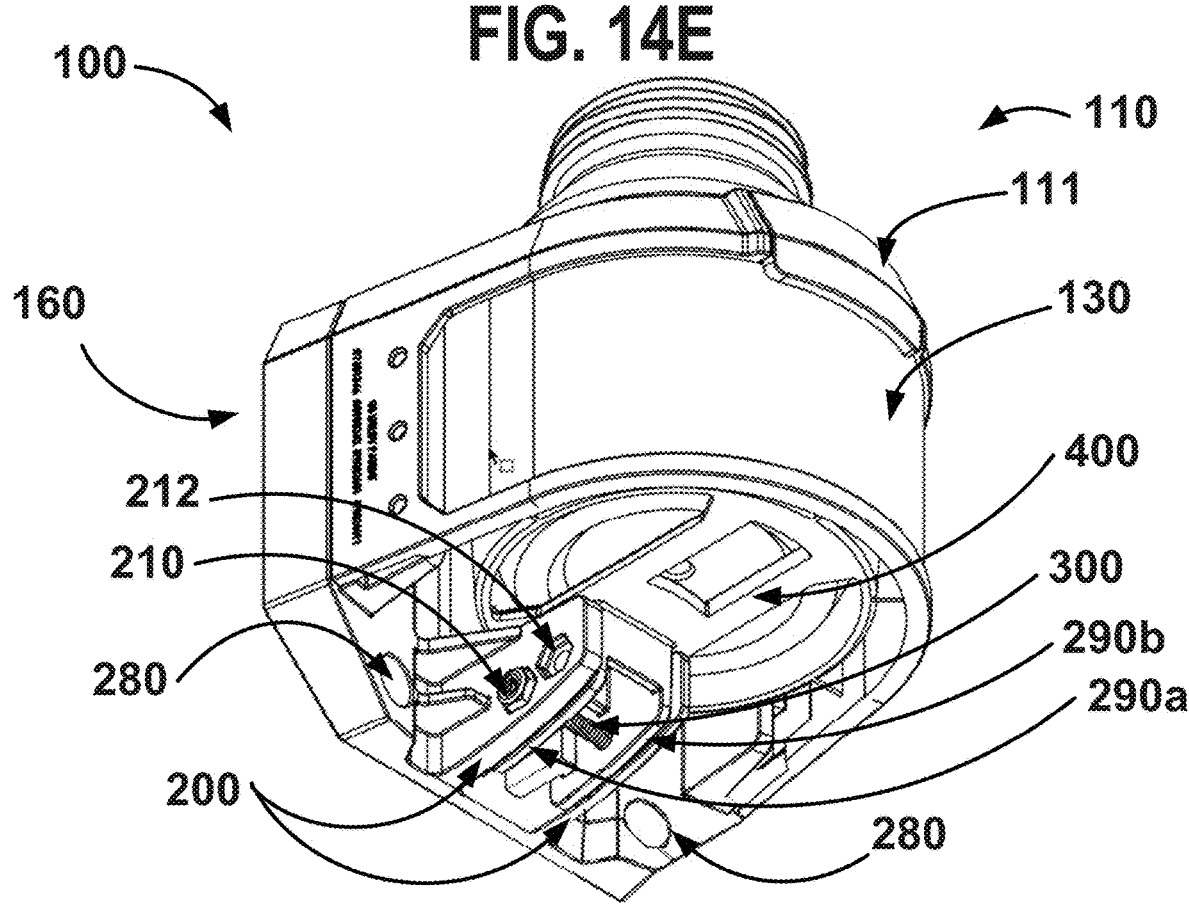
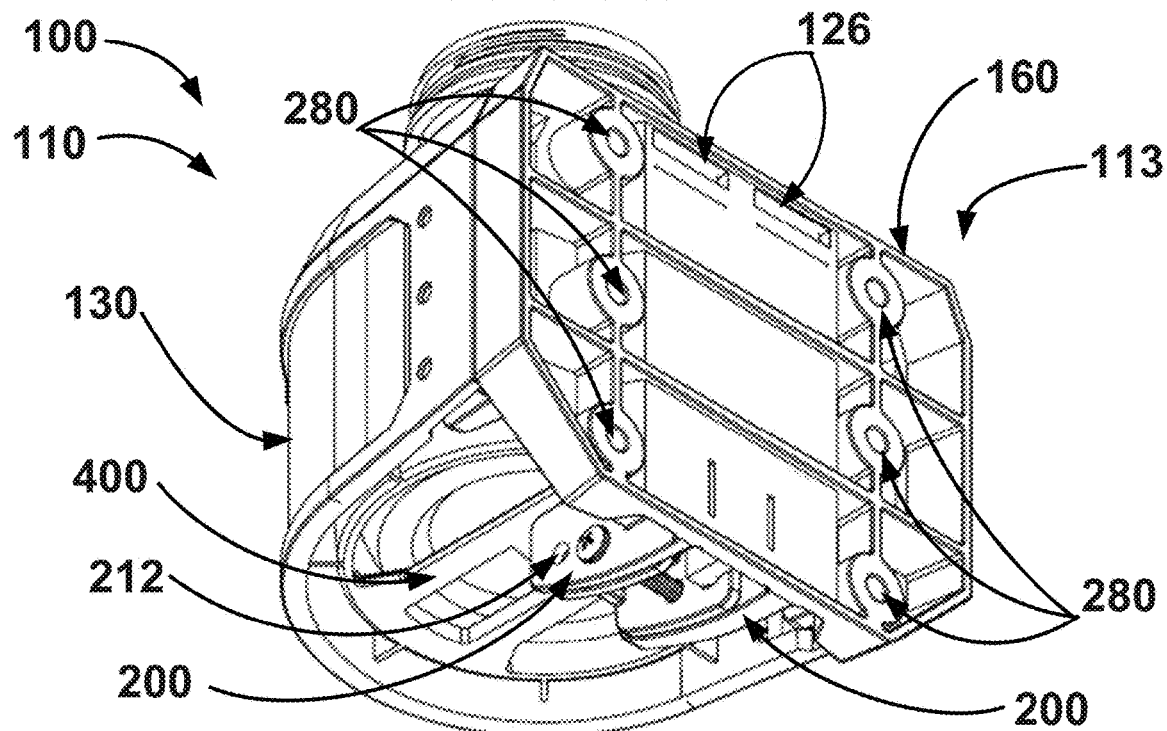

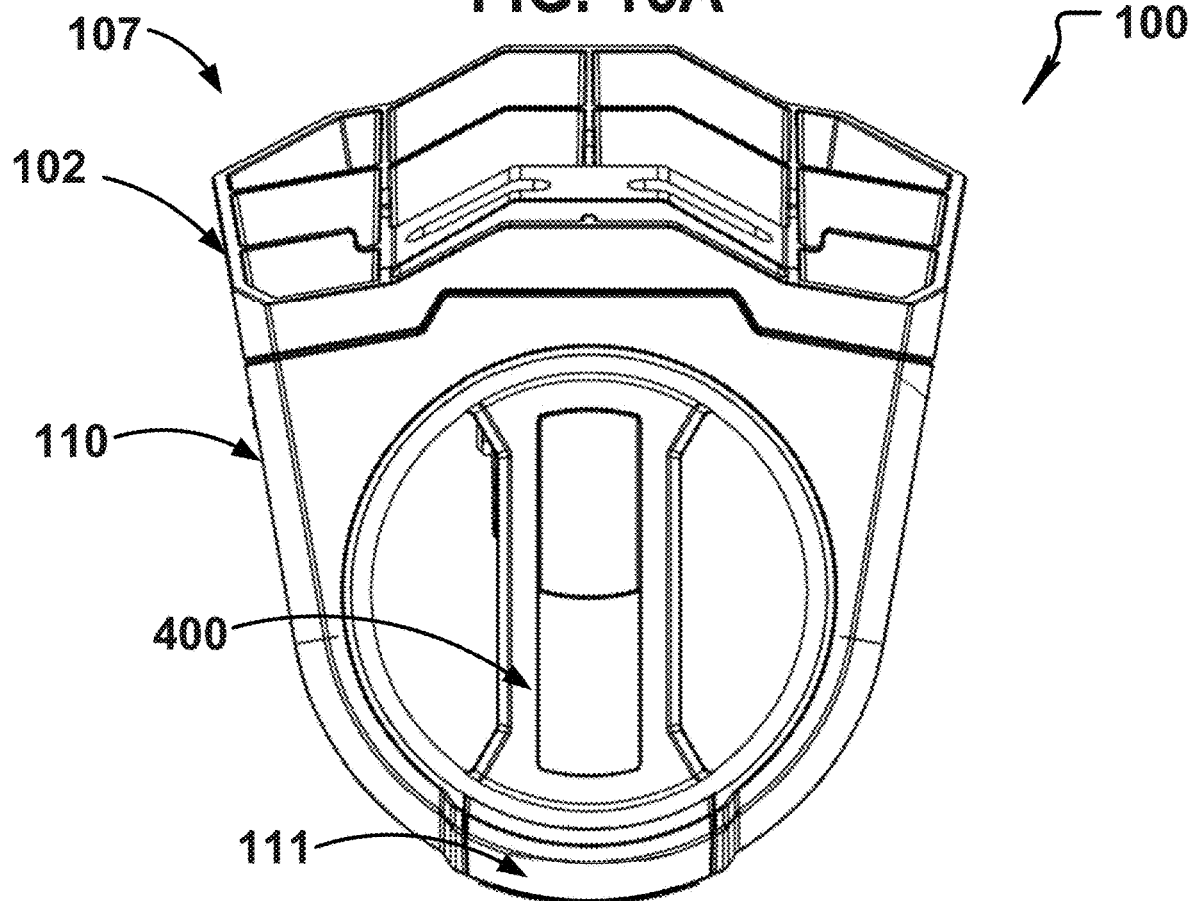
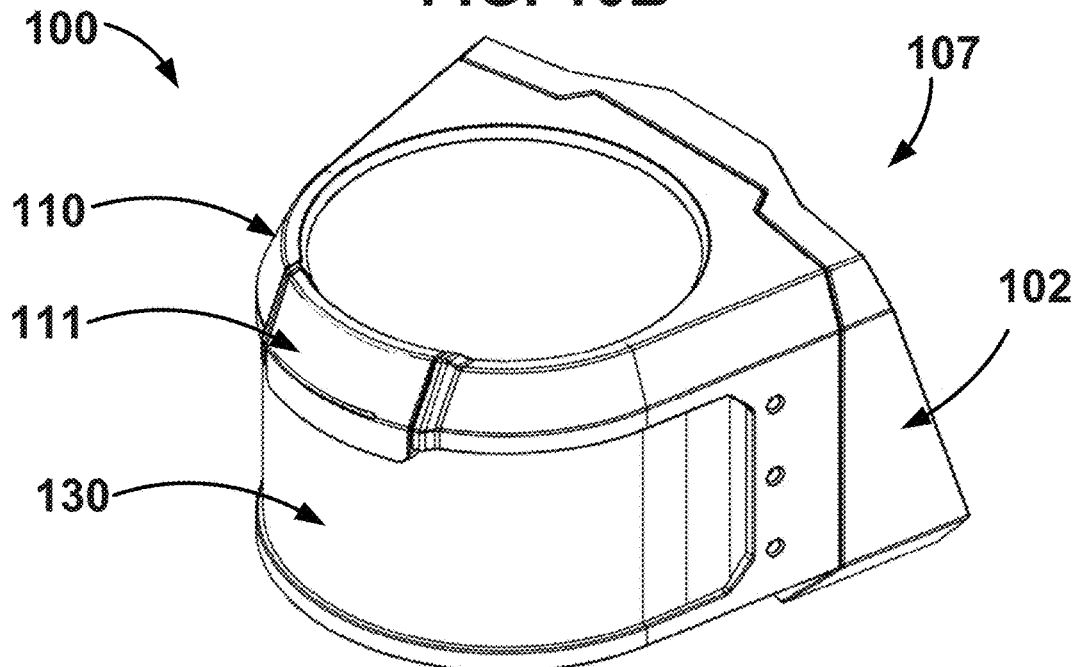

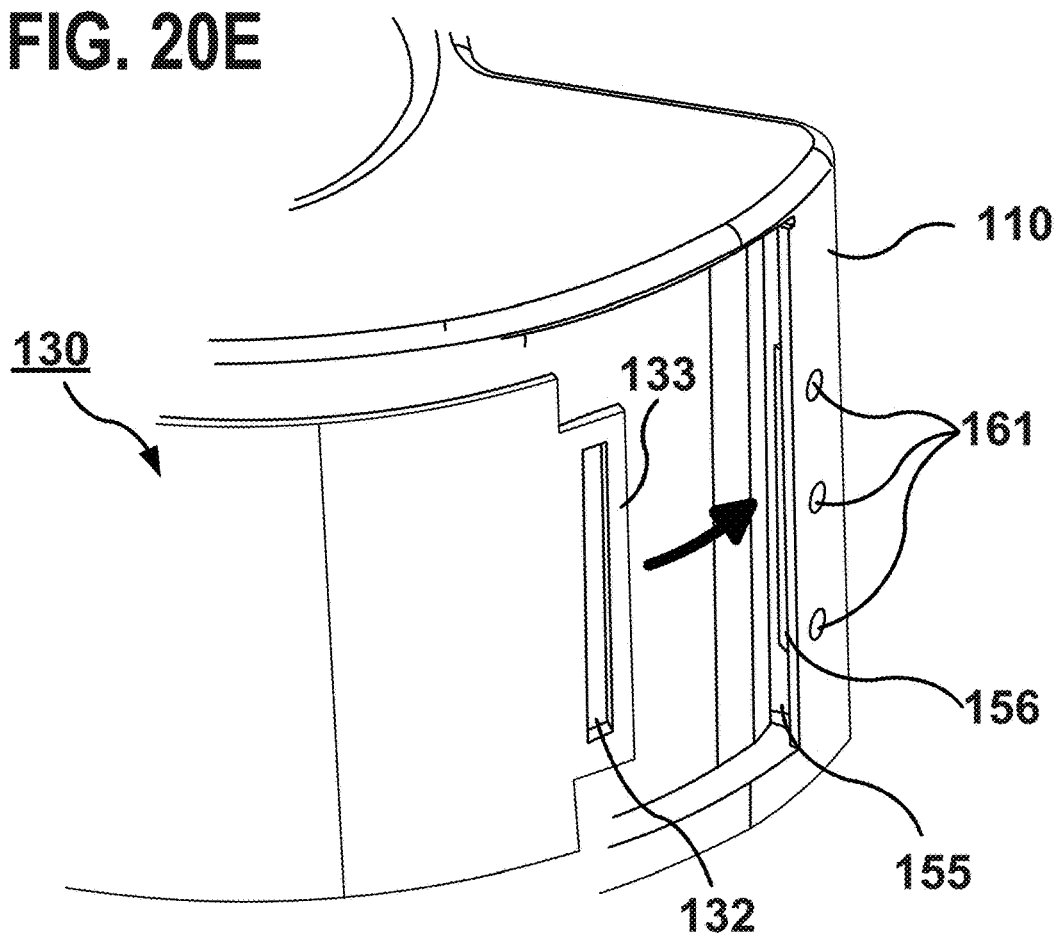

ADJUSTABLE MOUNTING BRACKET APPARATUS AND METHOD

BACKGROUND

The activities of marketing and advertising are important parts of the economy. Effective marketing and advertising introduce and promote products or services that otherwise would not be known to the consuming public. The consumer would typically desire information about a product or service before the consumer would consider purchasing that product or service. Marketing and advertising provide this information to the consumer to thereby inform the consumer about the existence of the product or service and its various attributes.

Public venue advertising is ubiquitous. Venues will often sell space to advertisers to promote specific products and generate additional revenue. The advertising can be displayed in many ways, such as on billboards, on walls, on electronic displays, on printed material, and other ways. However, because of the often remote (e.g., billboards) or transient (e.g., napkins) nature of these existing types of advertisements, they may fail to adequately grab the consumer's attention, or capture the consumer's eye in a manner that would leave the desired lasting impression. Thus, there appears to be an open niche for alternative advertising methods to accommodate the valuable commercial resource of the immediate visual area directly in front of the consumer in a captive-audience venue.

Cupholders and other seating structures such as seatbacks are frequently found in public and private venues where seating is common and beverages are served. Such seating structures are generally positioned so as to be conveniently accessible to the patrons sitting in the seats provided. For example, a typical seating structure such as a cupholder may be in position in front of the patron or in front of the patron's drinking arm, so that the patron can place their drink in the cupholder when not drinking and reach their drink easily when desired. Cupholders may be mounted or affixed to the seat backs of the row in front of a patron or on each armrest, so that they are readily accessible to the patron while at the same time not interfering with the comfort of others in the public venue.

SUMMARY

The present developments relate to a mountable adjustable bracket apparatus. In some respects, the mounting bracket is a modular bracket that may be attached to a seat structure, other seat supported apparatus, either as a base unit or retrofit apparatus. In one implementation, the mounting bracket is a modular bracket that may be attached to a wall or other vertical member. In one aspect, the mounting bracket hereof, may have an angle built-in or molded-in to the body of the mounting bracket. In this way, the mounting bracket hereof may compensate for the recline or incline of the support member to which it is attached. This may allow the attachment to be more parallel to the floor, hence the items placed in the attachment may be more parallel to the floor. This may be important because a liquid receptacle may spill its contents if it is not positioned parallel with the floor. Other items disposed with or within the attachment may also benefit from this feature.

Disclosed herein is at least an adjustable modular mounting bracket which is capable of being attached to a seat, seat back, arm rest, or seat support structure. In some implementations, the adjustable modular mounting bracket has an angle built in to the structure prior to mounting. In other implementations, the adjustable modular mounting bracket does not have an angle built-in to the structure, but nonetheless can have its cant or tilt adjusted after being secured to a structure, or after mounting.

The present disclosure also relates to advertising apparatuses and/or methods which in some implementations may be or may include a seat structure or other seat supported apparatus, either as a base unit or as a retrofit apparatus, and in some examples may include a seat, a seat back, or a cupholder or a cupholder attachment apparatus either having one or more replaceable devices attachable thereto, as in some examples including an insert or inserts, also referred to herein in some examples, as appurtenant panels and/or emblems. In many instances, either of the devices, whether panels or emblems could be used for advertising purposes, which may be adapted to be manufactured as parts of or otherwise may be installed on existing seats, either as or attachable to or apart from cupholders for improved exposure to the target audience of the advertising. The attachment portion of such an attachment apparatus may in some implementations be adapted to be an integral part of or may fit into or onto an existing cupholder that has been previously installed on a seat or seatback in the venue. Existing cupholders can have various shapes, and one or more of the cupholder attachment apparatuses described here may be adapted to a variety of existing cupholders.

In some implementations of an advertising apparatus hereof, the apparatus may be attached or removed without the use of any special tools. In other implementations, the apparatus may be desirably set as difficult to remove; one or more special tools may be adapted for mounting and/or removal. Such special tools and/or a special method for installing and/or removing such apparatuses and/or the emblems and/or other appurtenant display panels or other such devices may be implemented to avert vandalism as by undesirable removal of the apparatus, emblem or appurtenant device.

The advertising devices whether as inserts or appurtenant panels and/or emblems may be pre-attached to the advertising apparatus before installation on an existing cupholder or may be attached after the advertising apparatus has been installed on the seatback or cupholder or other support structure. When usable with a cupholder, the cupholder functionality would still be accessible to a patron after the advertising apparatus has been mounted in place. Once the appurtenant panel and/or emblem has been installed, or if it has been preinstalled, it may be visible to a patron who would be using that cupholder and in many cases may also be viewable by other patrons of the establishment. The appurtenant panel and/or emblem may also carry advertising material to thus add value in informing the patron or patrons of sponsorship or goods or services available to them. The advertising device; e.g., the appurtenant panel and/or the emblem may be removable, replaceable and/or interchangeable with other such panels or emblems carrying different advertising indicia, so that advertising messages may be readily changed upon proprietor desire.

Different versions of advertising apparatus may be installed on the same type or style of seatback, cupholder or other support structure; conversely, the same advertising apparatus may be adapted to be installed on a variety of seats, cupholders or other support structures. Installation and placement may depend on a variety of factors, including the position of the patron, the position of the seat, the type of seat, or the flow of traffic around the seat. The advertising apparatus may be made of an easily moldable material, and the appurtenant panel may also be made of an easily moldable material or often alternatively of a die cut resilient material, so that both advertising apparatus and appurtenant panel may be made in a variety of colors, and adapted to bear whatever advertising is desired. Similarly, an emblem member may be constructed from the same or different materials and/or colors and may carry one or more alternative emblems for purposes to be described hereinbelow.

These and still further aspects as shall hereinafter appear are readily fulfilled by the present developments in one or more remarkable and/or unexpected manners as will be readily discerned from the following detailed description of exemplary implementations thereof especially when read in conjunction with the accompanying drawings in which like parts bear like numerals throughout the several views.

BRIEF DESCRIPTION OF THE DRAWINGS

In the drawings:

FIG. 4 includes FIGS. 4A and 4B.

FIG. 6 includes FIGS. 6A, 6B, 6C, 6D, and 6E; FIG. 6C provides a side view of a mounting bracket configured, adapted and/or connected to a pole holder; FIG. 6D provides a side view of a mounting bracket with a mobile phone holder attached thereto.

FIG. 7 includes FIGS. 7A and 7B.

FIG. 13 E shows an elevation view from the back.

FIG. 15, which includes sub-part FIGS. 15A, 15B, 15C, 15D, 15E, 15F, 15G, and 15H, provides views of an exemplar of an implementation of the mounting bracket and attachment hereof.

FIG. 16 includes sub-part FIGS. 16A, 16B, 16C, 16D, 16E, 16F, and 16G; FIG. 16A provides a top plan view; FIG. 16B provides an isometric view.

FIG. 17 includes sub-part FIGS. 17A, 17B, 17C, 17D, 17E, 17F, 17G, and 17H.

FIG. 18 includes sub-part FIGS. 18A, 18B, 18C, and 18D.

FIG. 20 includes sub-parts FIGS. 20A, 20B, 20C, 20D, 20E, and 20F. FIGS. 20C, 20D, 20E and 20F provide isometric, elevation, and plan views of an appurtenant panel for an advertising apparatus such as that in FIG. 20A.

DETAILED DESCRIPTION

Figure 1:
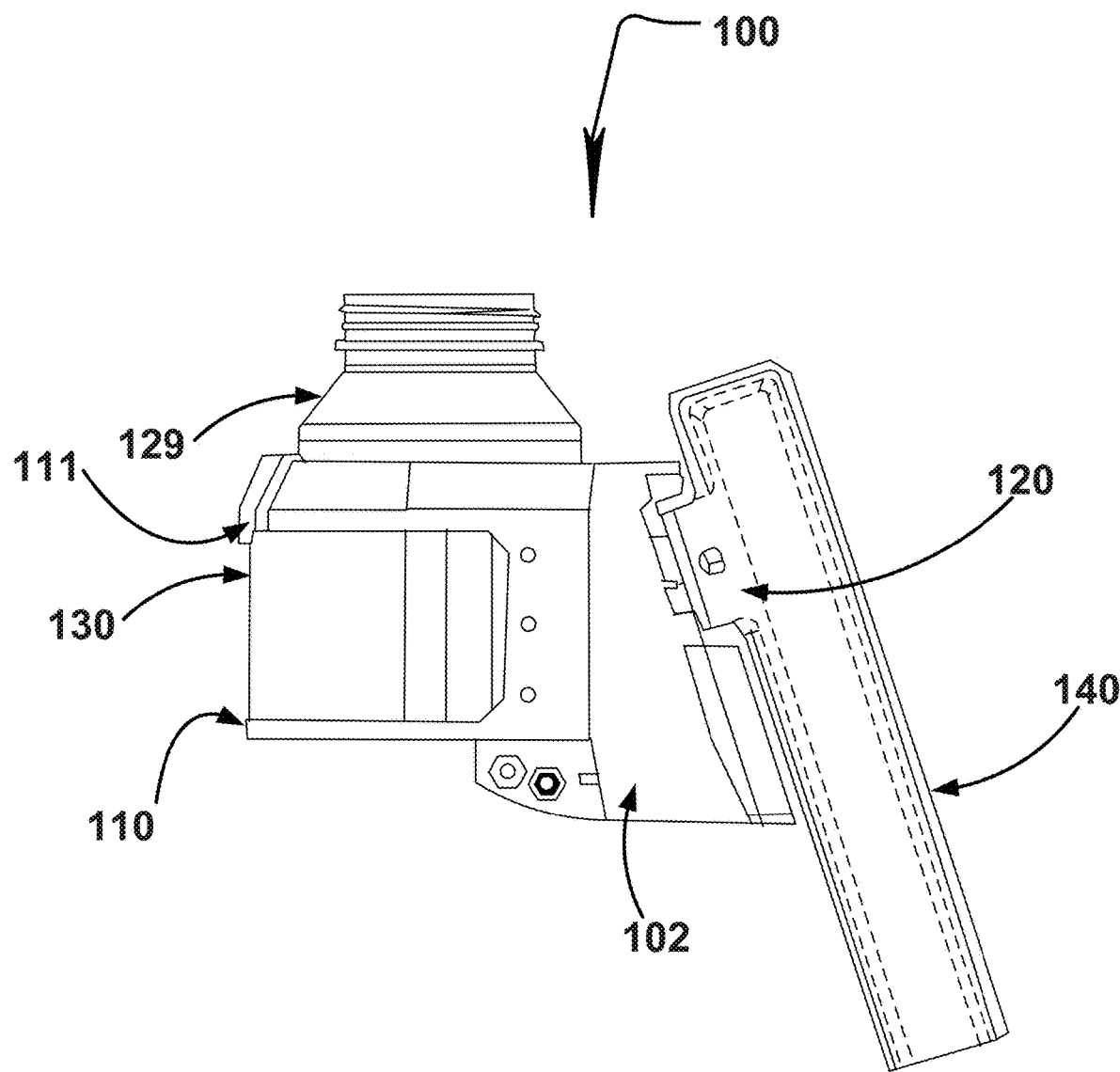
FIG. 1 provides a side view of a seat support structure and one implementation of the adjustable modular cupholder and advertising apparatus.

The present developments relate to a mountable adjustable bracket apparatus, or in some instances mounting bracket. In some implementations, the mounting bracket is a modular bracket that may be attached to a seat structure, other seat supported apparatus, either as a base unit or retrofit apparatus. In one implementation, the mounting bracket is a modular bracket that may be attached to a wall or other substantially vertical member. In one aspect, the mounting bracket hereof, may have an angle built-in or molded-in to the body of the mounting bracket. In this way, the mounting bracket hereof may follow the recline or incline of the substantially vertical support member to which it is attached. In other implementations, the adjustable modular mounting bracket does not have an angle built-in to the structure, but nonetheless allows for the cant or tilt to be adjusted for an attachment apparatus after being secured to a structure, or after mounting.

Moreover, the developments hereof relate to a variety of advertising apparatuses typically configured to display advertising on or adjacent an external surface highly visible to consumers. In many implementations, the advertising apparatus is adapted to be attached to a support structure, typically, a support surface which may be found in a captive-audience venue. Such a support surface in some instances may be or may be on or otherwise associated with patron seats or seating structures, as for example on seat backs or arm rests. In a further variety of examples, the advertising apparatus may alternatively be a free-standing apparatus. Some advertising apparatuses hereof may entertain no other functionality, other than providing an advertising surface; whereas, other apparatuses may have built-in alternative functionalities, such as seats or seatbacks or providing containers or supports for patron/consumer items such as drink cups, reading or writing material, programs, writing utensils, personal electronic devices, or other items. In some implementations, the advertising apparatus may be integral with or otherwise attachable to previously installed consumer item-holding apparatuses acting as the support structure, as for example being an integral cupholder/advertising apparatus or being adapted to be coupled to one or more of a variety of pre-existing or to-be-developed cupholders. Such apparatuses may be disposed in stadiums, arenas, theatres, or other public or private venues for view by the patrons thereof.

The developments disclosed herein in some implementations further relate to the use of electronically enabled digital technology to facilitate the advertisements placed on displays disposed in the seating envelope. The term seating envelope refers generally to the immediate area that a patron or consumer occupies or is seated in during an event at a captive-audience venue. The seating envelope may include the seat support structure, the seat back, the seat bottom, one or more seat stanchions, bleachers, risers, armrests, cupholders, mounting brackets, mountable holder assemblies for beverage and food holding, concession trays, container holders, and other structures that may be adapted to increase the comfort, functionality, usability, and enjoyability of the public venue and the seating areas disposed therein. The seating envelope at most public venues is limited by space available to add additional items due to the desire to provide high density seating in a confined space. Therefore, the developments hereof disclose structure and housing for an accessible cavity for storage of technology and electronics within the body of a mounting bracket. These accessible, but securable and tamper-proof cavities may provide several locations to place and store the necessary single board computer, battery, Near Field Communication (NFC) technology, speaker, interactive buttons, motion sensor, occupancy sensor, charging ports, photocells, and other electronically connected and enabled apparatuses. Alternative, developments related to use of electronics and technology may be important to developments and advancements of the seating envelope generally; however, a description of the integration, use, and implementation may be beyond the scope of this disclosure and the developments hereof.

FIG. 1 provides a side view of a seat support structure and one implementation of an adjustable mounting bracket 100, cupholder 110, seat stanchion 120, and advertising apparatus 130. In this first alternative configuration, the mounting bracket 100 has an angled body portion 102 (sometimes referred to as base, or base portion), adapted to be connected to and/or disposed on and/or with a cupholder 110, and an updateable, replaceable, or advertising device 130, here an appurtenant panel, which may be readily adapted for display of advertising material. In one implementation, (not displayed in this FIG. 1) the appurtenant panel could be of a variety of a types including adhesive material on a panel or could be reverse printed or imaged on the back side of a clear material to deter scratching or vandalism to the image, or could be removable or could be integrally formed thereon, or as part thereof. In another implementation, the advertising device 130, may be a flexible digital display that is connected to the electronics and technology disposed in a seat support structure 140, seatback, and/or seat bottom (the seatback and seat bottom are not shown in FIG. 1). The cupholder 110 holds the drink container 129 (i.e. plastic cup, bottle, or can). In some implementations, the advertising device 130 may be a digital electronic display and may be black and white, grayscale, partial color, or full color, and may include an LCD (liquid crystal display), LED (light emitting diode), OLED (organic light emitting diode), AMOLED (active-matrix organic light-emitting diode), plasma or PDP (plasma display panel), an e-ink display, or an e-paper display.

Figure 2:
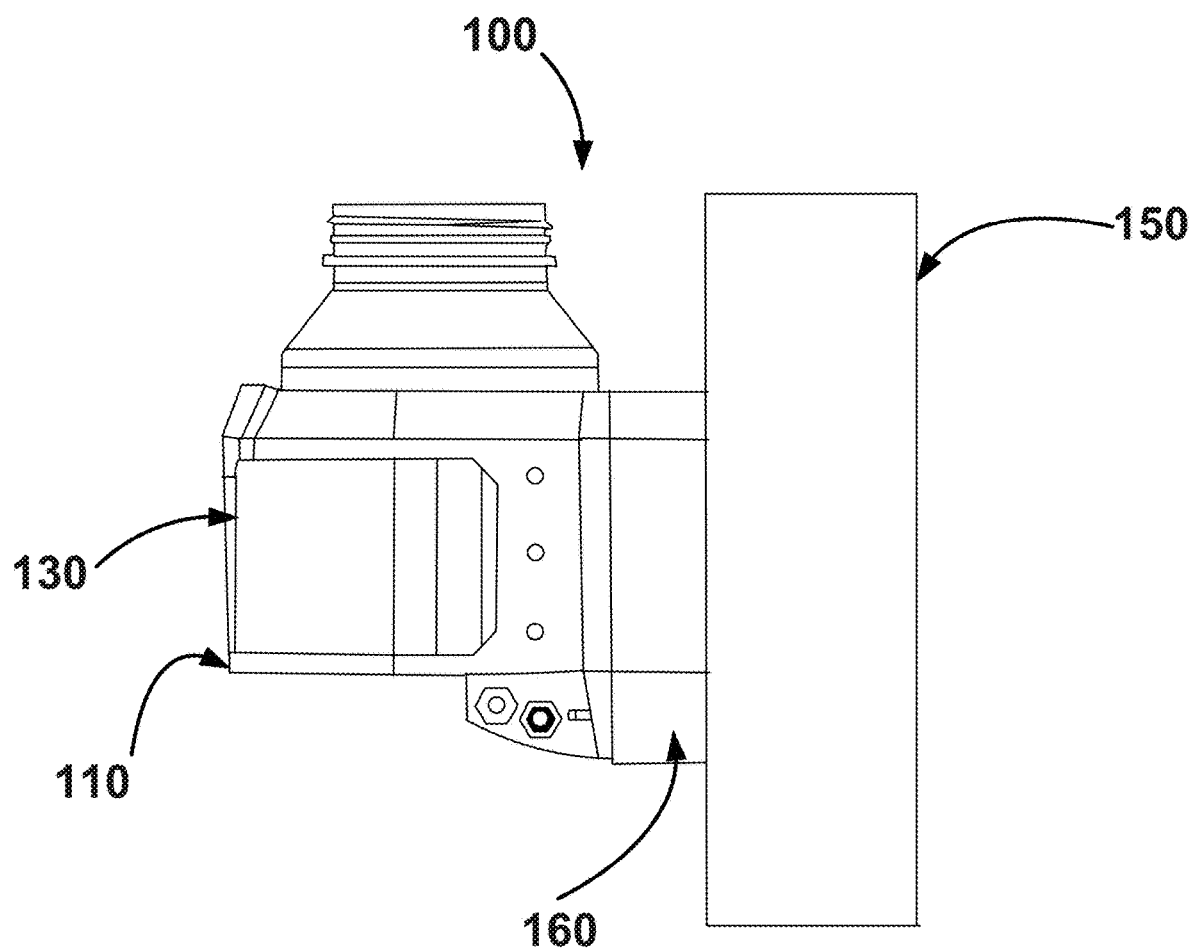
FIG. 2 provides a side view of an adjustable modular cupholder advertising apparatus attached to a seat support structure.

FIG. 2 provides another implementation of an adjustable mounting bracket. In this implementation, the adjustable mounting bracket 100 is mounted, connected, and secured to a vertical mounting surface 150. In this alternative configuration of an adjustable mounting bracket 100, a flat body portion 160 (sometimes referred to as a base, base portion, and/or base element) is adapted to be connected to and/or disposed on and/or with a cupholder 110, and an updateable, replaceable, or advertising device 130, here an appurtenant panel, which may be readily adapted for display of advertising material. In one implementation (not displayed in this FIG. 2) it could be of a variety of a types including adhesive material on a panel, or could be reverse printed or imaged on the back side of a clear material to deter scratching or vandalism to the image, or could be removable or could be integrally formed thereon, or as part thereof. In another implementation, the advertising device 130, may be a flexible digital display that is connected to the electronics and technology disposed elsewhere in the seating envelope, or in some instances, shown elsewhere in this disclosure, in the mounting bracket itself. In yet other implementations, not shown here, the digital display may be a flat digital display that is disposed of and connected to the adjustable modular mounting bracket 130. The implementations of FIG. 1 and FIG. 2, demonstrate that in some implementations of the developments hereof, the mounting bracket may have an angle built in to the body or base of the mounting bracket (as shown in 102 of FIG. 1), while other mounting brackets described and disclosed herein, do not have an angle built in to the body or base portion of the mounting bracket (as shown in 160 of FIG. 2).

Figure 3:
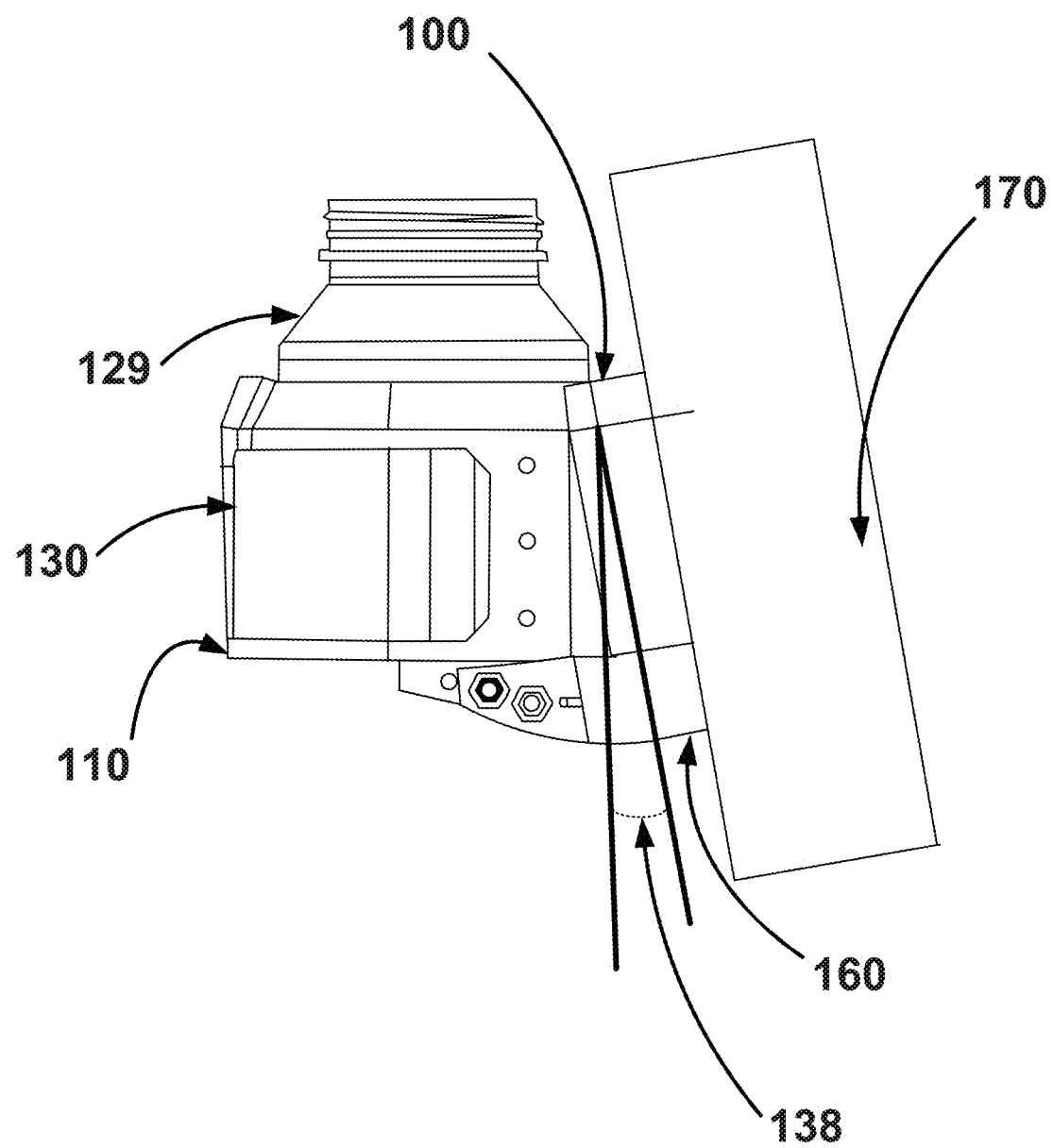
FIG. 3 provides a side view a an adjustable modular cupholder advertising apparatus secured to a seat support structure that has a recline in the vertical member of the seat support structure.

FIG. 3 provides an implementation of an adjustable mounting bracket 100, disposed and secured to an angled and/or reclined mounting surface 170, which may be a seat stanchion 120 (as in FIG. 1) or may be a seat support structure 150 (as in FIG. 2). Further displayed in FIG. 3, are an adjustable modular mounting bracket 100, a flat body portion 160 adapted to be connected to and/or disposed on and/or with a cupholder 110, and an updateable, replaceable, or digital advertising device 130, here an appurtenant panel, which may be readily adapted for display of advertising material. Additionally, FIG. 3 demonstrates how the adjustable mounting bracket 100, may be adjusted to an adjustable angle 138 (shown as a dotted line) which allows the drink container 129 to be positioned in a manner which is substantially flat, or substantially level, front to back, meaning the front of the cupholder 110 (and consequently the drink container 129) is able to be at substantially the same height or distance from the ground, as the back of the cupholder 110, and furthermore being parallel to the ground may help prevent and/or reduce spilling of the beverage when placed in the cupholder 110.

Figure 4A:
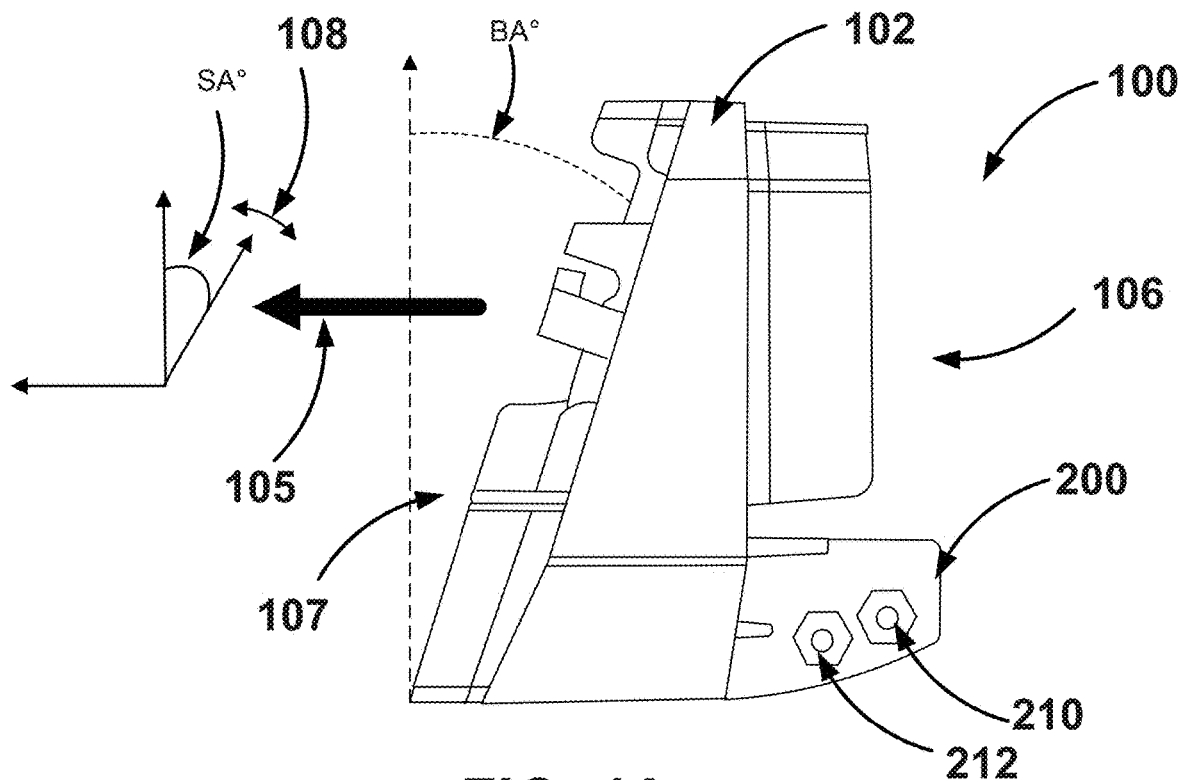
FIG. 4A provides a side view of one implementation of an angled modular mounting bracket with adjustable angle support.
Figure 4B:
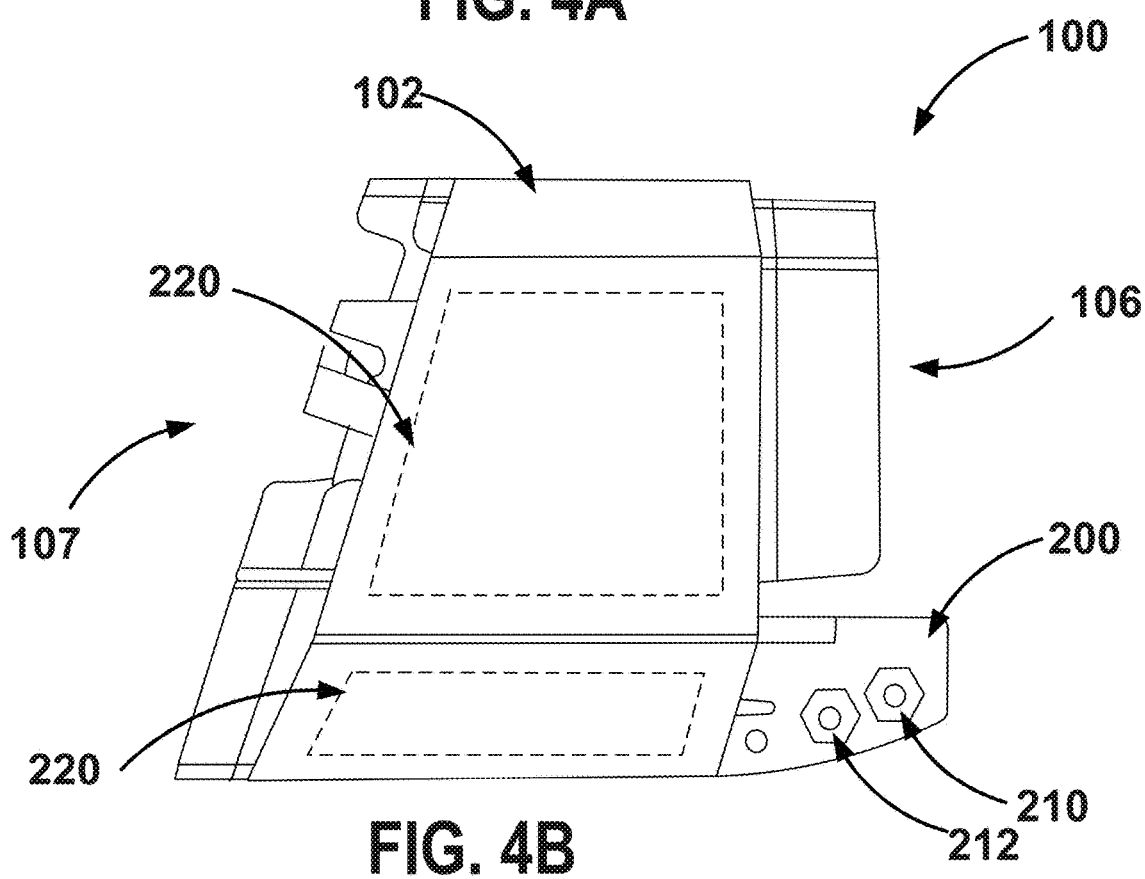
FIG. 4B provides a side view of another implementation of an angled modular mounting bracket with an adjustable angle support and technology storage space.

FIG. 4 includes FIGS. 4A and 4B. FIG. 4A provides is a side view of one implementation of an adjustable mounting bracket 100 with an angled body portion 102, the body portion having a front side 106, a back side 107, one or more projecting member(s) 200, and projecting member bolt holes 210, 212. In FIG. 4A, the arrow 105 shows the direction that the body portion 102 would move to attach to a stanchion, support structure or seatback (not pictured in FIG. 4A). It should be noted that the angled body portion 102 may be fabricated with a range of angles to meet the specifications of the support structure to which the angled body portion 102 is designed to be attached to. The structure angle or SA° represents the degree(s) to which a structure, such as a stanchion, seatback, may be away from plumb, or vertical. The developments hereof contemplate that the structure angle may be anywhere from 0° or r to as much as 45° or more. Arrow 108 demonstrates that the angle of the structure may be variable, thus the SA° is also variable. Accordingly, the angled body portion 102 may configured and constructed with a BA° that closely conforms to the SA° to facilitate and allow the back side 107 to be secured to the structure.

FIG. 4B is a side view of one implementation of an adjustable mounting bracket 100 with an angled body portion 102, projecting member 200, and projecting member bolt holes 210, 212, and optional technology storage compartment 220. Further, the body portion 102 has a front side 106 and a back side 107. The back side 107 is shown with more detail in FIGS. 16E, 17E, and 17F and is described in more detail below.

Figure 5A:
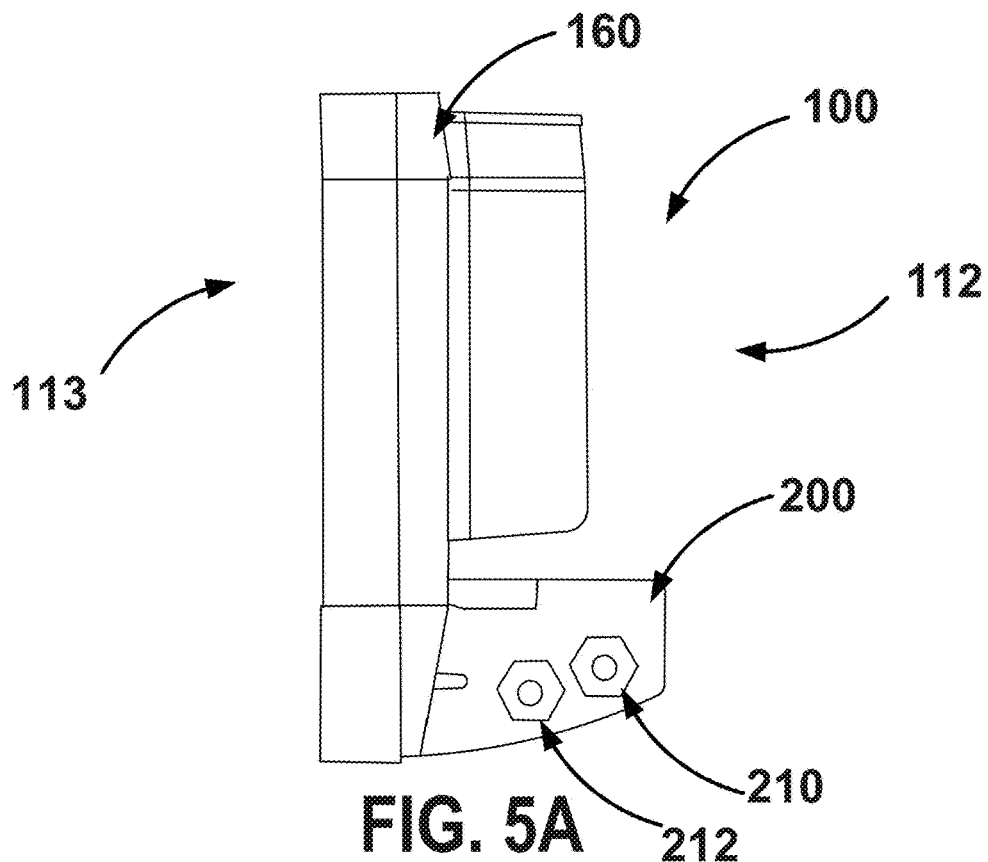
FIG. 5 includes FIGS. 5A and 5B, FIG. 5A provides a side view of a modular mounting bracket with adjustable angle support and FIG. 5B which is a side view of another implementation of a modular mounting bracket with an adjustable angle support and technology storage space.
Figure 5B:
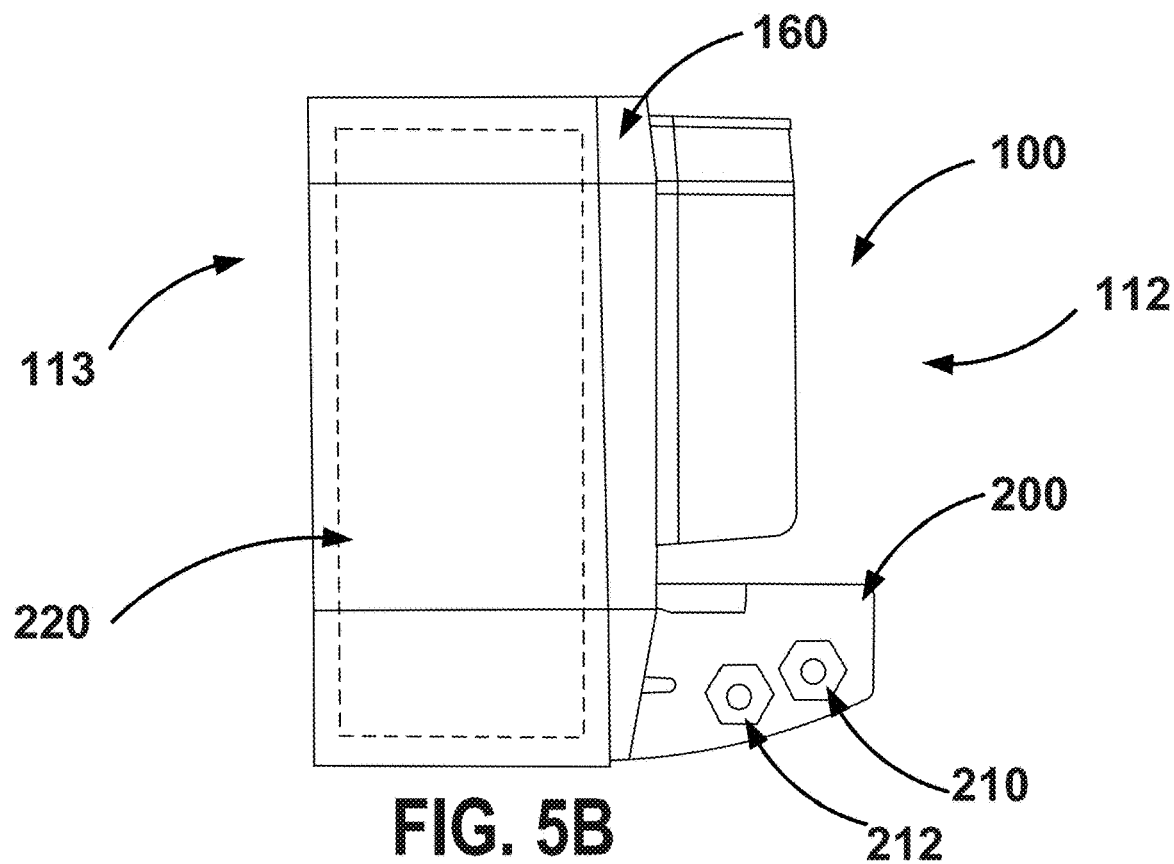

FIG. 5 includes FIGS. 5A and 5B. FIG. 5A provides a side view of one implementation of an adjustable mounting bracket 100 with a flat body portion 160, a front side 112, a back side 113, one or more projecting members 200, and projecting member bolt holes 210, 212. The back side 113 is the side that is mounted to a support structure, whether a seat back, stanchion, or other structure. FIG. 5B provides a side view of one implementation of an adjustable mounting bracket 100 with a flat body portion 160, a front side 112, a back side 113, one or more projecting member(s) 200, and projecting member bolt holes 210, 212, and optional technology storage compartment 220. FIGS. 4B and 5B demonstrate variations of the adjustable mounting bracket 100 that may optionally have technology storage compartments 220.

Figure 6A:
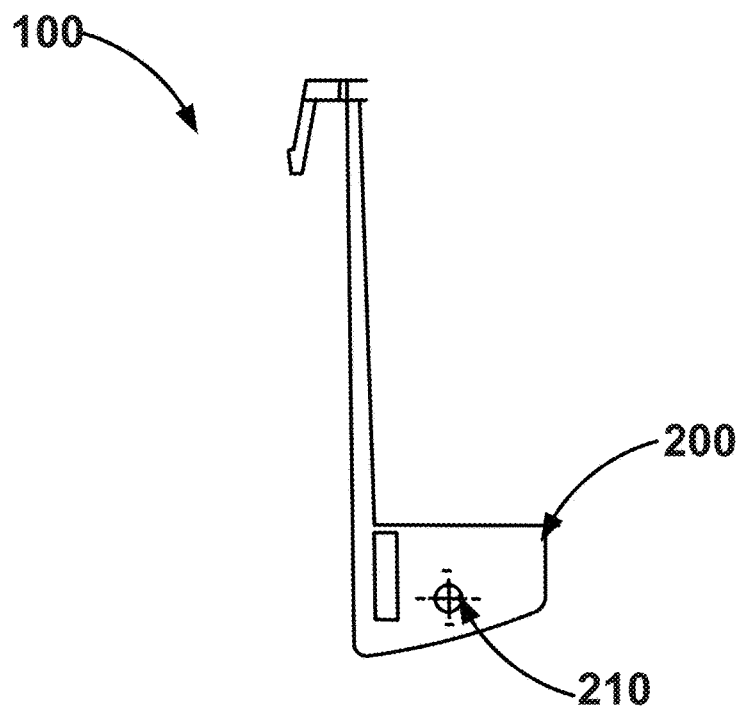
FIG. 6A provides a side view of a mounting bracket.
Figure 6B:
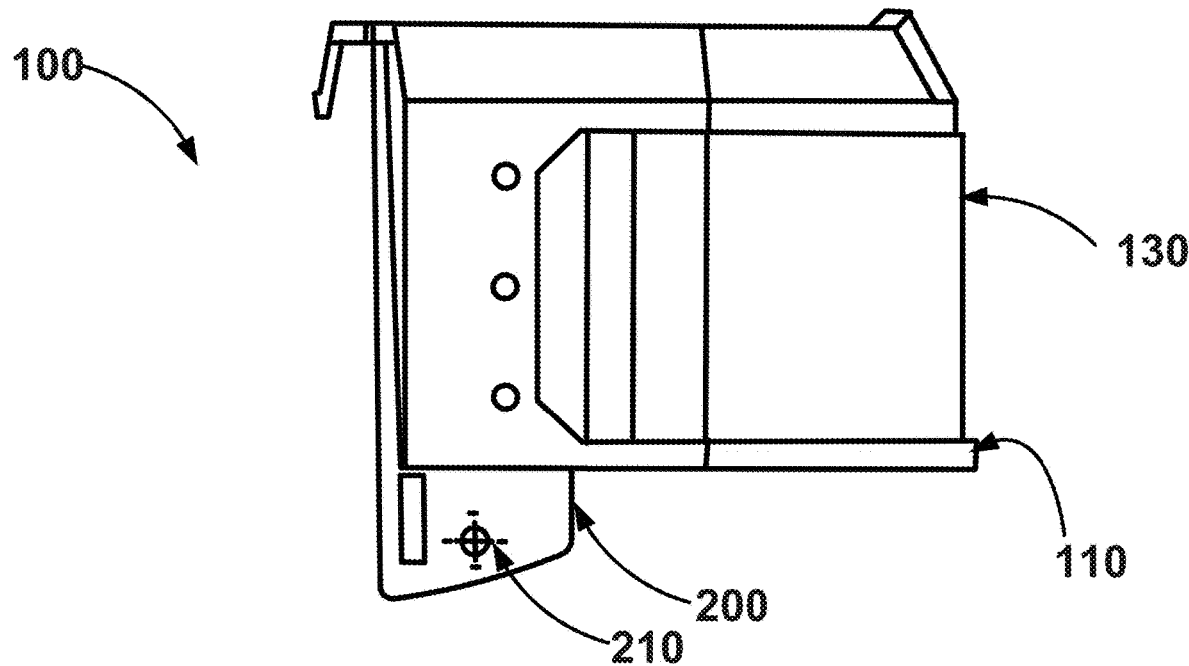
FIG. 6B provides a side view of a mounting bracket with a cupholder and advertising apparatus secured to the mounting bracket.
Figure 6E:
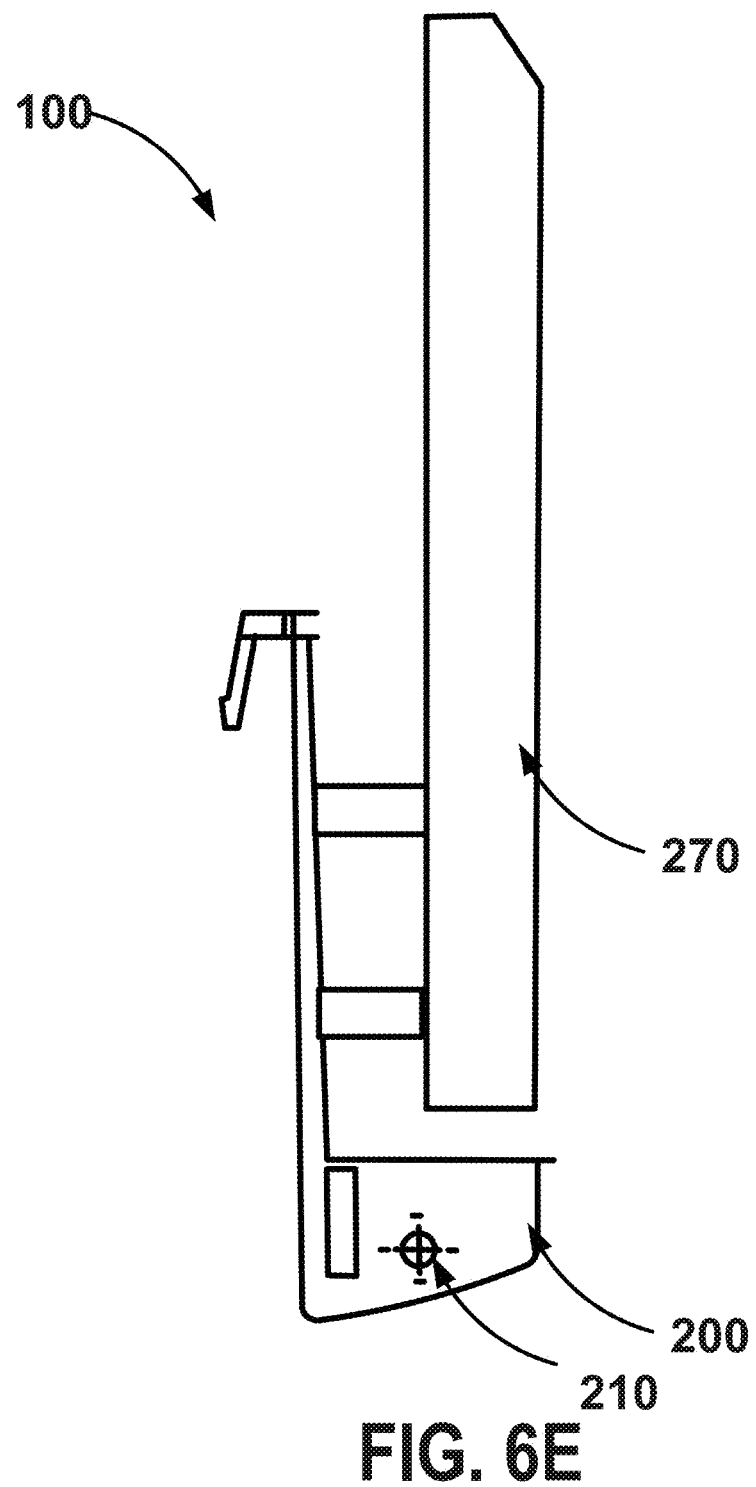
FIG. 6E shows a side view of a mounting bracket with a holder for an electronic and mobile tablet attached thereto.

FIG. 6A provides an adjustable mounting bracket 100, with a projecting member 200, and projecting member bolt hole 210. FIG. 6B provides an adjustable mounting bracket 100, with a projecting member 200, projecting member bolt hole 210, cupholder 110, and an updateable, replaceable, or advertising device 130. FIG. 6C provides an adjustable mounting bracket 100, with a projecting member 200, a projecting member bolt hole 210, and a flag holder apparatus 250. FIG. 6D provides an adjustable mounting bracket 100, with a projecting member 200, a projecting member bolt hole 210, and mobile phone holder apparatus 260. FIG. 6E provides an adjustable mounting bracket 100, with a projecting member 200, projecting member bolt hole 210, and consumer electronic holder 270. FIGS. 6A, B, C, D, and E provide several variations of implementations of attachments to the adjustable mounting bracket.

Figure 7A:
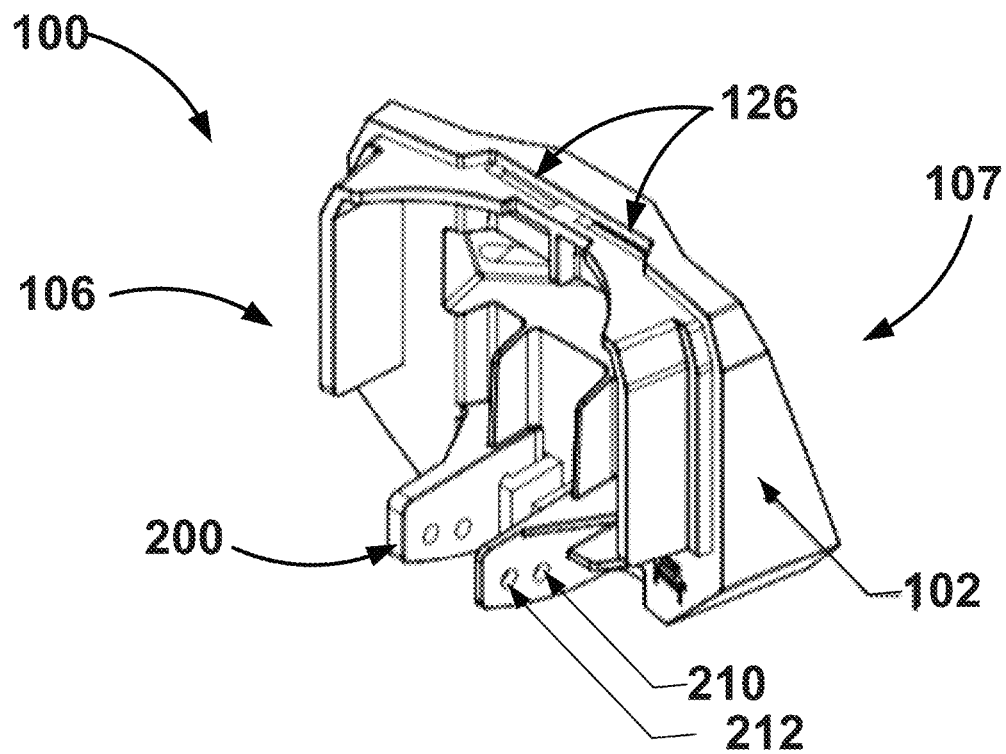
FIG. 7A provides an isometric view of the internal configuration and molding of an angled modular mounting bracket with adjustable angle support and FIG. 7B is an isometric view of an angled mounting bracket with technology storage space.

FIG. 7A provides an isometric view of an implementation of an adjustable mounting bracket 100 with an angled body portion 102, projecting member 200, and projecting member bolt holes 210, 212. In some implementations, the angled body portion 102 may have one or more connection slots 126 located at the top of the front side 106 of the body portion. These slots 126 receive and secure the chosen attachment to the body portion through a "friction fit" or "snap fit" approach, that is, the resilient upper attachment flange of is inserted into the slot and the dimensions of the flange and slot act to secure and stabilize the attachment to the base.

Figure 7B:
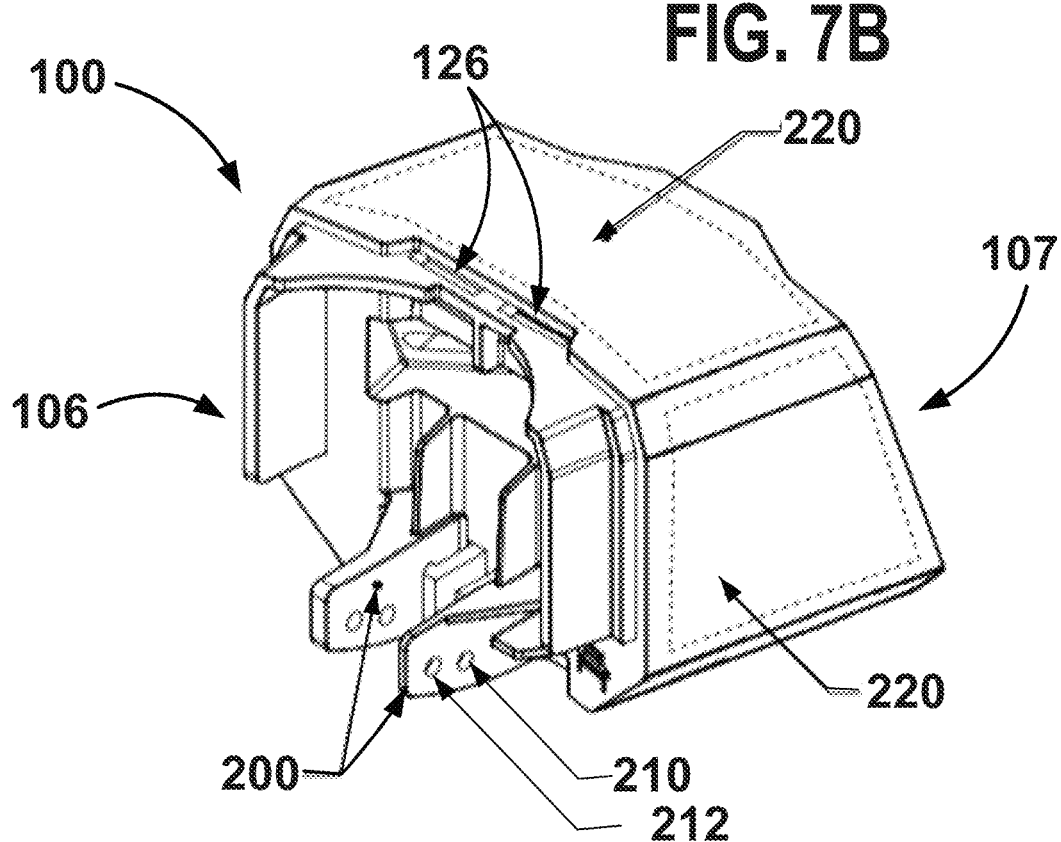

FIG. 7B provides an isometric view of one implementation of an adjustable mounting bracket 100 with an angled body portion 102, having a front side 106, a back side 107, one or more connection slots 126, projecting members 200, and projecting member bolt holes 210, 212, and optional technology storage compartment 220.

Figure 8:
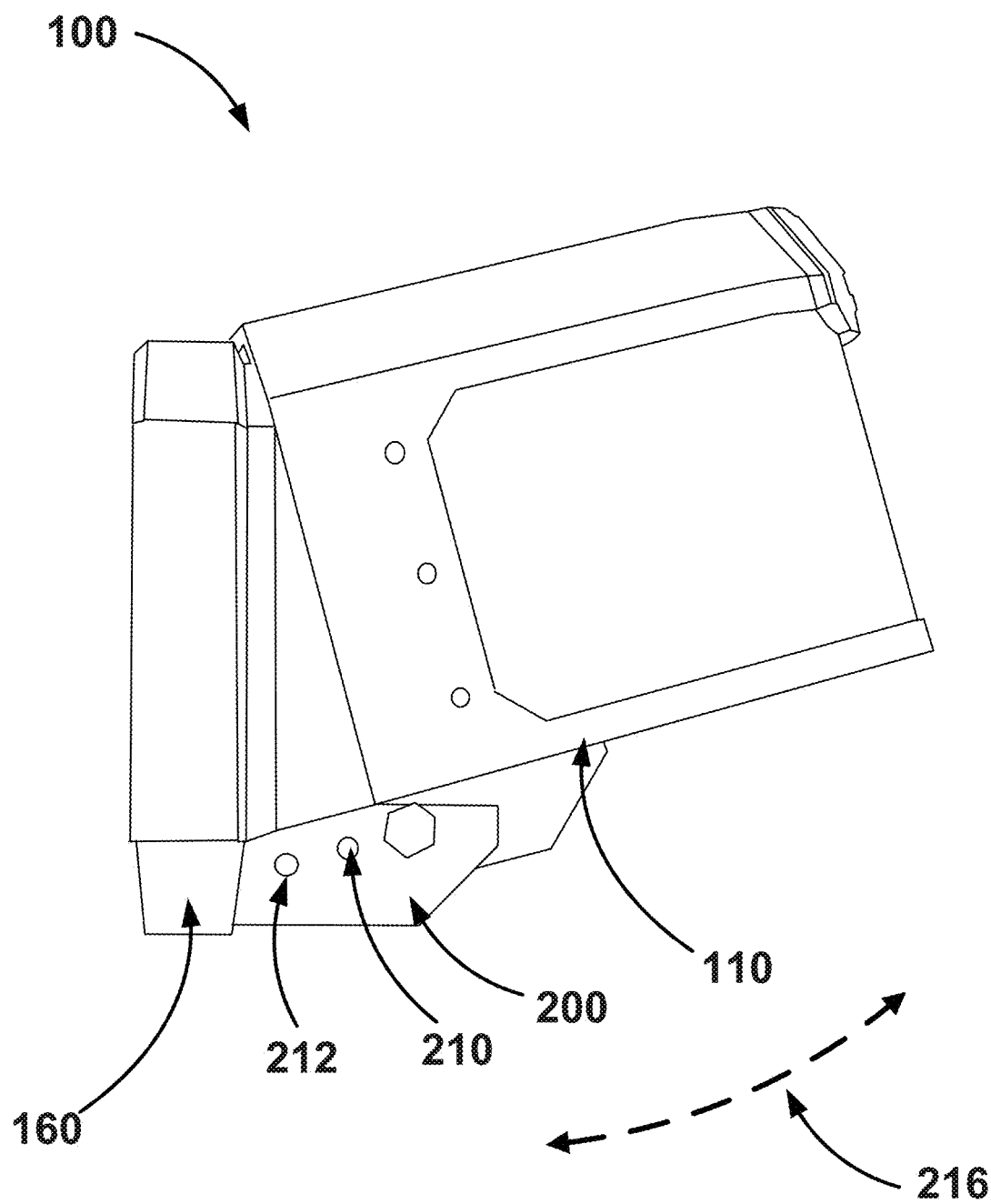
FIG. 8 provides a side view of one implementation of a modular mounting bracket with adjustable angle support connected to a cupholder and advertising apparatus.

FIG. 8 provides a side view of an adjustable mounting bracket 100 with a flat body portion 160, projecting member 200, and projecting member bolt holes 210, 212. This FIG. 8 demonstrates how the tilt or cant of the cupholder attachment 110 can be adjusted. Other attachments could likewise be adjusted to attach and project from the mounting bracket at different angles depending on the application. Arrow 216 shows how an attachment while secured at the top of the mounting bracket via flanges and slots, may allow the attachment to rotate with an arc-like trajectory relative to the flat body portion 160.

Figure 9:
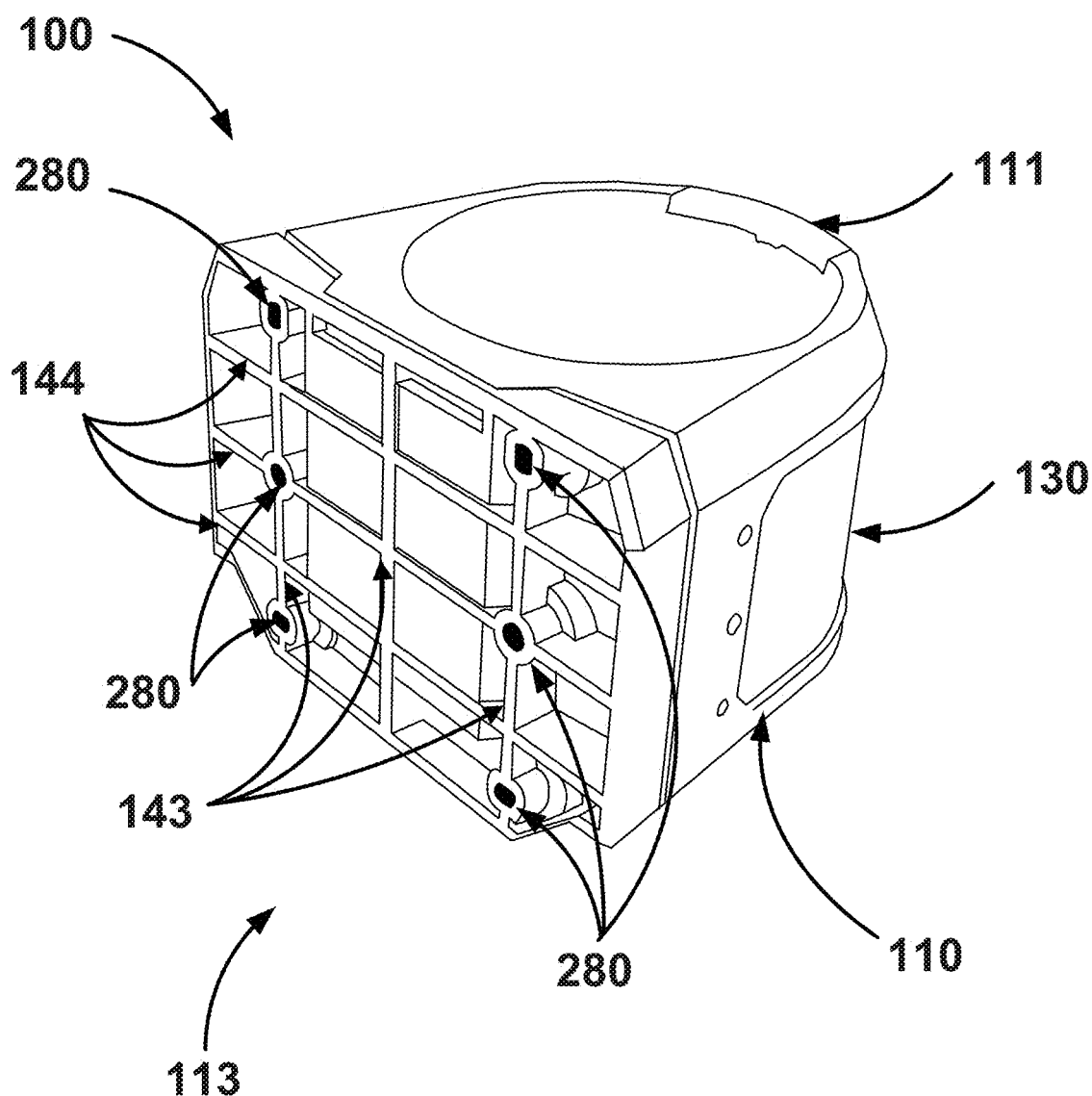
FIG. 9 provides an isometric view from the back of a modular mounting bracket with adjustable angle support connected to a cupholder and advertising apparatus in retracted position.

FIG. 9 shows an isometric view from the back of an adjustable mounting bracket 100 with connected to a cupholder 110 and advertising apparatus 130 in retracted position. This view of the mounting bracket 100 shows the back side 113 that has mounting apertures 280. These mounting apertures (or mounting holes) may be fewer in number in other implementations of the adjustable mounting bracket hereof. The mounting apertures 280 support and secure the adjustable mounting bracket 100 to the different mounting surfaces whether it be a seat stanchion, vertical mounting surface, or angled and/or reclined mounting surface (none of which are shown in this FIG. 9). The back side 113 may have one or more vertical support members 143 and one more horizontal support members 144 that provide structural integrity and support for the body portion of the mountable bracket.

Figure 10:
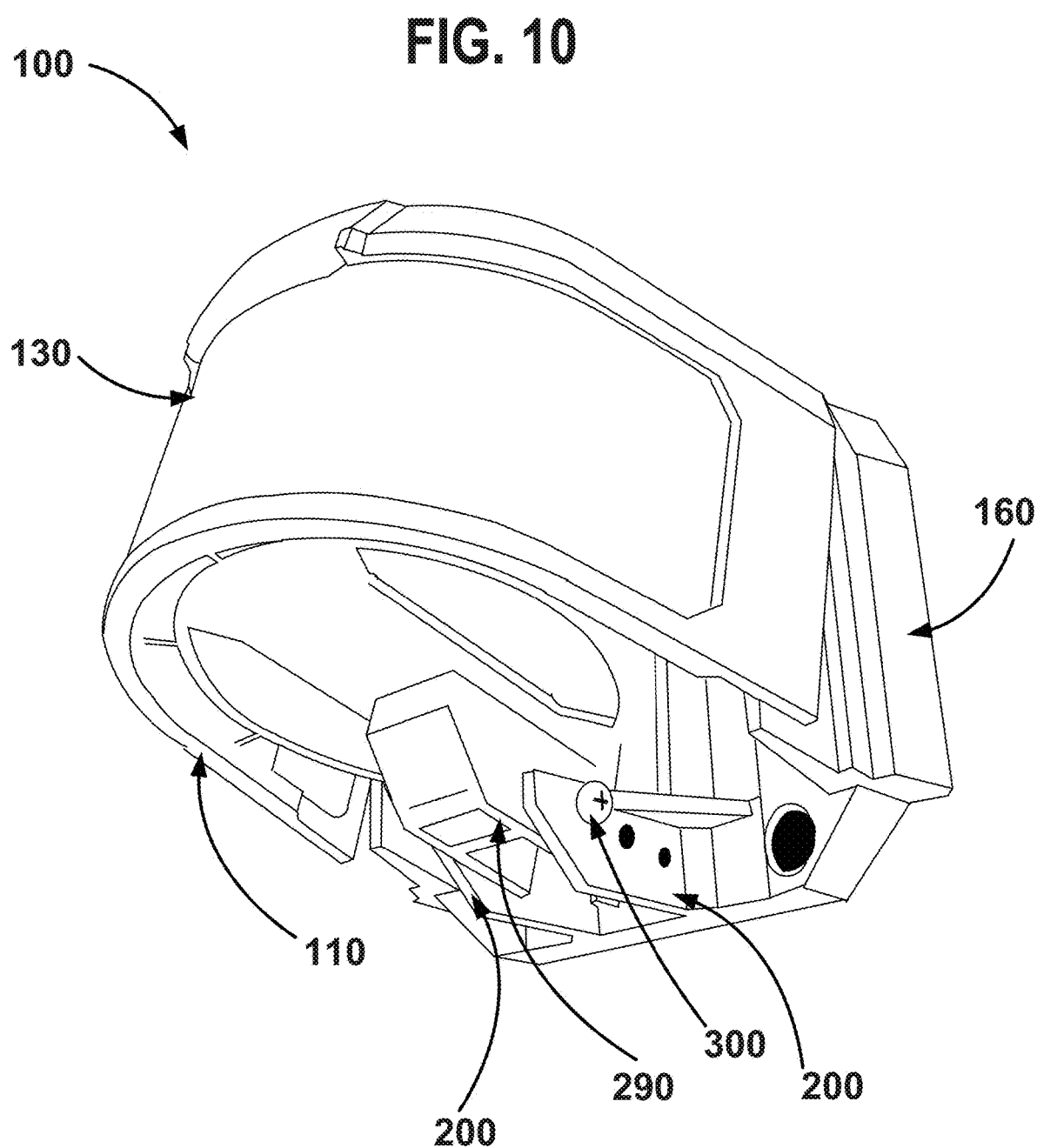
FIG. 10 provides an isometric view from the front and underneath of a modular mounting bracket with adjustable angle support connected to a cupholder and advertising apparatus in one of several adjustable positions.

FIG. 10 provides yet another isometric view from the front and underneath of an adjustable mounting bracket 100 connected to a cupholder 110 and advertising apparatus 130. The projecting members 200 project outwardly from the flat body portion 160, to support and connect with the attachment flange 290 (here the attachment flange 290 has two flanges 290a and 290b) of the cupholder 110 attachment. The support bolt 300 passes through the projecting member bolt hole (210, not shown) and through the attachment flange 290 to a second projecting member 200, where it may be secured in place by a nut and washer, or via a threaded connection of the bolt hole of the projecting member. The support bolt 300 is removable allowing the several attachments (described elsewhere) to be secured and placed at differing positions on the projecting members.

Figure 11:
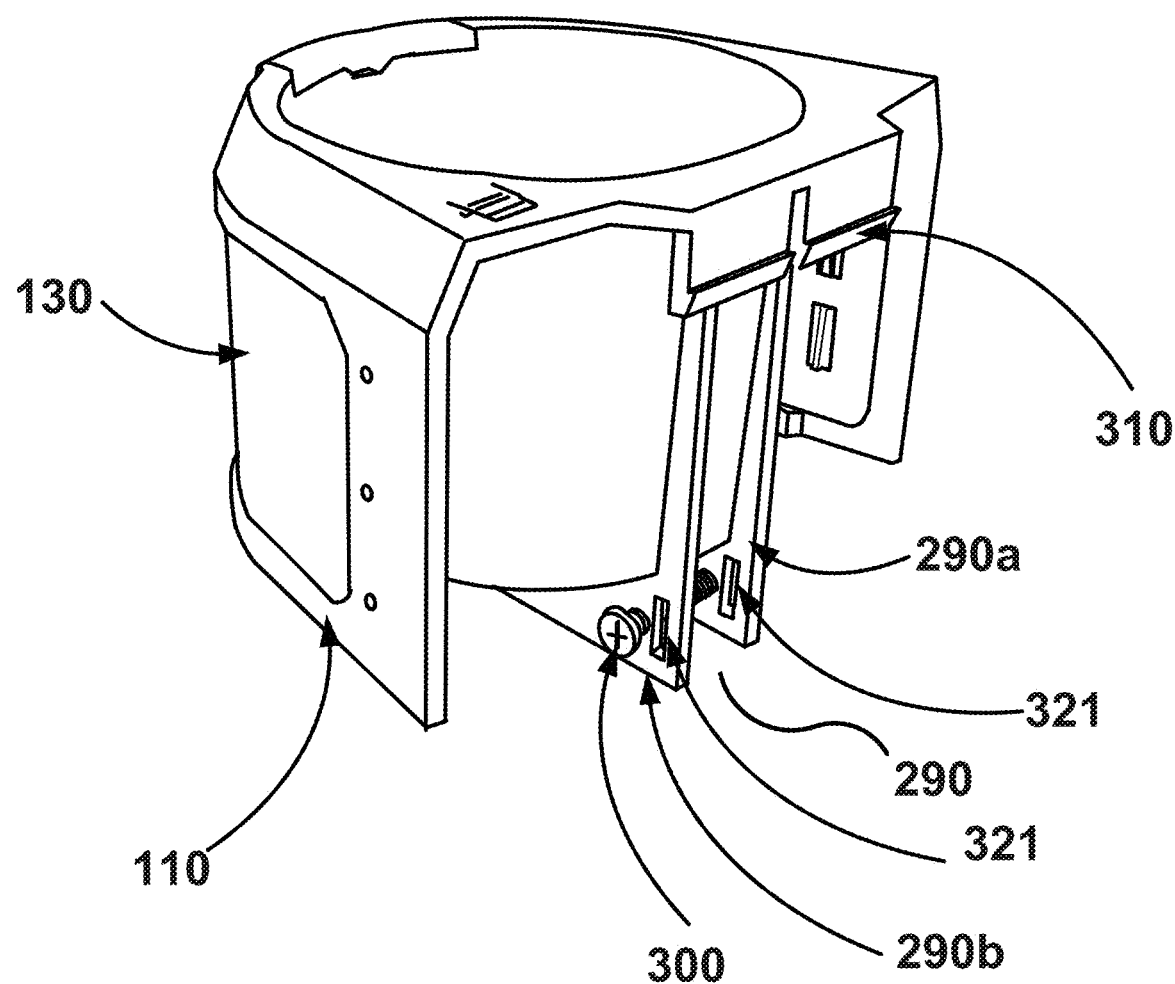
FIG. 11 provides a respective view of yet another version of an advertising apparatus hereof, wherein the advertising apparatus is adapted to be affixed to a support structure such as a cupholder.

FIG. 11 provides another isometric view of an advertising apparatus hereof, wherein the advertising apparatus 130 is adapted to be affixed to a support structure such as a cupholder 110. This view also shows the attachment flange 290, the support bolt 300, the upper attachment flange 310 of the attachment and securing/locking tab holes 321 which are described in more detail with FIG. 15B and FIG. 15G, inter alia.

Figure 12:
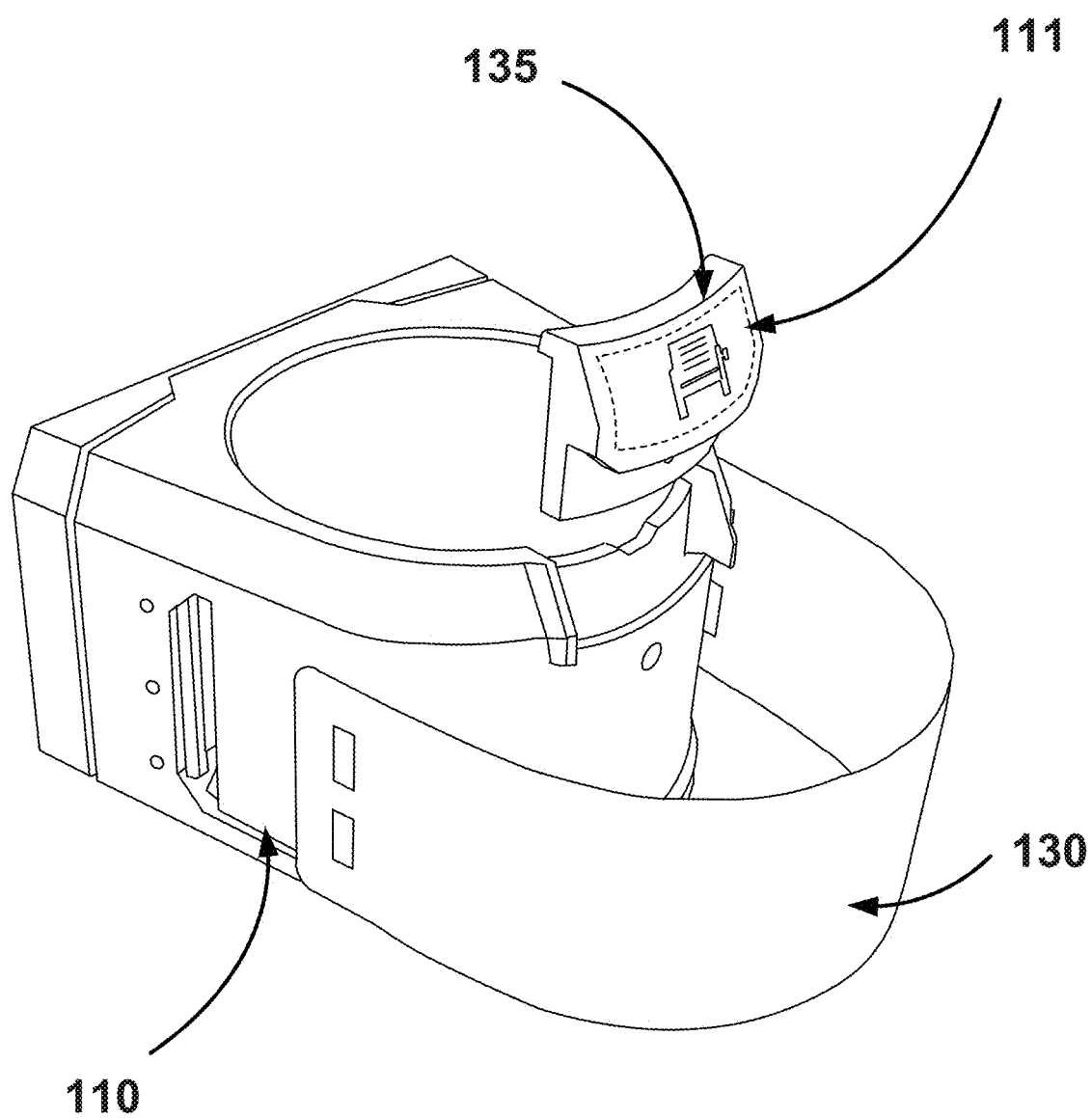
FIG. 12 provides a partially exploded view of yet another version of a modular mounting bracket with adjustable angle support connected to an advertising apparatus hereof, wherein the advertising apparatus is adapted to be affixed to a support structure such as a cupholder.

FIG. 12 provides another isometric view of an advertising apparatus hereof, wherein the advertising apparatus 130 is adapted to be affixed to a support structure such as a cupholder 110. FIG. 12 also shows that the advertising apparatus 130, in this case an appurtenant panel, may be detachable from the support structure 110, noting that this may be attached to the body portion 109 by a variety of methods and/or devices. Further, an emblem member 111 is shown which may also be adapted to be integrated or attached to the cupholder 110, or other attachment apparatus. The area outlined by the dashed line 135 shows that the emblem member 111 provides an addition surface for an advertisement or sponsorship to be placed. This advertisement may be a simple as a sticker; however, other implementations intricate designs or logos may be molded in to or on the emblem as well.

FIG. 13 includes sub-part FIGS. 13A, 13B, 13C, 13D, 13E, 13F, 13G, and 13H and provides a perspective view, several plan views, side views, a cut-away view, an enlarged view of a detailed area of the mountable bracket and cupholder and advertising apparatus hereof.

FIG. 13A provides a front perspective view of one implementation of a cupholder attachment 110, including an emblem member 111, advertising apparatus 130, and attachment flange 290. In FIG. 13A, the dashed line 163 is provided in relation to FIG. 13G, described in more detail below.

Figure 13C:
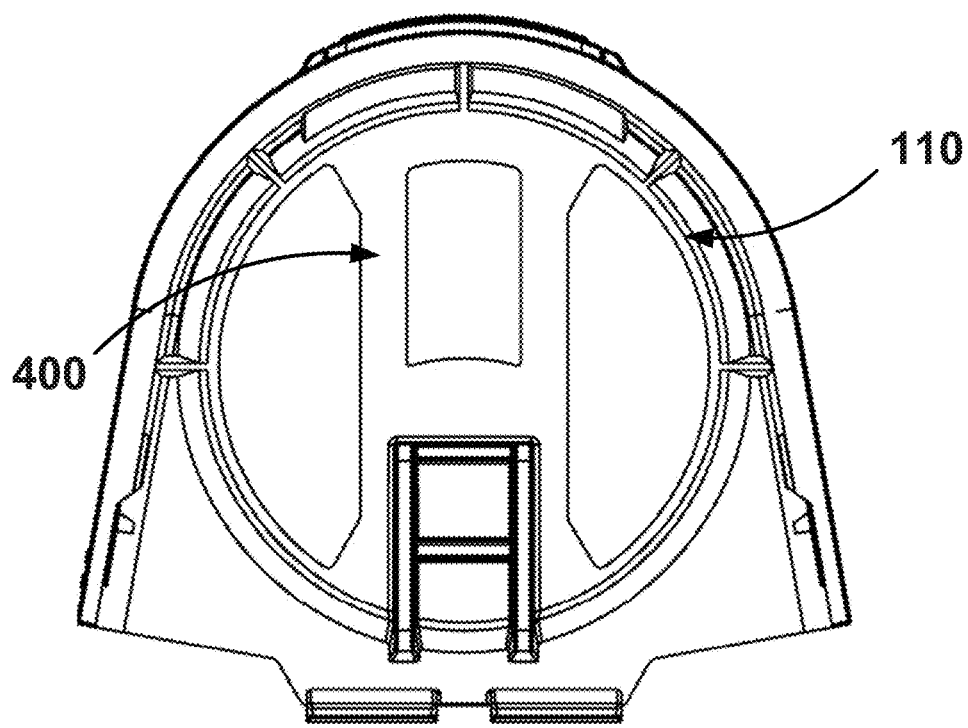
FIG. 13C provides a bottom plan view.
Figure 13D:
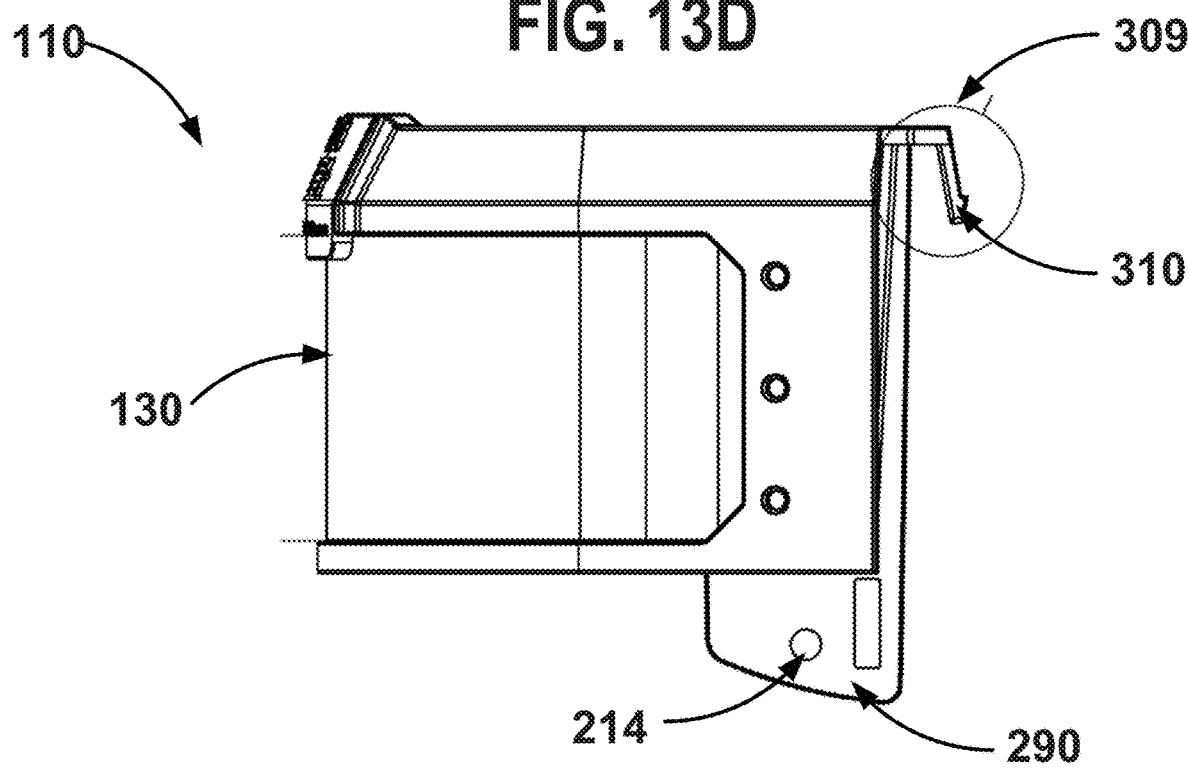
FIG. 13D provides a side elevation view.
Figure 13E:
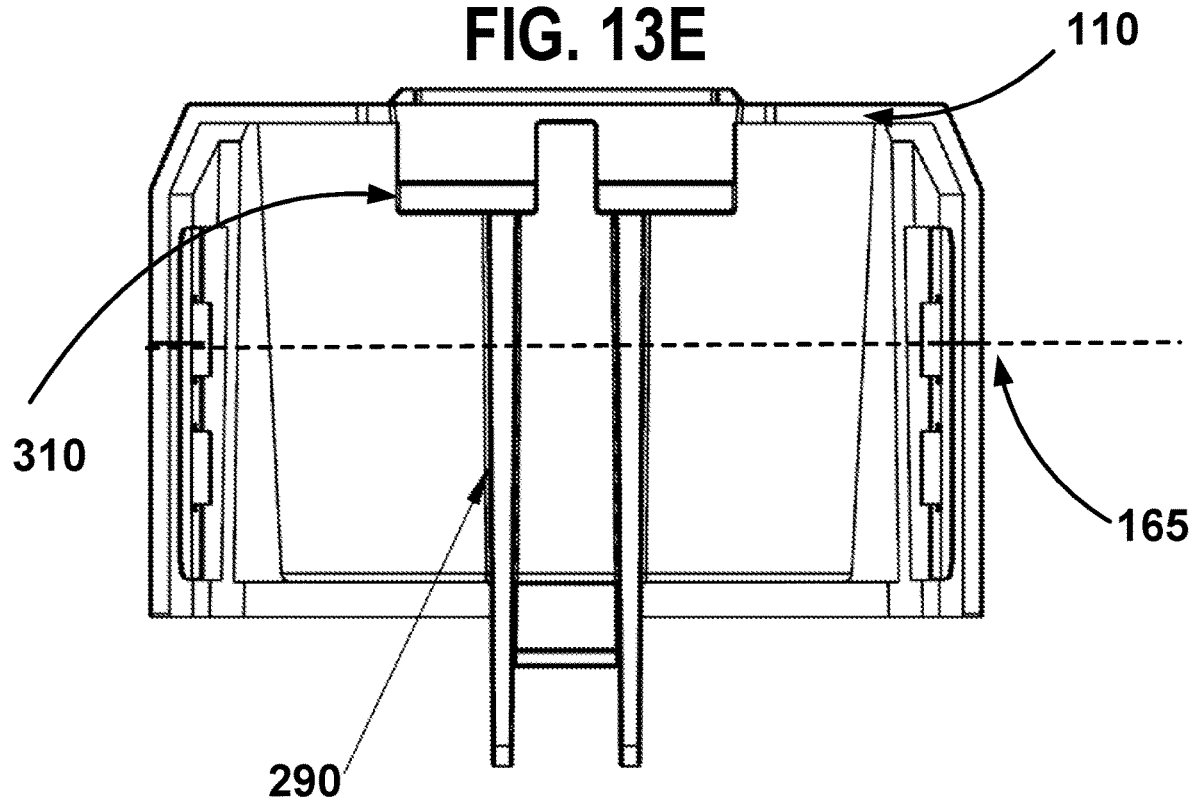
FIG. 13 includes sub-part FIGS. 13A, 13B, 13C, 13D, 13E, 13F, 13G, and 13H.
FIG. 13A provides a front elevation view.
FIG. 13B shows a top plan view.
FIG. 13F provides a cut-away view when viewed from the top.
FIG. 13G shows a side cut-away view.
FIG. 13H provides an enlarged view of a detailed area of an attachment mechanism (or flange) that may be configured for use with the adjustable mounting bracket and other implementations of an advertising apparatus hereof.
Figure 13F:
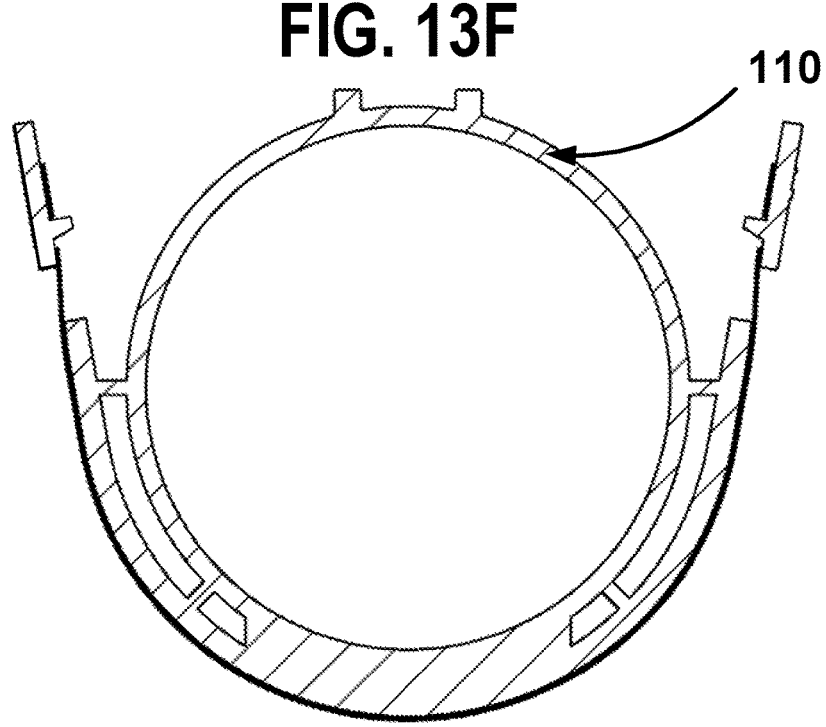
Figure 13G:
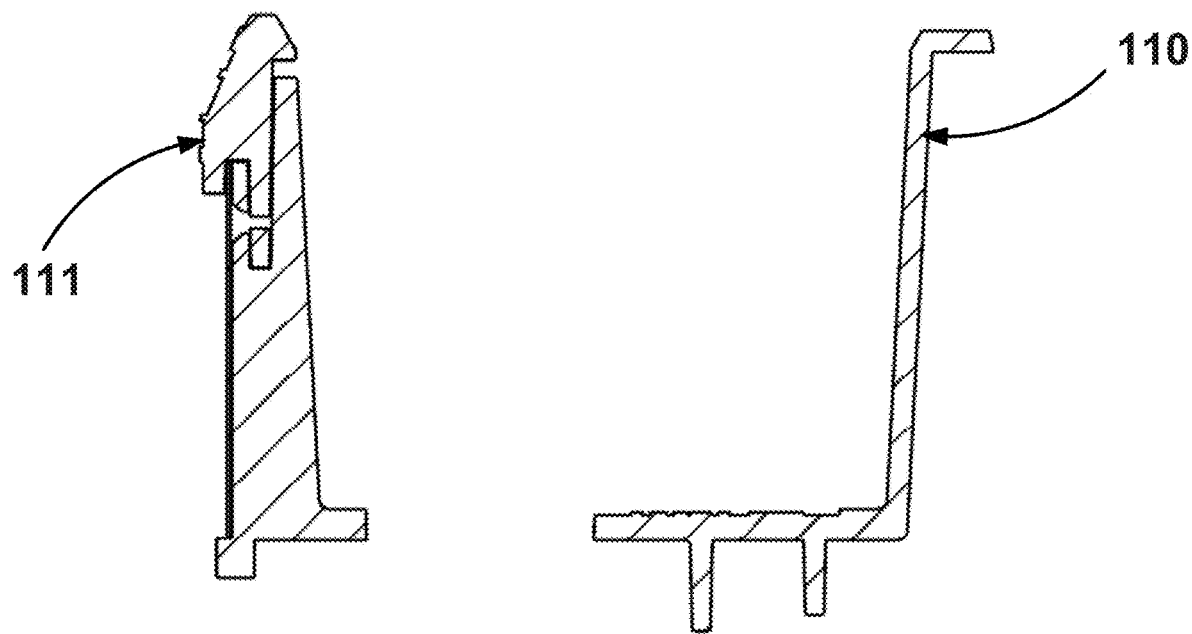
Figure 13H:
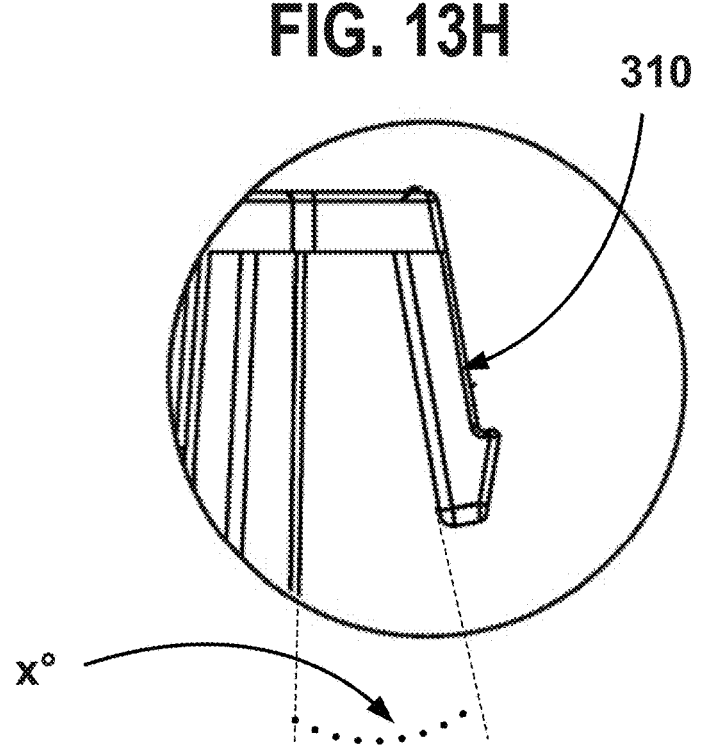

FIG. 13B provides a plan view (from the top) of a cupholder attachment and advertising apparatus hereof, including the cupholder 110a and emblem member 111. Also depicted is the cupholder support member 400, which may support a beverage container when placed in the cupholder 110. As depicted, the cupholder support member 400, may be molded or fabricated to include branding or sponsorship information on the support member, as shown by the boxes of dashed line 401 and 402. FIG. 13C provides a plan view (from the underside) of an implementation of a cupholder attachment 110 and cupholder support member 400. FIG. 13D provides a side elevation view of a cupholder attachment 110, including the attachment flange 290, attachment flange bolt hole 214, an updateable, replaceable, or advertising device 130, detailed area 309, and upper attachment flange 310. FIG. 13E provides a view of the back of the cupholder attachment 110, including the upper attachment flange 310, and shows how the attachment flange 290 may also run vertically on the back surface of the cupholder attachment 110. FIG. 13F provides a cut-away plan view the cupholder attachment hereof at approximately where dashed line 165 intersects with the cupholder attachment on FIG. 13E. FIG. 13G provides a cut-away side view of an implementation of the cupholder attachment 110 and emblem member 111 hereof, located at the dashed line 163 of FIG. 13A. FIG. 13H provides an enlarged view of detailed area 309 including the upper attachment flange 310. The upper attachment flange may be configured at a slight angle, here, x°, away from the cupholder attachment 110. The angle, x°, may be approximately five (5) to fifteen (15) degrees; however, in the implementation as shown the angle of the upper attachment flange is approximately ten degrees (10°). The angling of this upper attachment flange may help hold an attachment secure, provide some additional stability, and may also provide a pivot point for the attachments while they are connected to the body portion of the mounting bracket.

Figure 14A:
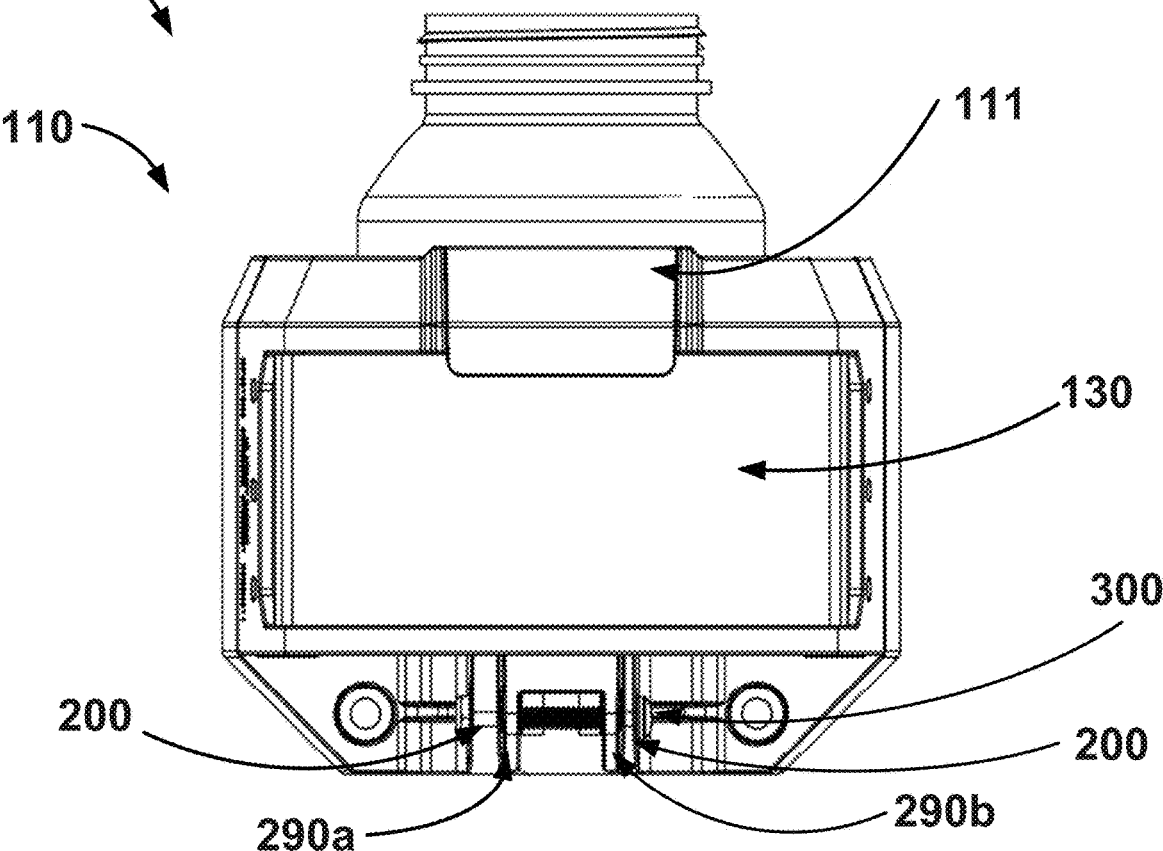
FIG. 14, which includes sub-part FIGS. 14A, 14B, 14C, 14D, 14E, and 14F, provides views of implementations of the mountable bracket, cupholder attachment, and advertising apparatus hereof; specifically, FIG. 14A provides a front elevation view.
FIG. 14B provides a side view.
FIG. 14C provides a plan view from the bottom side.
FIG. 14D provides a back elevation view.
FIG. 14E provides an isometric view from the front and bottom.
FIG. 14F provides an isometric view from the back and bottoms of the mountable bracket, cupholder, and advertising apparatus hereof.
Figure 14B:
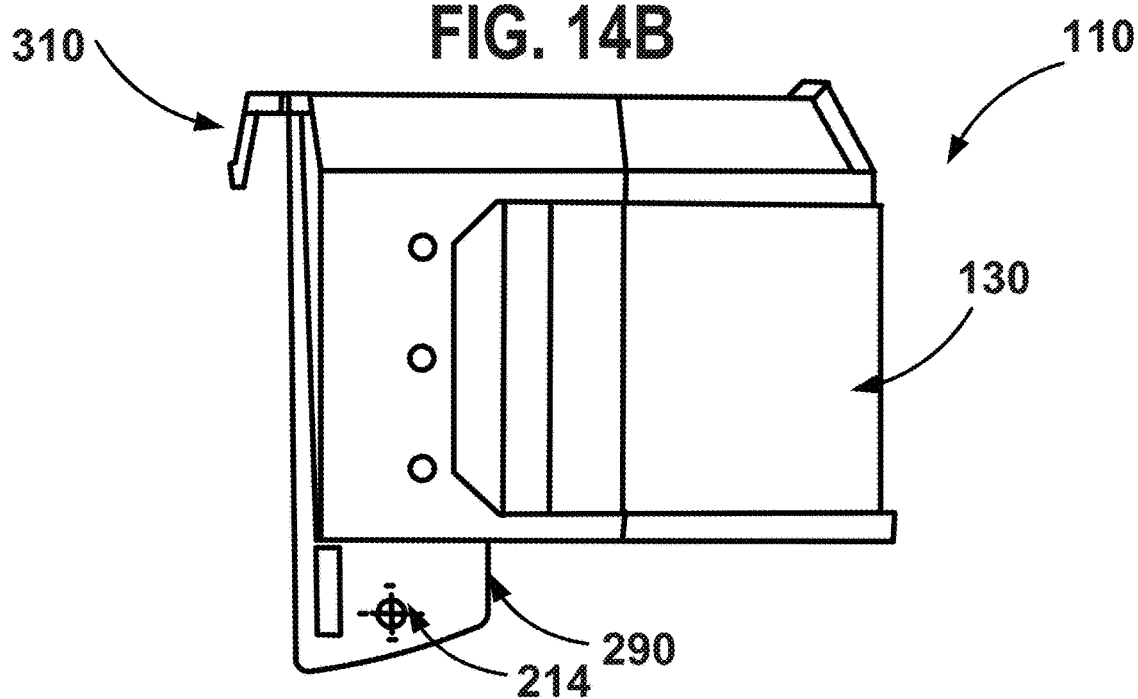

FIG. 14 includes sub-part FIGS. 14A, 14B, 14C, 14D, 14E, and 14F that provide one or more of perspective views, side views, plan views, and isometric views of one implementation of the mountable bracket, cupholder, and advertising apparatus hereof. FIG. 14A provides a front elevation view of one implementation of a mounting bracket 100 hereof, including a cupholder attachment 110, an emblem member 111, advertising apparatus 130 here an appurtenant panel, and attachment flanges 290a/290b. This view demonstrates that in this implementation the attachment flanges 290a/290b are configured to fit inside of the projecting members 200 of a flat or angled body or base portion, described inter alia. Also visible is the support bolt 300 that extends through the bolt holes of the body portion and the bolt holes of the attachment portion to fix the cupholder attachment 110 at a desired angle relative to the mounted body or base portion. FIG. 14B provides a side elevation view of a cupholder attachment 110, including the attachment flanges 290a/290b, attachment flange bolt hole 214, an updateable, replaceable, or advertising device 130, and upper attachment flange 310.

Figure 14C:
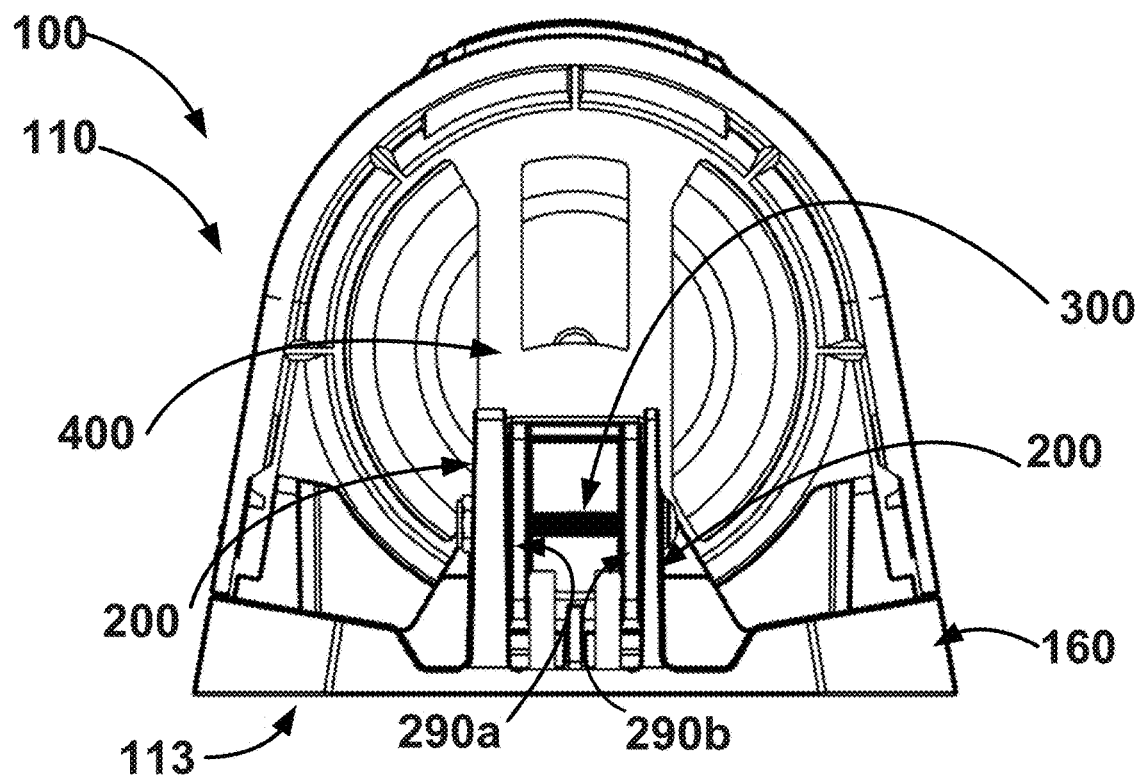

FIG. 14C provides a plan view (from the bottom) of one implementation of an adjustable mounting bracket 100 hereof with a flat body portion 160, including a backside 113, including a cupholder attachment 110 that has a support member 400 for supporting beverage containers placed in the cupholder. Also shown and demonstrated in FIG. 14C is an alternative view of how the attachment flanges 290a/290b rest inside of the projecting members 200. Further, FIG. 14C provides a support bolt 300 that is used to secure the cupholder attachment 110 to the selected position via aligning the bolt holes of the attachment flanges 290a/290b with the bolt holes of the projecting members which are described above in FIGS. 4, 5, 7 and 8, inter alia.

Figure 14D:
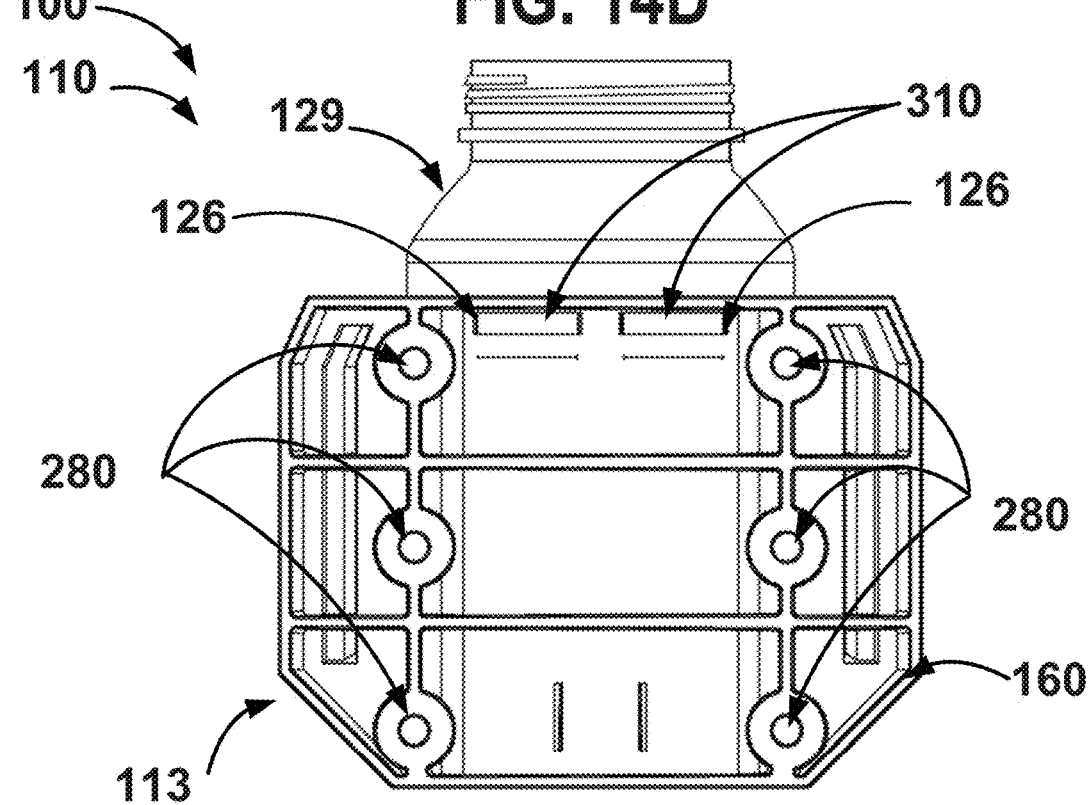

FIG. 14D provides a back elevation view of one implementation of an adjustable mounting bracket 100 having a flat back body or flat back base portion 160, having a back side 113, attached to a cupholder attachment 110 (not clearly visible from this back elevation view). The back side 113 has a series of mounting holes 280 for mounting the mounting bracket to a structure. FIG. 14D demonstrates how the upper attachment flange 310 is connected to the flat back base portion 160 via the connection slots 126. Further, this view shows how a drink container 129 may rest in the cupholder attachment 110.

FIG. 14E provides an isometric view of one implementation of an adjustable mounting bracket 100 and cupholder attachment 110. In this implementation the base portion is a flat back base 160. The projecting members 200 extend horizontally from the base and provide one or more bolt holes 210, 212, that allow the chosen attachment to be supported and secured in place via the placement of a support bolt 300 that is extended through the bolt hole of one projecting member, then through the attachment flange bolt hole 214, then through the corresponding attachment flange bolt hole and projecting member bolt hole on the adjacent projecting member. Also visible from this view is the emblem 111, advertising apparatus 130, cupholder support member 400, two of the mounting bracket bolt holes 280, and a drink container 129. Although not included in this view, the developments hereof contemplate more than two bolt holes on the projecting members, as the projecting member may be constructed of different shapes and size for different applications and usages.

FIG. 14F provides yet another isometric view of one implementation of an adjustable mounting bracket 100 and cupholder attachment 110. In this implementation the base portion 160 has a flat back side 113 that is mounted to a structure, such as a stanchion or seat back (not pictured). The base portion 160 has multiple mounting bracket bolt holes 280 which are used to secure the mounting bracket to a suitable structure. The projecting members 200 extend horizontally from the base and provide one or more bolts holes as described inter alia. In FIG. 14F, only bolt hole 212 is visible, as the support bolt 300 is shown to occupy the space of bolt hole 210. FIG. 14F also shows how the attachment flange(s) 290a, 290b nestle inside of the space between the projecting members 200. The developments hereof have thus far shown that an attachment may have two attachment flanges (as in FIGS. 11 and 13a), corresponding to a left side and a right side of an attachment, as shown in several of the implementations described herein; however, the developments hereof also recognize that in some implementations one, two, three, four, five or in some instances even more attachment flanges may be used, depending on the size, dimensions, weight, and other characteristics of the attachment being attached to the mounting bracket.

Returning to FIG. 14F, also shown are connection slots 126 which facilitate the connection of the cupholder attachment 110 to the base portion 160 via the upper attachment flanges described in FIG. 7A, inter alia. Furthermore, FIG. 14F provides an advertising apparatus 130, cupholder support member 400, that are also described herein. FIG. 14F provides a base portion 160 with a flat back 113 that has multiple mounting bracket bolt holes 280, the implementation shown here has six; however, the number of bolt holes may be 1, 2, 3, 4, 5, 6, 7, 8, 9, 10, or even more bolt holes depending on the type of attachment that may be connected to the adjustable mounting bracket. For example, if a flag pole attachment such as that of FIG. 6C is attached to a mounting bracket with the developments and adjustable features hereof, in some instances, it may be desirable to construct the mounting bracket with a greater number of mounting bracket holes, such as 8 or more, as the object being supported by the mounting bracket attachment may be heavier, or may be subject to additional strain, such as from natural forces such as wind gusts, and therefore it may be desirable to have an additional number of bolts and bolt holds to secure the mounting bracket to the support structure.

Figure 15A:
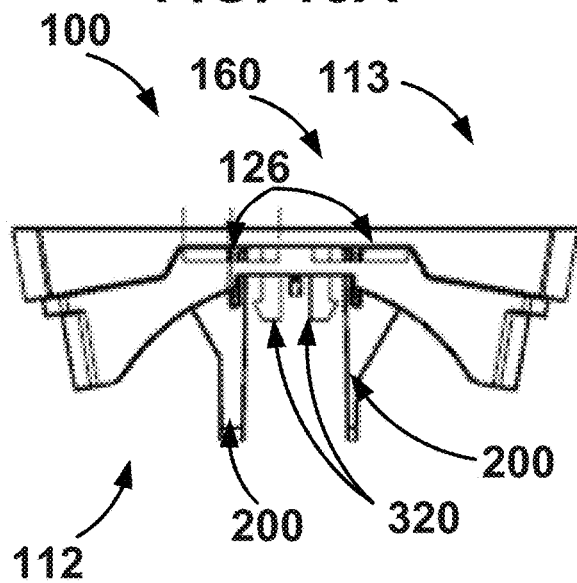
FIG. 15A provides a top plan view of a mounting bracket.
Figure 15B:
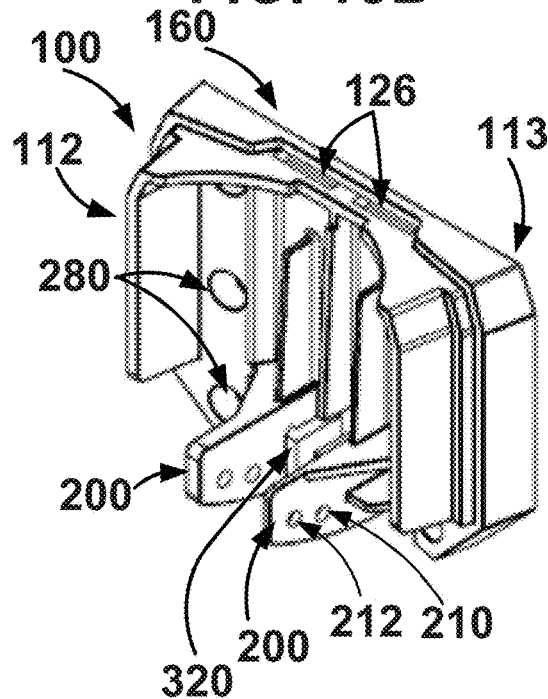
FIG. 15B shows an isometric view of a mounting bracket.
Figure 15C:
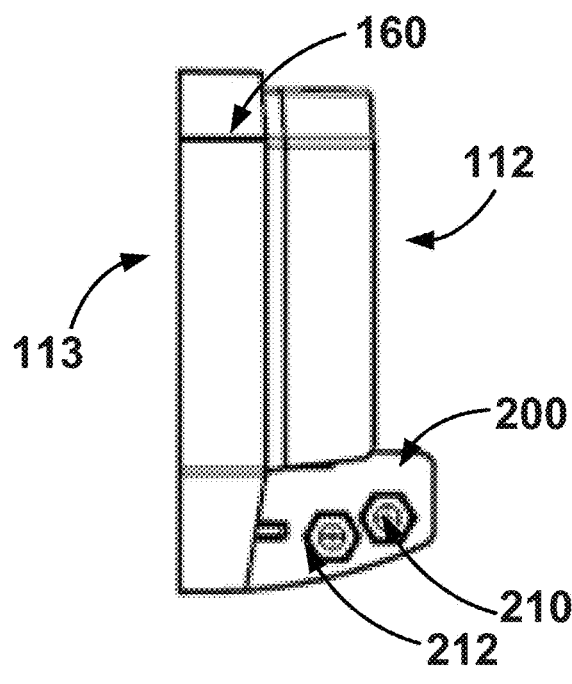
FIG. 15C provides a side view.
Figure 15D:
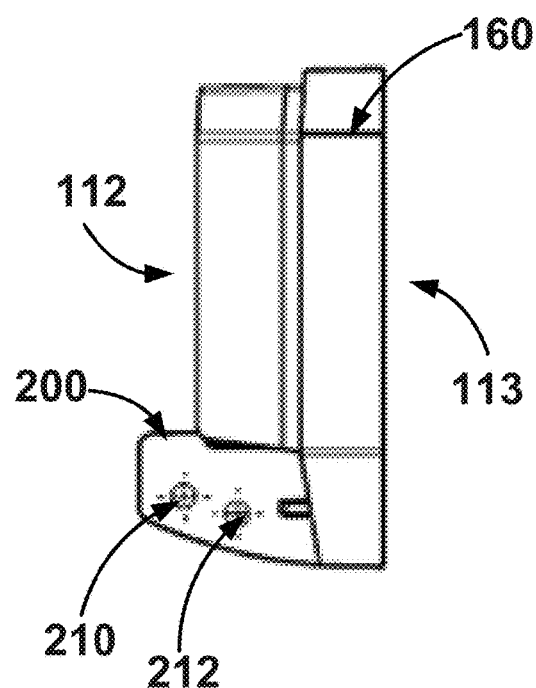
FIG. 15D provides an alternative side view as that of FIG. 15C.
Figure 15E:
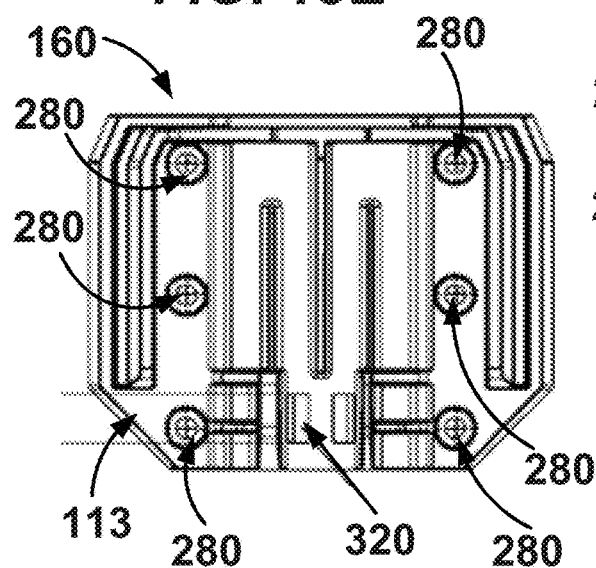
FIGS. 15E and 15F provide back elevational views of the mounting bracket.
Figure 15F:
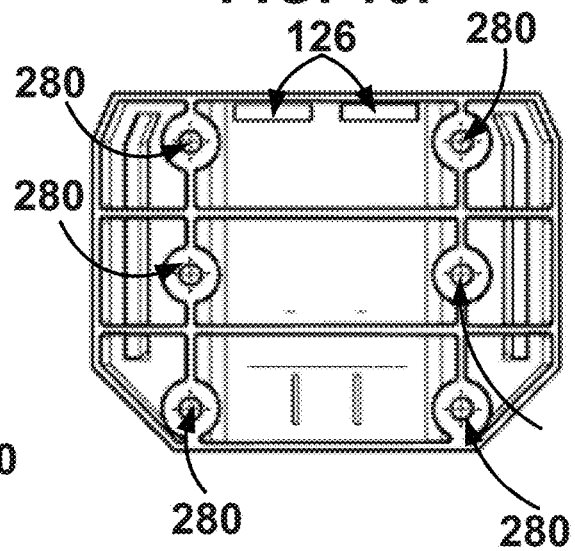
Figure 15G:
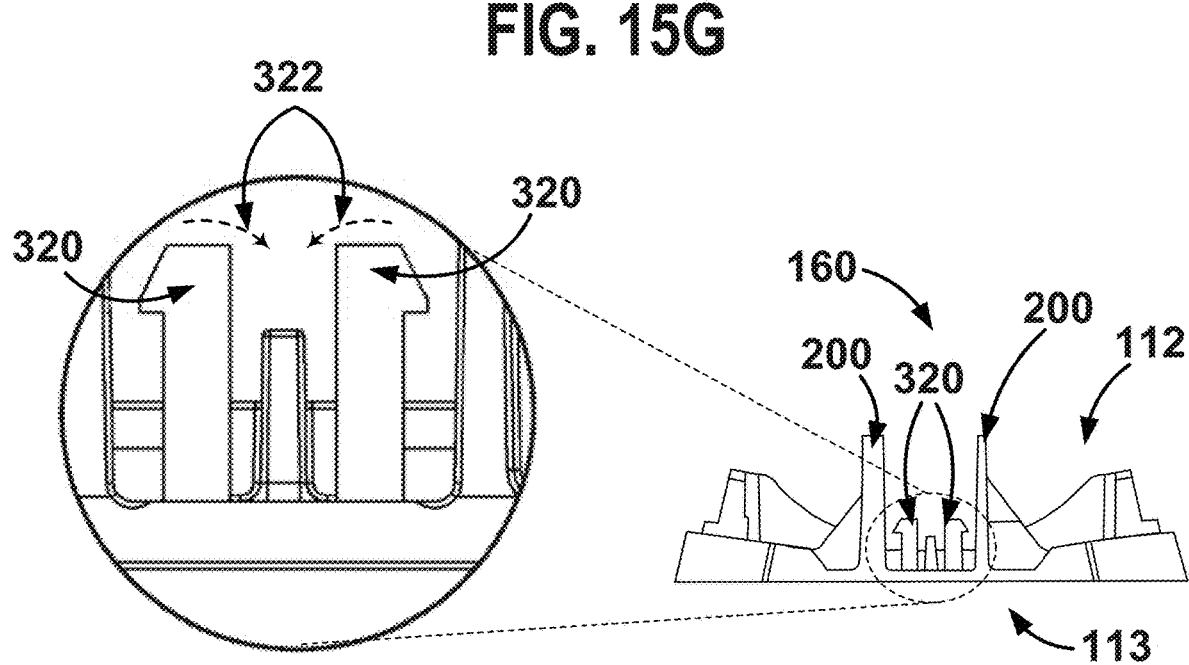
FIG. 15G provides an enlarged view of a detailed area of the mounting bracket.

FIG. 15 includes sub-part FIGS. 15A, 15B, 15C, 15D, 15E, 15F, 15G, and 15H, and these views include a plan view, an isometric view, two side views, two back elevation views, and enlarged view of a detailed area of the mounting bracket 100 having a flat black 113. FIG. 15A is a plan view of the mounting bracket 100 having a front side 112 and a back side 113, including a flat backside body portion 160. The projecting members 200 extend from the front side 112 and are described in further detail throughout this application. The bracket in FIG. 15A also provides upper connection slots 126 which allow the upper attachment flanges (described elsewhere) to connect to the body portion 160. Also provided in FIG. 15A are securing tabs or locking tabs 320. The securing tabs or lock tabs 320 may project horizontally from the mounting bracket 100 and fasten and secure a desired attachment to the mounting bracket 100. One feature of these tabs is that if the attachment is adjusted to a 0° of cant, or a fully retracted position, the support bolt (described in FIG. 14A, inter alia) may not be necessary to secure, retain, or support the attachment in the retracted position. The securing tabs or locking tabs 320 may be resiliently deformable so that the securing or locking tabs 320 will return to or toward their original disposition and shape after having been forced to move during the installation of an attachment or during removal of an attachment. FIG. 15G provides an enlarged image of the securing tabs or locking tabs 320 which are molded into the mounting bracket and project and/or extend therefrom. The dashed lines of with arrows 322 demonstrate that the securing tabs 320 may be pushed towards each other which would allow the tabs to be inserted in to securing slots (aka securing/locking tab holes as in FIG. 11) located on the desired attachment, in some instances, the securing slots may be located on the attachment flange portion of the attachment. In some implementations the securing tabs may have ends that have perpendicular projections, protrusions, spurs, hooks, points, or extensions that facilitate the securing tabs connection to the desired attachment.

FIG. 15B provides an isometric view of an implementation of the mounting bracket described in FIG. 15A. From this view, the mounting bolt holes 280 can be seen and the projecting member bolt holes 210, 212 are also visible. The shape and configuration of other portions of the front side 112 may be variable depending on a variety of factors.

FIG. 15C and FIG. 15D provide a side elevation views of one implementation of an adjustable mounting bracket 100 with a flat body portion 160, a front side 112, a back side 113, one or more projecting members 200, and projecting member bolt holes 210, 212. The back side 113 is the side that is mounted to a support structure, whether a seat back, stanchion, or other suitable structure.

FIG. 15E and FIG. 15F provide back elevation views of a back side 113 of an a flat-backed body portion 160. The mounting bolt holes 280 are visible in these depictions. FIG. 15 F also points out the connection slots 126 that are visible from such a perspective.

As mentioned previously, FIG. 15G provides an enlarged image of the securing tabs or locking tabs 320. These locking tabs 320 (or sometimes referred to as securing tabs 320) extend from the front side 112 of the body portion 160. The locking tabs/securing tabs could similarly be used, implemented, or configured to work with an angled body portion such as the implementations shown in FIG. 17A, FIG. 17B, inter alia.

Figure 15H:
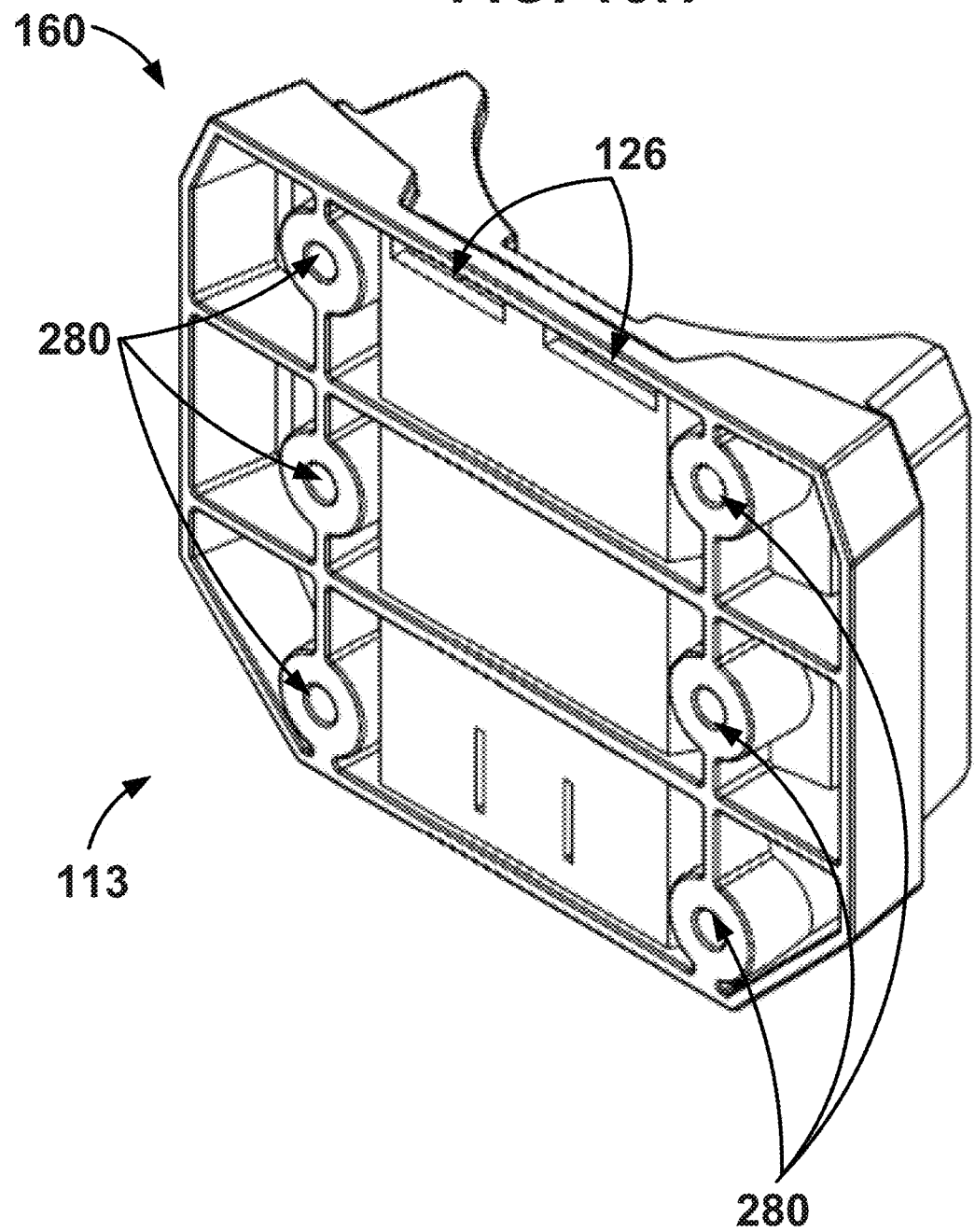
FIG. 15H shows an additional isometric view.

FIG. 15H provides yet another isometric view of an example of an implementation hereof including a flat backed body portion 160, where the back side 113 is flat which allows the body portion to be mounted to the surface of a substantially vertical structure. FIG. 15H is similar to that of FIG. 9 above; however, here no attachment is connected to the base, which allows for the connection slots 126 to be seen. The mounting bolt holes 280 are also clearly visible from this view.

FIG. 16 includes sub-part FIGS. 16A, 16B, 16C, 16D, 16E, 16F, and 16G, and these provide plan views, isometric views, a side view, and perspective views, of a mounting bracket with an angle built in and an implementation of a cupholder attachment is disposed therewith.

FIG. 16A provides a plan view from above an adjustable mounting bracket 100 having a back side 107 and a front side (which in this view is obscured due to the presence of the cupholder attachment 110). The cupholder attachment 110 has a cupholder support member 400 and an emblem member 111. The angled body 102 is visible from this plan view.

FIG. 16B provides an isometric view of an adjustable mounting bracket 100 having a back side 107 and a front side (which in this view is obscured due to the presence of the cupholder attachment 110). The cupholder attachment 110 has a removable emblem 111 placed into the rim of the cupholder. In this implementation, the cupholder attachment further includes an advertising apparatus 130, here, an appurtenant panel. The angled body portion 102 connects and attaches to the cupholder attachment 110. In FIG. 16B the cupholder attachment 110 is shown in a retracted position, that is, the cupholder attachment's cant or tilt is not adjusted to lift the cupholder attachment up and away from the retracted position.

Figure 16C:
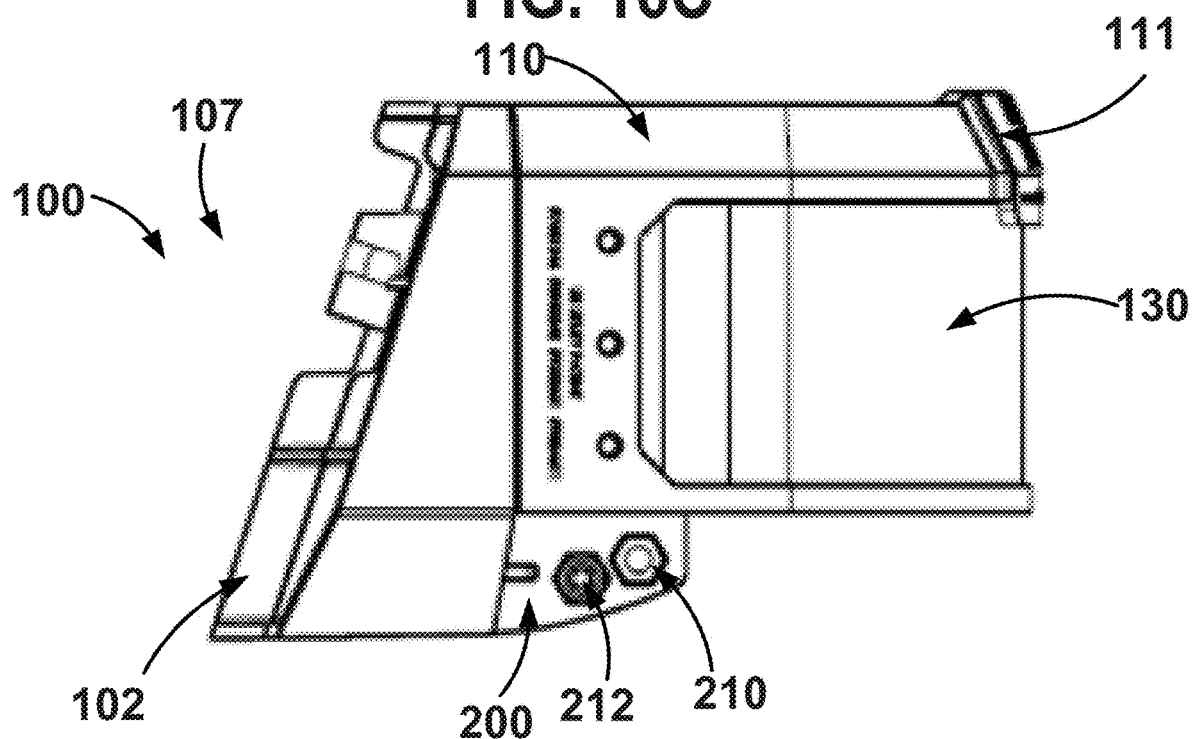
FIG. 16C shows a side view.

FIG. 16C provides an elevational side view of an adjustable mounting bracket 100 having a back side 107 and a front side (which in this view is obscured due to the presence of the cupholder attachment 110). The cupholder attachment 110 has a removable emblem 111 placed into the rim of the cupholder. In this implementation, the cupholder attachment further includes an advertising apparatus 130, here, an appurtenant panel. The angled body portion 102 connects and attaches to the cupholder attachment 110. In FIG. 16C the cupholder attachment 110 is shown in a retracted position, that is, the cupholder attachment's cant or tilt is not adjusted to lift the cupholder attachment up and away from the retracted position. The projecting member bolt holes 210, 212, can be seen on the projecting member 200.

Figure 16D:
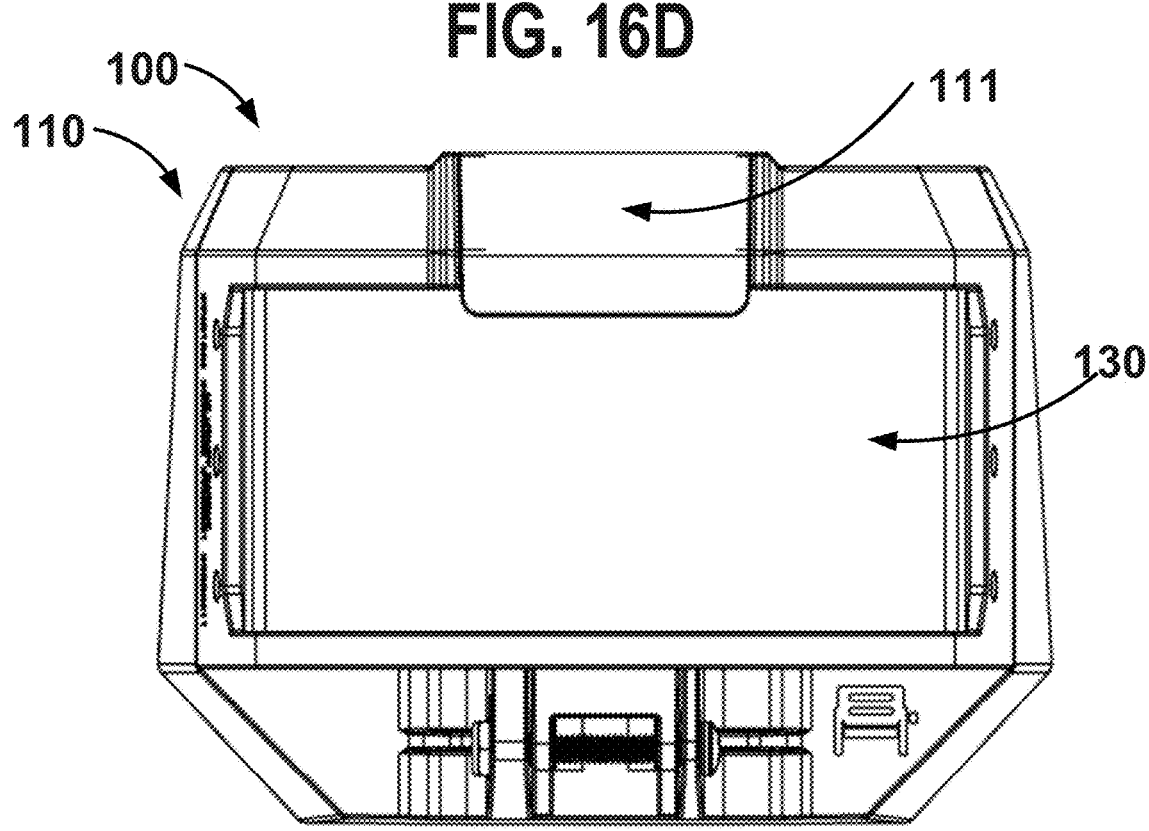
FIG. 16D provides a front elevation view.

FIG. 16D provides an elevational front view of an adjustable mounting bracket 100 including a cupholder attachment 110. Also included in FIG. 16D is an emblem 111 and advertising apparatus 130, here an appurtenant panel.

Figure 16E:
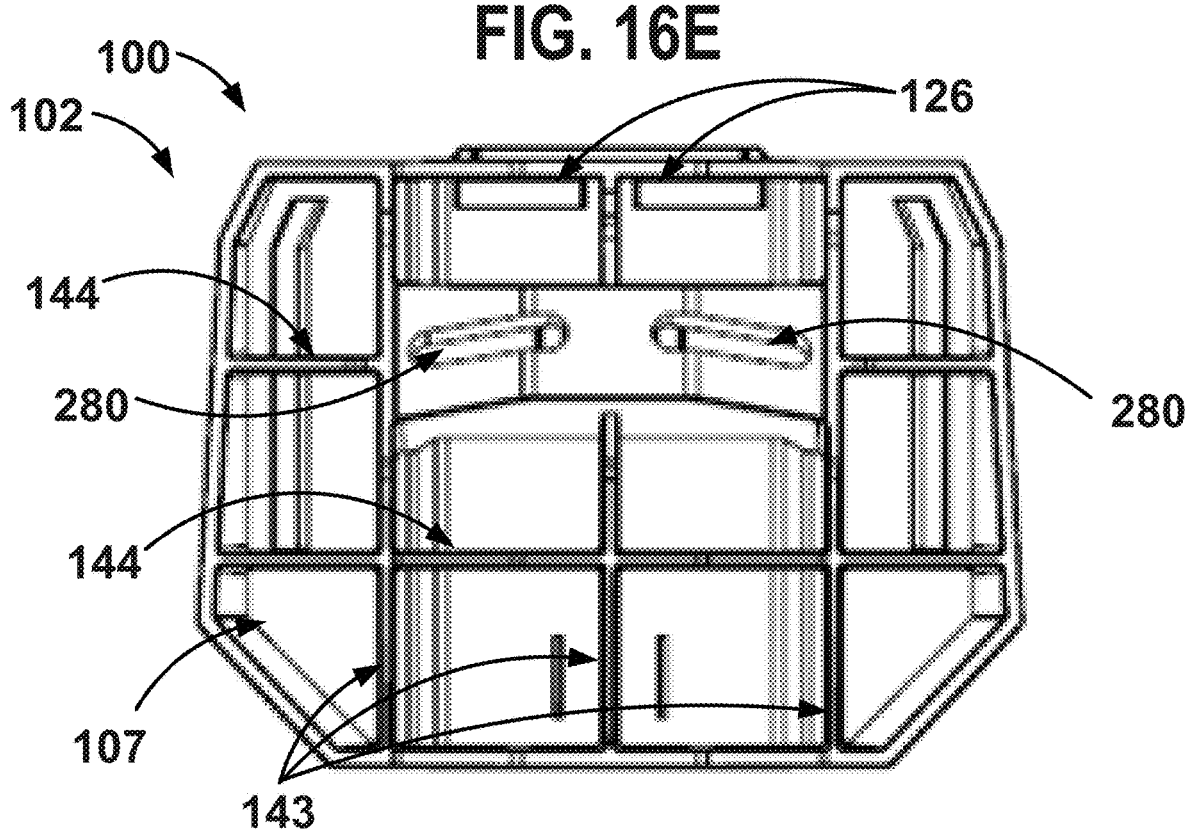
FIG. 16E provides a back elevation view.

FIG. 16E provides an elevational back view of an implementation of adjustable mounting bracket 100 with an angled body portion 102. This view shows the back side 107 of an angled body portion which is also identified and described in FIGS. 4A and 4B, inter alia. In this implementation, the mounting bolt holes 280 may be configured in a manner to allow placement of the mounting bolt at one of several locations. In this implementation, the mounting bolt holes may also be referred to as mounting bolt channels. FIG. 16E also shows the connection slots 126. This angled body portion 102 may have vertical support members 143 and horizontal support members 144 that may give the body portion sufficient structure and support to support the weight and pressure of any of the attachments that may disposed thereto or thereon.

Figure 16F:
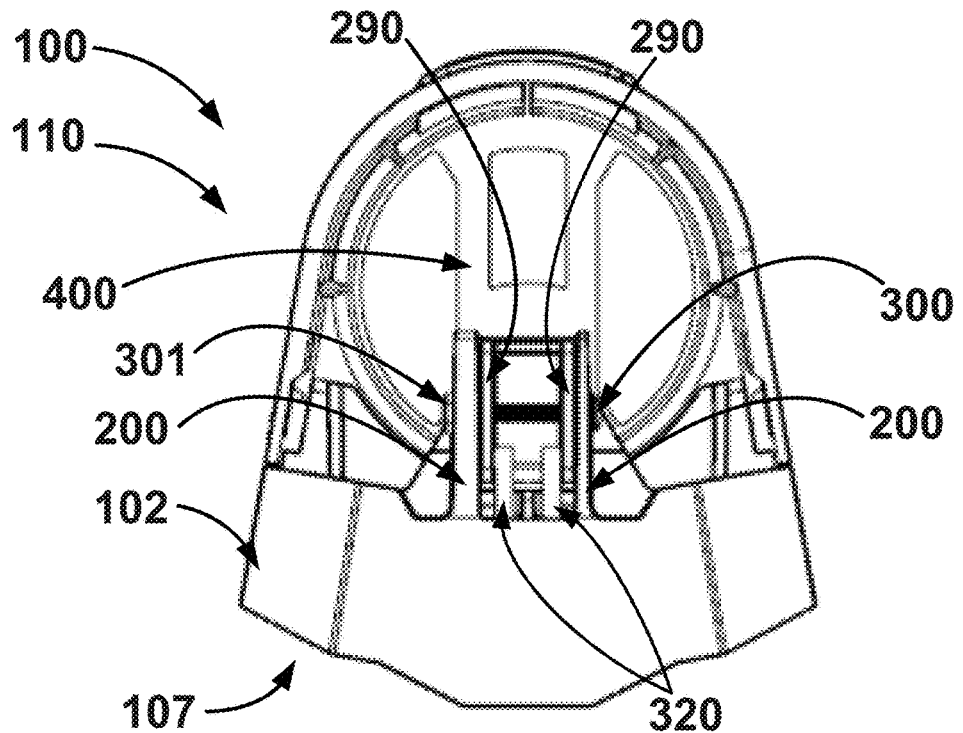
FIG. 16F provides a plan view from the bottom.

FIG. 16F provides a plan view (from the bottom) of one implementation of an adjustable mounting bracket 100 hereof with an angled body portion 102, including a backside 107, including a cupholder attachment 110 that has a support member 400 for supporting beverage containers placed in the cupholder. Also shown and demonstrated in FIG. 16F is an alternative view of how the attachment flanges 290 rest inside of the projecting members 200. Further, FIG. 16F provides a support bolt 300 that is used to secure the cupholder attachment 110 to the selected position via aligning the bolt holes of the attachment flanges 290 with the bolt holes of the projecting members which are described above in FIGS. 4, 5, 7 and 8, inter alia. FIG. 16F also shows securing tabs or locking tabs 320. FIG. 16F also includes a support bolt nut 301 that attaches to support bolt 300.

Figure 16G:
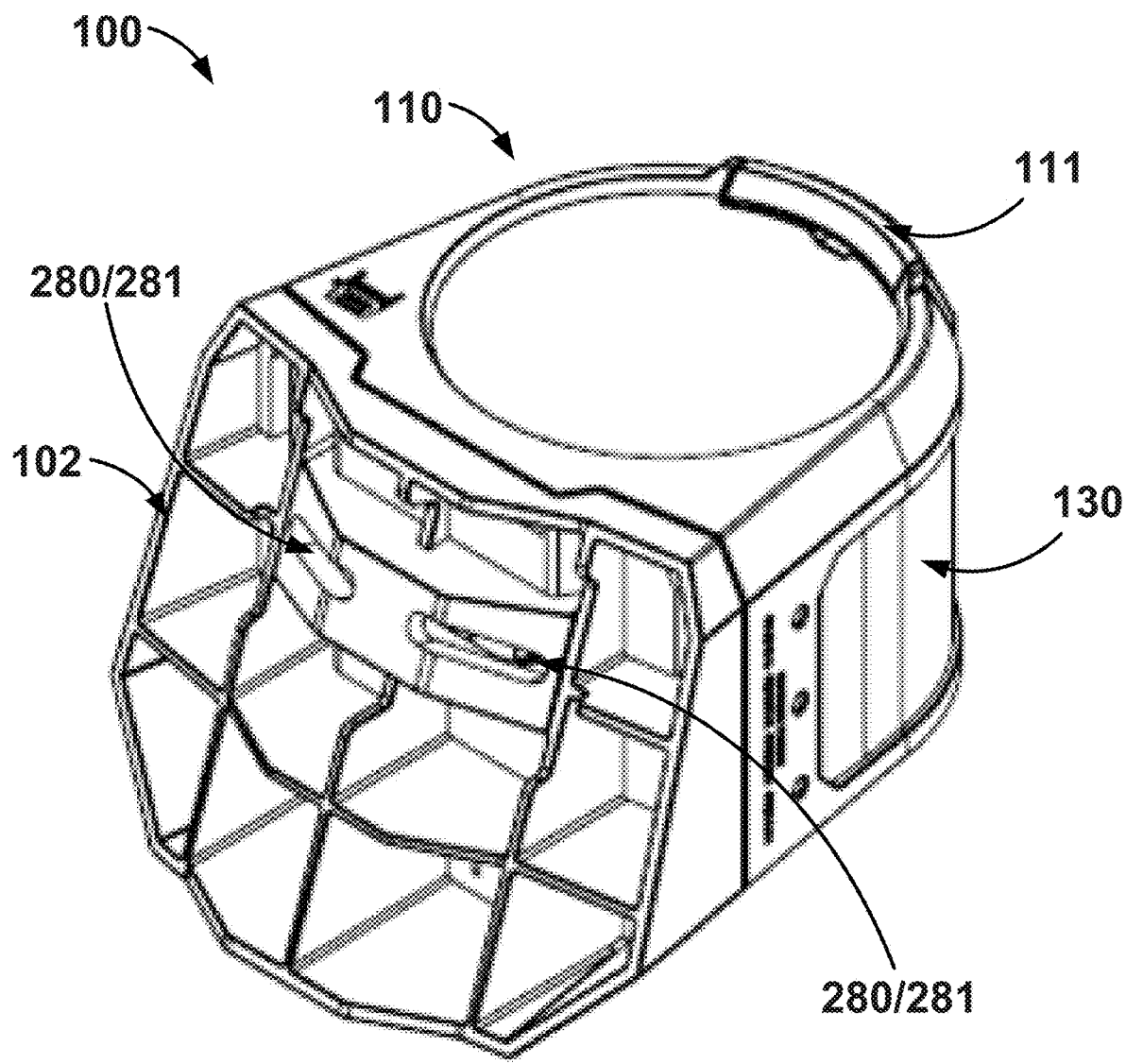
FIG. 16G provides an alternative isometric view of an exemplar implementation of a mounting bracket with an angle built in to the mounting base (or angular mounting base), cupholder attachment, and advertising apparatus hereof.

FIG. 16G provides yet another isometric view of one implementation of an adjustable mounting bracket 100 with an angled body portion 102 attached to a cupholder attachment 110. In this implementation, the mounting bolt holes 280 may be configured in a manner to allow placement of the mounting bolt at one of several locations. In this implementation, the mounting bolt holes may also be referred to as mounting bolt channels 281. Also shown in FIG. 16G is an advertising apparatus 130, in this case an appurtenant panel, and an emblem 111.

FIG. 17 includes sub-part FIGS. 17A, 17B, 17C, 17D, 17E, 17F, 17G, and 17H, and these provide one or more plan views, isometric views, elevational side views, and enlarged view of a detailed area of the mounting bracket with an angle built in.

Figure 17A:
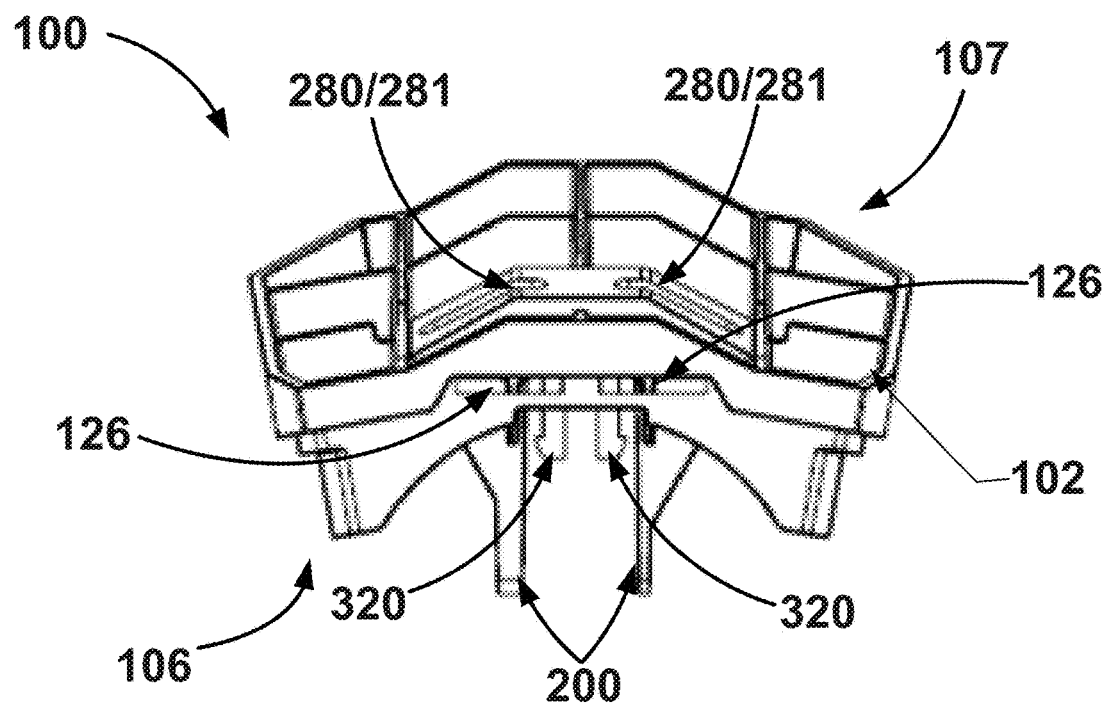
FIG. 17A provides a top plan view.

FIG. 17A provides an overhead plan view of a mounting bracket 100 with an angled body portion 102, having a front side 106 and a back side 107. In this view, the projecting members 200 extend from the front side 106. Also visible from this view are the mounting bolt holes 280 or mounting bolt channels 281, connection slots 126, and securing tabs 320.

Figure 17B:
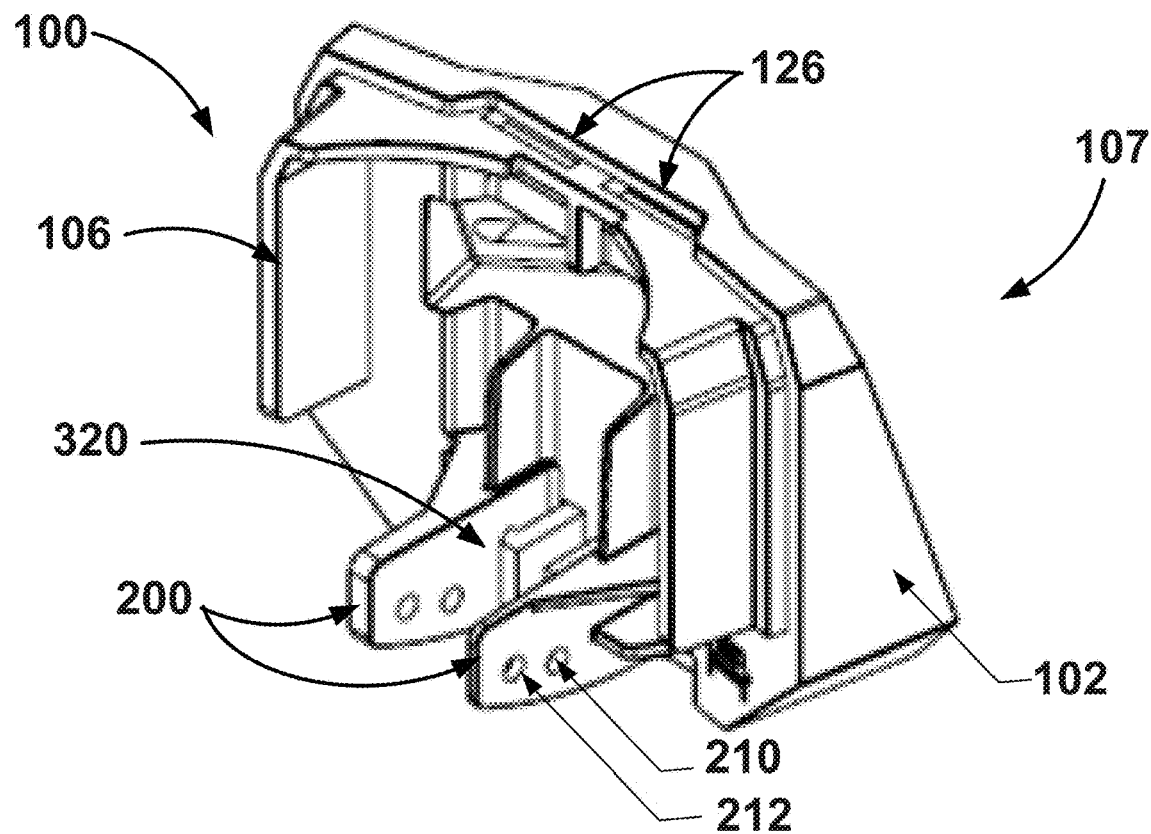
FIG. 17B provides an isometric view.

FIG. 17B provides an isometric view of a mounting bracket 100 with an angled body portion 102, having a front side 106 and a back side 107. In this view, the projecting members 200 horizontally extend from the front side 106. Also visible from this view are the connection slots 126 and securing tabs 320.

Figure 17C:
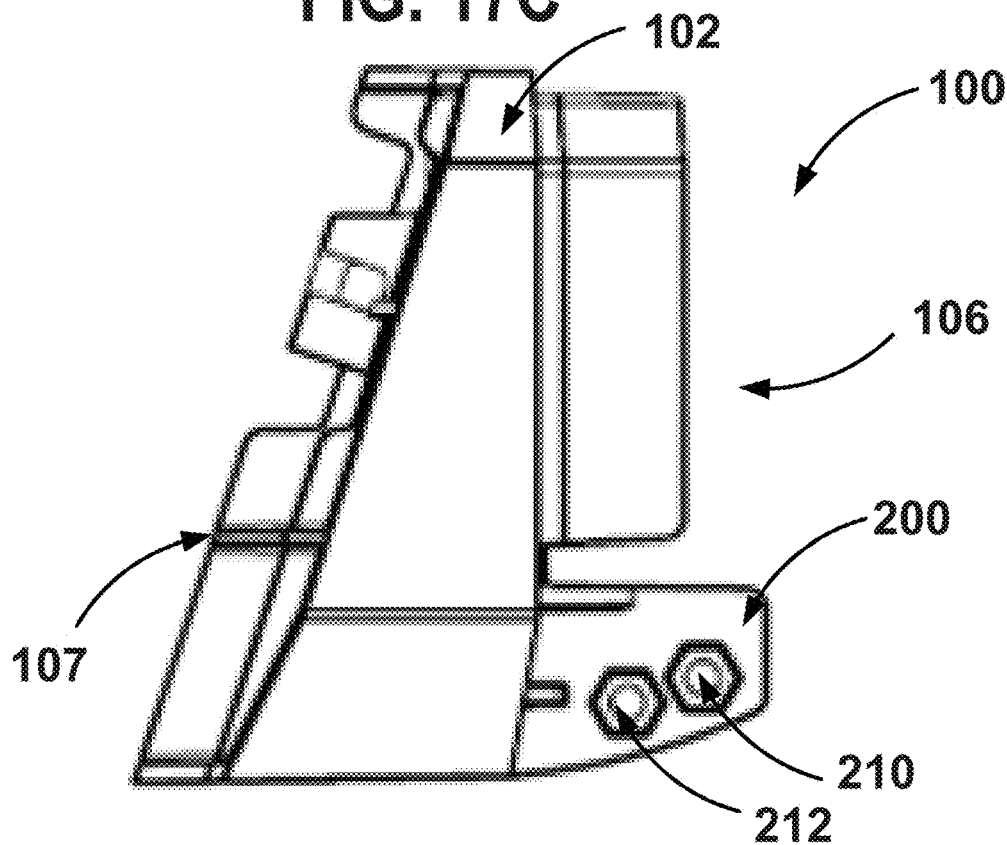
FIG. 17C provides side view.
Figure 17D:
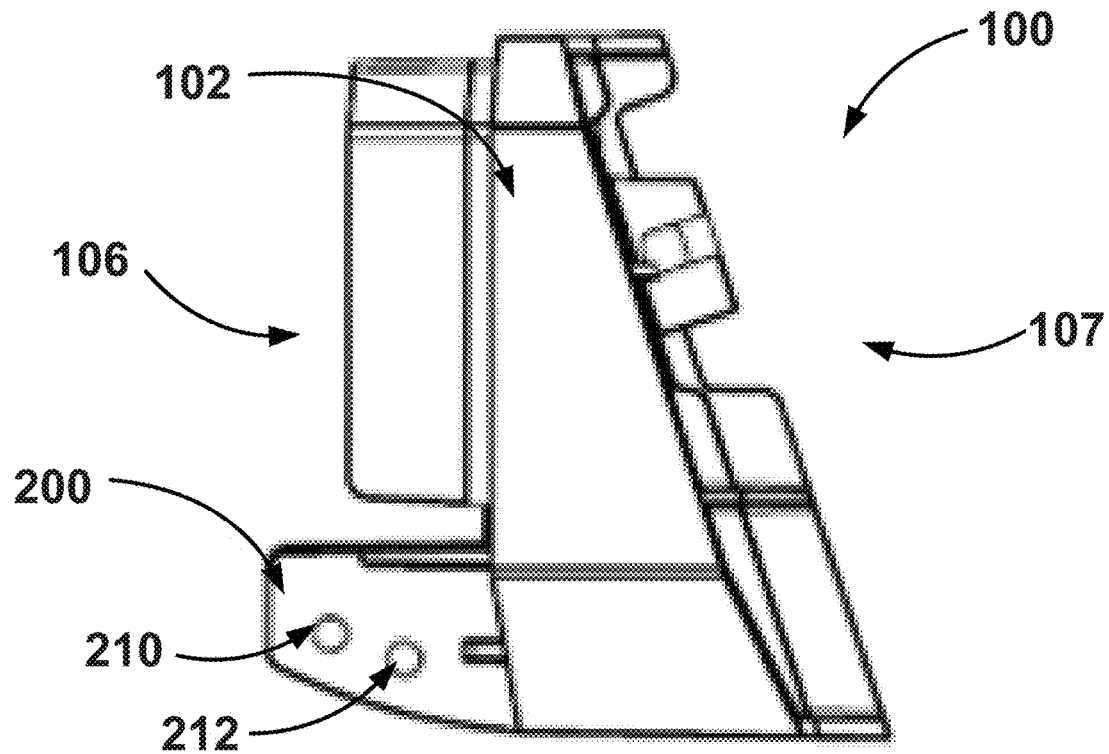
FIG. 17D shows an alternative and opposite side view.

FIG. 17C and FIG. 17D provide elevational side views of a mounting bracket 100 with an angled body portion 102 having a front side 106 and back side 107, one or more projecting member(s) 200, and projecting member bolt holes 210, 212.

Figure 17E:
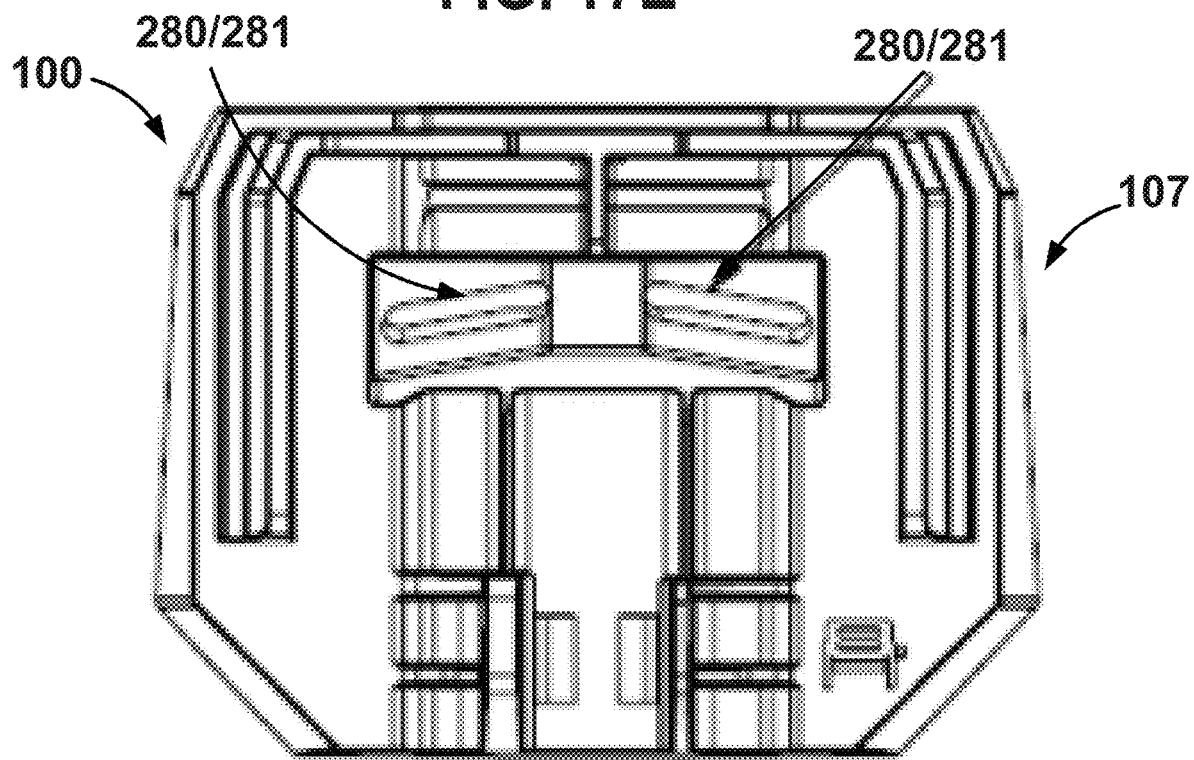
FIG. 17E provides a back elevational view of a flat backed base portion for use with a vertical structure, for example a wall.
Figure 17F:
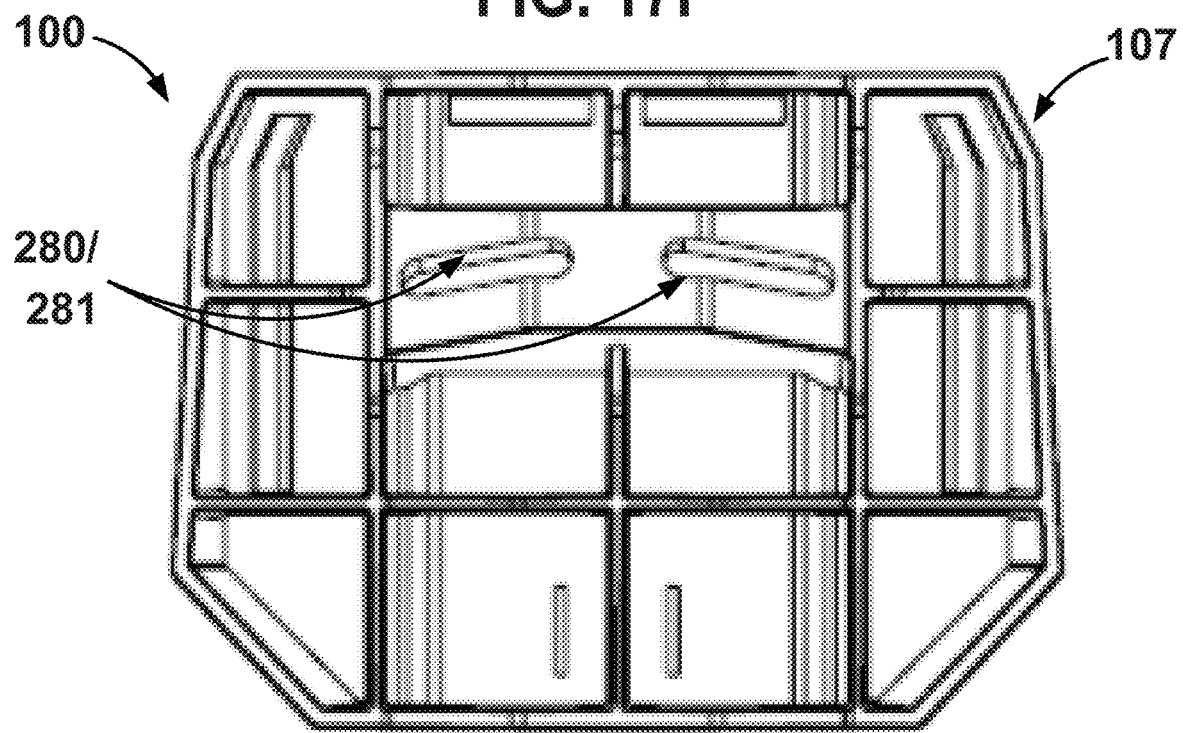
FIG. 17F provides a back elevational view of an angled body portion.

FIG. 17E and FIG. 17F provide two additional back elevational views of a mounting bracket 100 with an angled body portion 102. Both FIG. 17E and FIG. 17F show the mounting bolt holes 280 or mounting bolt channels 281.

Figure 17G:
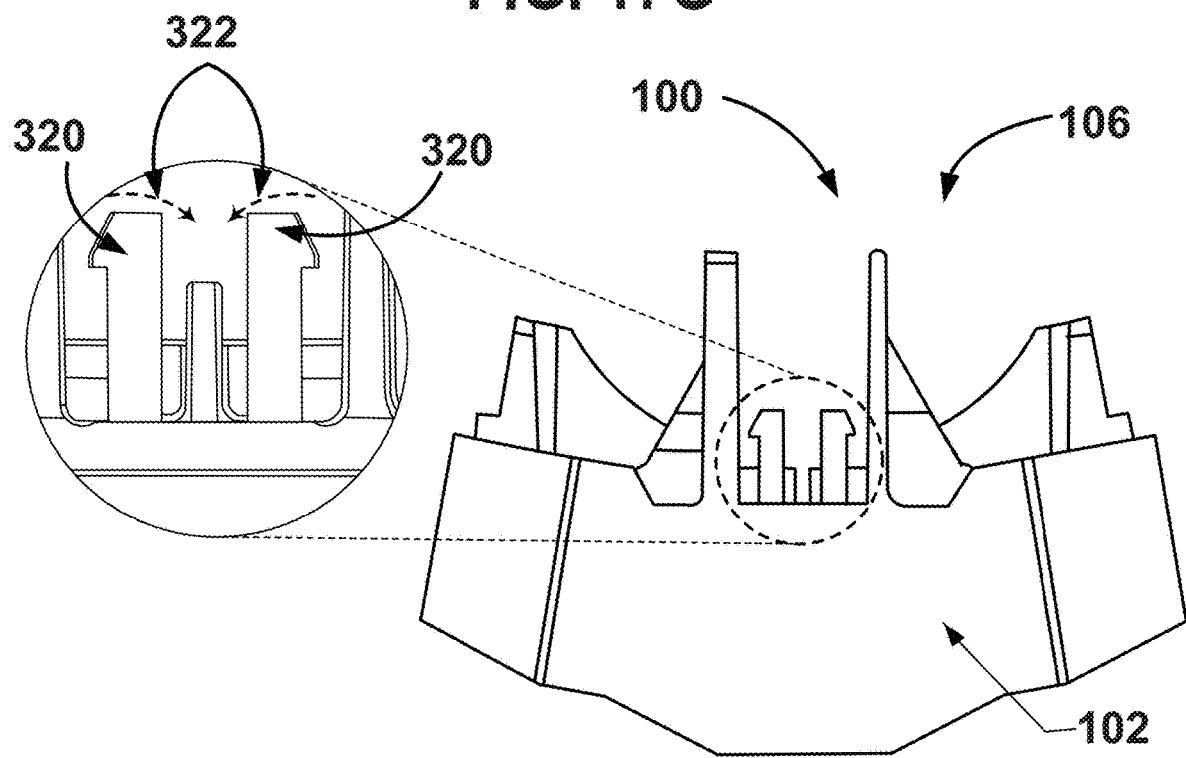
FIG. 17G provides an enlarged view of a detailed area.

FIG. 17G provides an enlarged image of the securing tabs or locking tabs 320. These locking tabs 320 (or sometimes referred to as securing tabs or securing clips 320) extend from the front side 106 of the body portion 102.

Figure 17H:
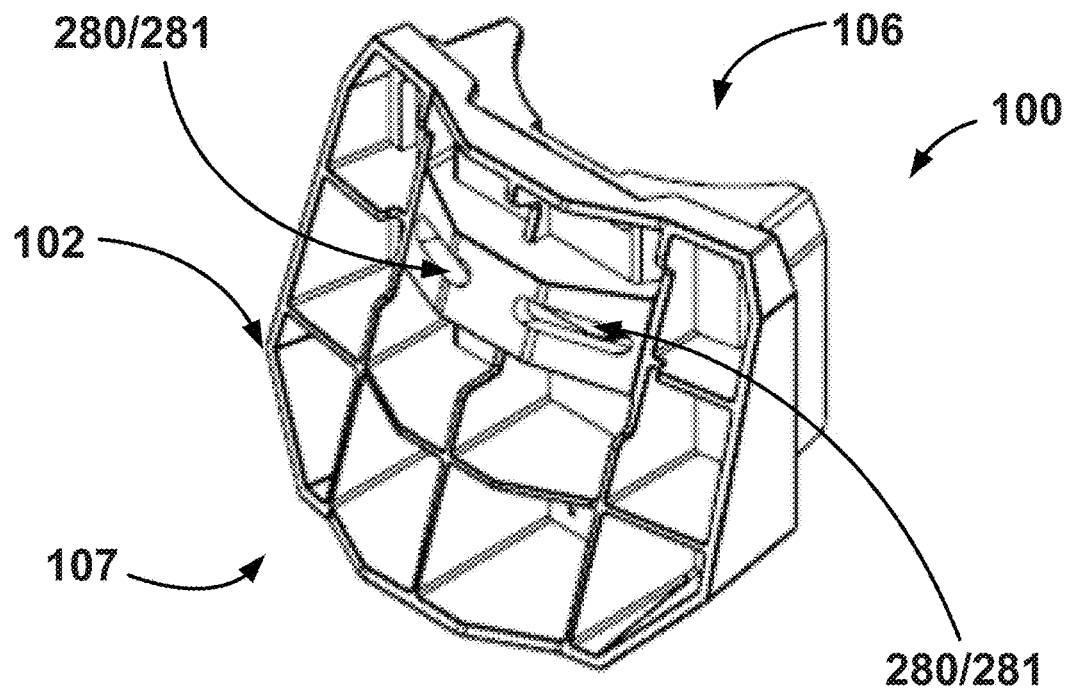
FIG. 17H provides an alternative isometric view of an exemplary implementation of the mounting bracket with an angle built in to the base.

FIG. 17H provides yet another isometric view of a mounting bracket 100 hereof, having a front side 106 and back side 107. The angled body portion 102 has one or more, or a plurality of mounting bolt holes 280 or mounting bolt channels 281.

FIG. 18 includes sub-part FIGS. 18A, 18B, 18C, and 18D. These figures of FIG. 18 provide cut-away sectional views and elevation views, of the mountable bracket, cupholder, and advertising apparatus connected to a seat structure.

Figure 18A:
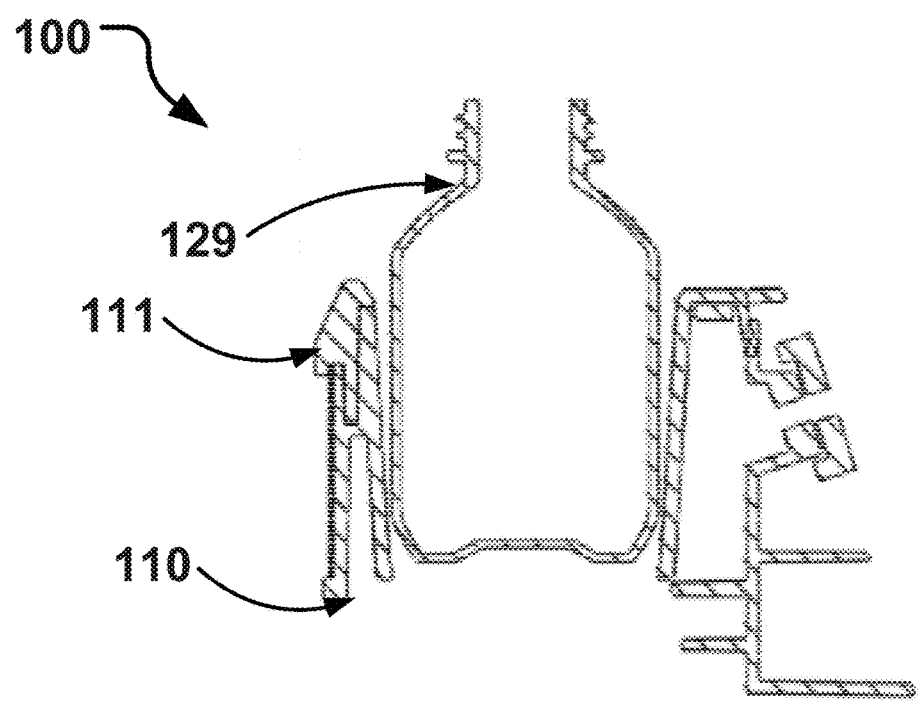
FIGS. 18A and 18B provide cross-section or cut-away views.
Figure 18B:
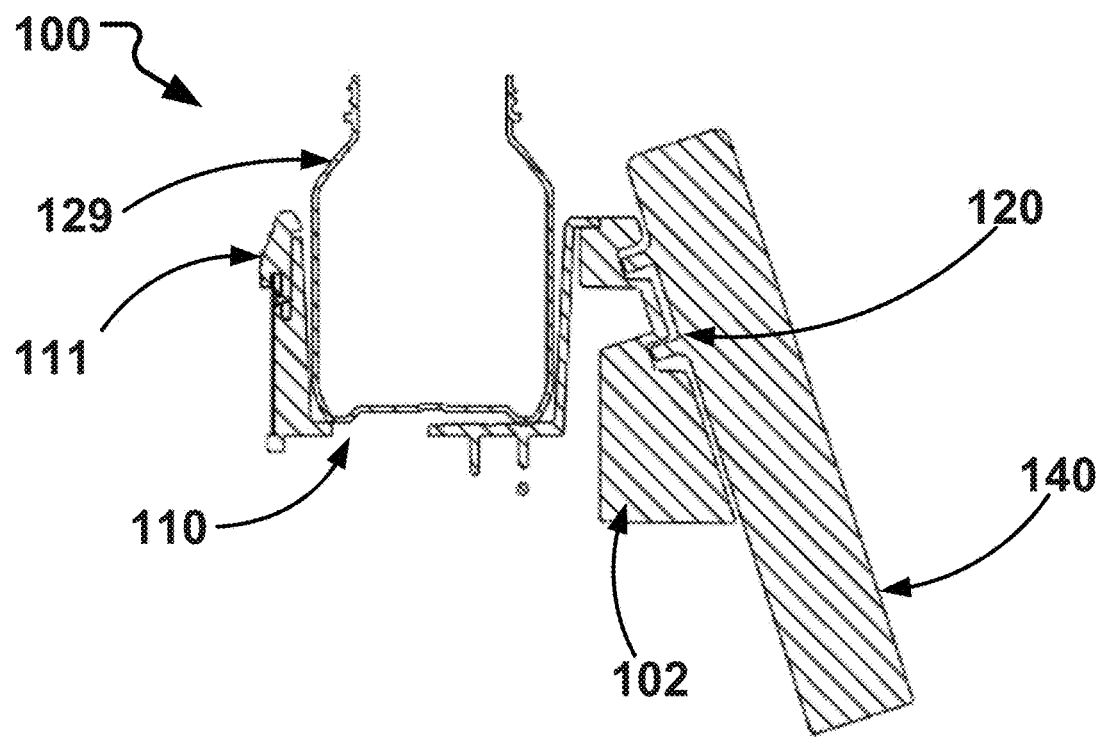

FIGS. 18A and 18B provide cut-away sectional views of an implementation of a mounting bracket 100, cupholder attachment 110, drinking container 129, and emblem member 111. FIG. 18B also shows the angled body portion 102, seat stanchion 120, and seat support structure 140.

Figure 18C:
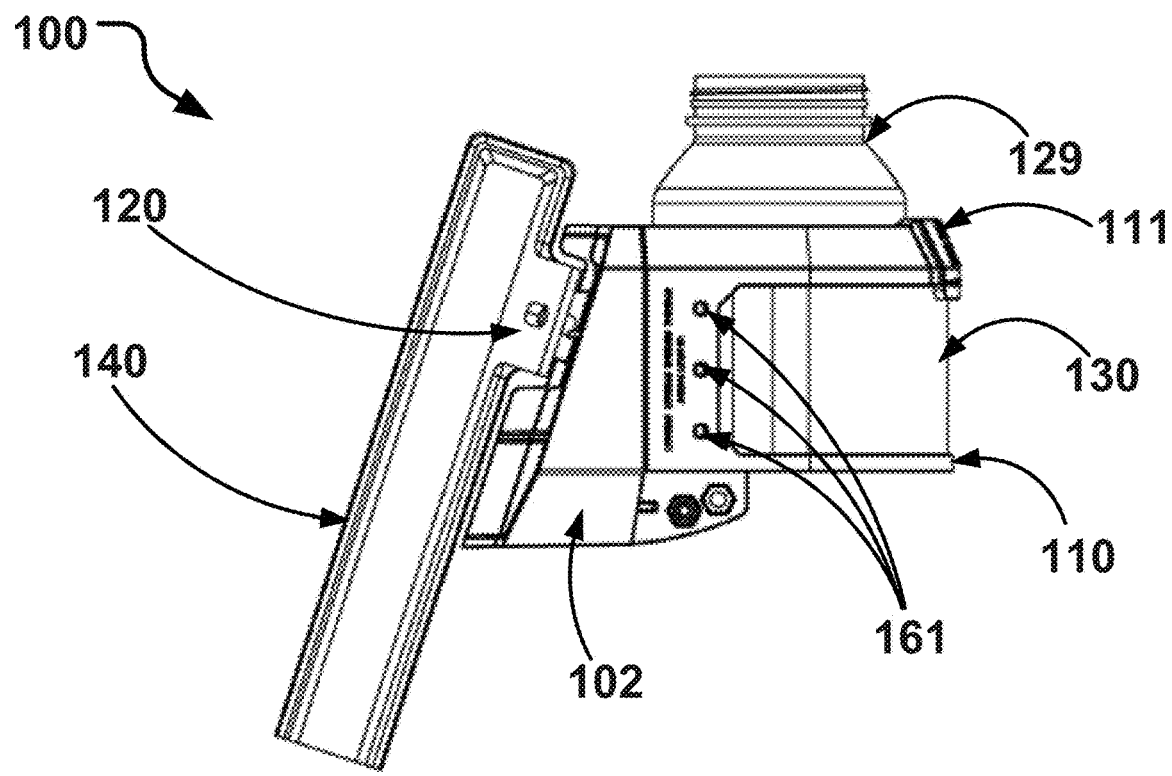
FIG. 18C provides a side view.
Figure 18D:
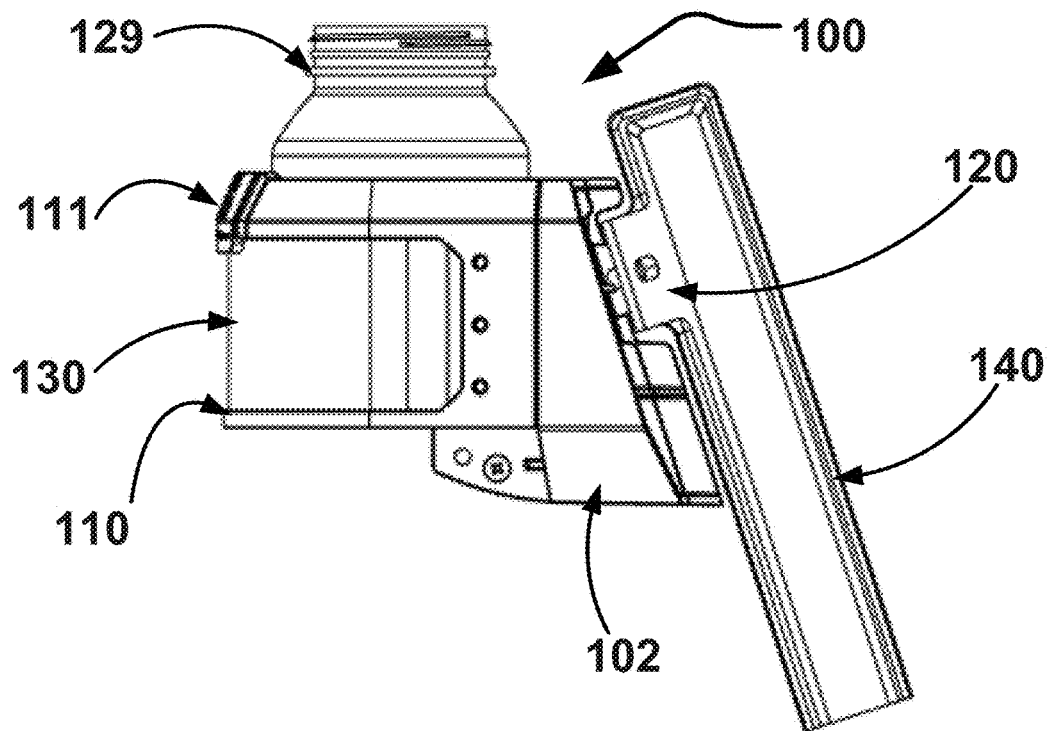
FIG. 18D provides an alternative and opposite side view; the sub-parts FIGS. 18A, 18B, 18C, and 18D, showing the mountable bracket, cupholder, and advertising apparatus connected to a seat structure.

FIGS. 18C and 18D provide elevational side views of a seat support structure and one implementation of an adjustable mounting bracket 100, cupholder 110, seat stanchion 120, and advertising apparatus 130. In this configuration, the mounting bracket 100 has an angled body portion 102 adapted to be connected to and/or disposed on and/or with a cupholder 110, and an updateable, replaceable, or advertising device 130, here an appurtenant panel, which may be readily adapted for display of advertising material. FIGS. 18C and 18D also demonstrate how this implementation of an adjustable mounting bracket may be attached to a seat support structure 140. In the implementations of FIGS. 18C and 18D, one or more holes 161 (three shown in FIGS. 18C and 18D) may be established for the purpose of receiving a tool configured to allow the user to remove the panel and replace the panel with updated advertising material.

FIG. 19 includes sub-part FIGS. 19A, 19B, 19C, 19D, 19E, 19F, 19G, and 19H. These figures provide isometric, plan, elevation, section, and perspectives of an emblem used and attached an advertising apparatus hereof.

Figure 19A:
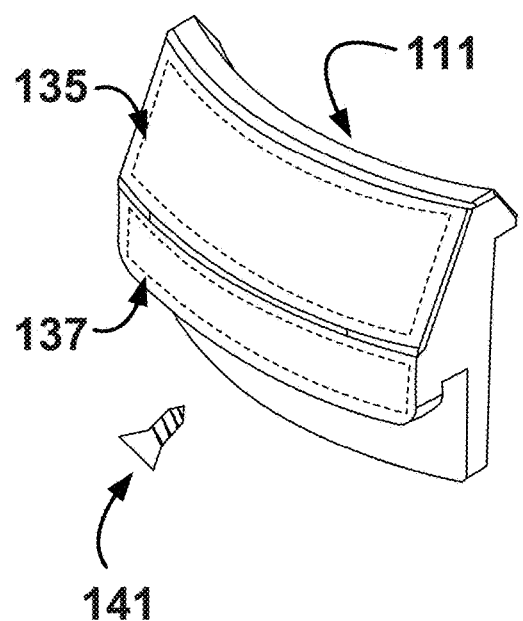
FIG. 19 includes sub-parts FIGS. 19A, 19B, 19C, 19D, 19E, 19F, 19G, and 19H; where FIG. 19A provides isometric view.
FIG. 19B provides a top plan view.
FIG. 19C provides a side elevation view.
FIG. 19D provides a second and opposite side elevation view.
FIG. 19E provides a cut-away view.
FIG. 19F provides a front elevation view.
FIG. 19G provides a bottom plan view.
FIG. 19H provides an isometric view; where FIGS. 19A, 19B, 19C, 19D, 19E, 19F, 19G, and 19H, hereof all show an exemplary implementation of an emblem that may be configured, connected, adapted, and/or attached to an attachment and/or advertising apparatus hereof.
Figure 19B:
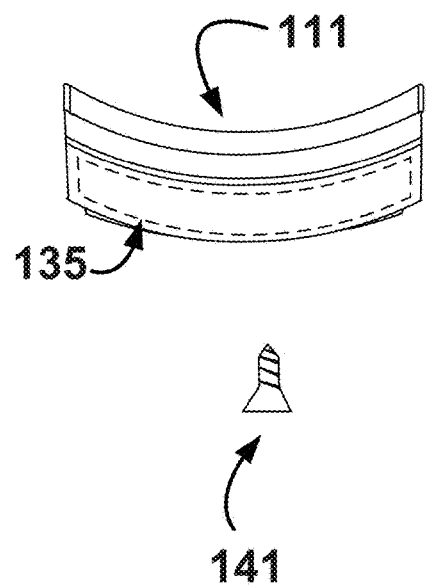

FIG. 19A provides an isometric view of an emblem member 111 which may be attached, adapted, or integrated with an attachment, whether a cupholder, flag holder, or otherwise. The emblem member 111 may be secured using mounting screws 141 to complete an assembly of an attachment apparatus according hereto to provide additional advertising space. The boxes (advertising spaces) identified by dashed lines 135 and 137 demonstrate that a primary logo may be placed inside the area defined by dashed line 135 and a secondary logo may be placed inside that area defined by dashed line 137. FIG. 19B provides an overhead plan view of an emblem member 111, advertising space 135, and mounting screw 141.

Figure 19C:
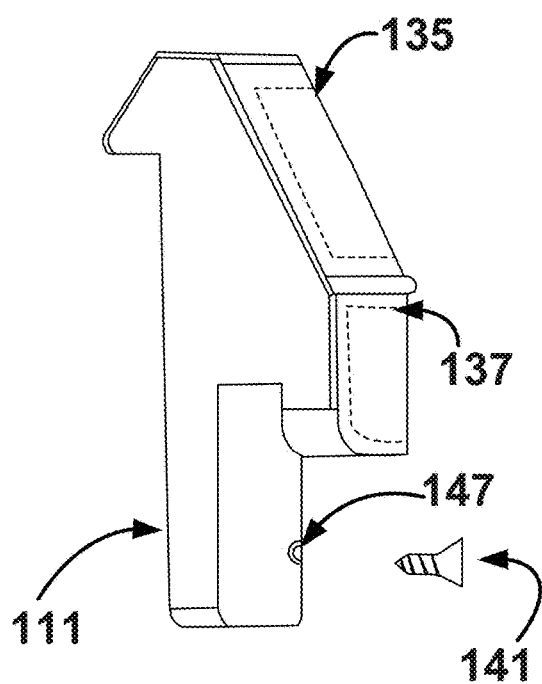
Figure 19D:
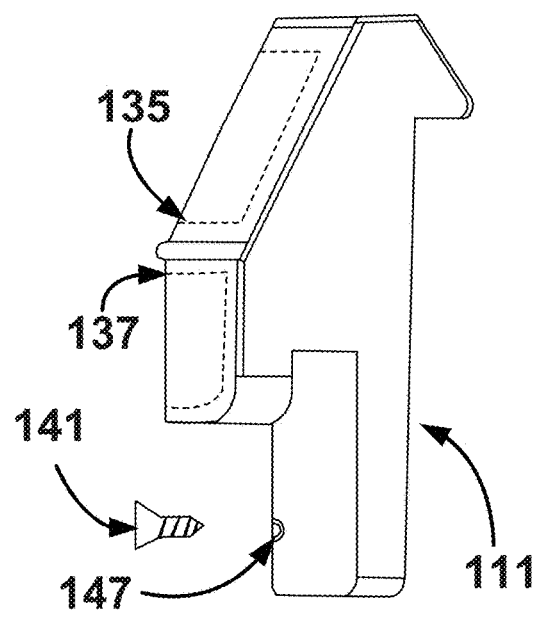
Figure 19E:
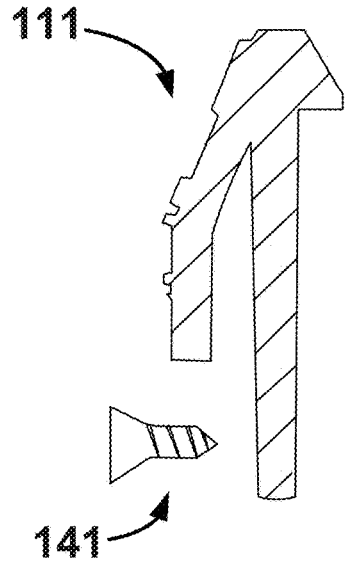

FIG. 19C and FIG. 19D provide elevational side views of an emblem member 111 having advertising spaces 135, 137, and emblem mounting hole 147. In this implementation, the mounting screw 141 may be used to secure and attach the emblem member 111 to the selected attachment, described inter alia. FIG. 19E provides a cutaway view of an emblem member 111 and mounting screw 141.

Figure 19F:
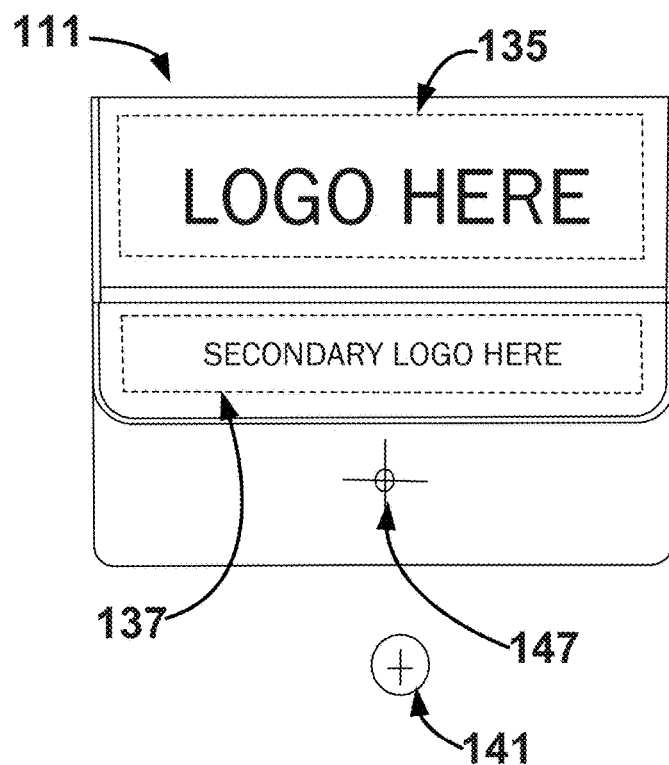
Figure 19G:
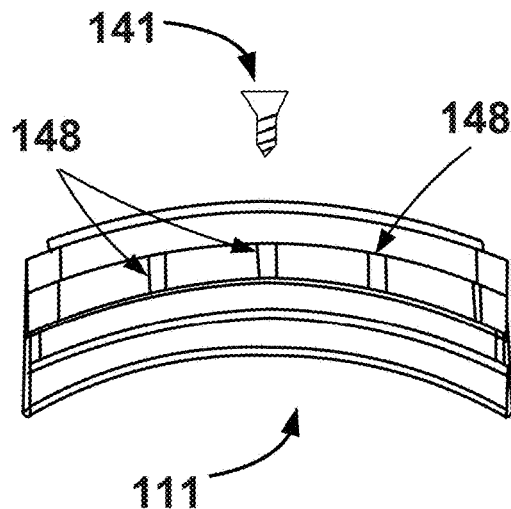
Figure 19H:
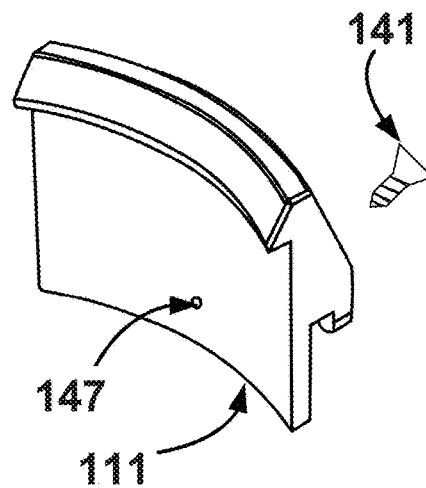

FIG. 19F provides a front elevational view of an emblem member 111 having advertising spaces 135, 137, and emblem mounting hole 147. In this implementation, the mounting screw 141 may be used to secure and attach the emblem member 111 to the selected attachment, described inter alia. FIG. 19G provides a plan view from the bottom of an emblem member 111. From this view, emblem member alignment guides 148 are shown. The alignment guides 148 may help the emblem be secured to the attachment via corresponding slots or channels that may exist in the structure of the attachment to which the emblem is secured. FIG. 19H provides yet another isometric view of an emblem member 111, mounting screw 141, and emblem mounting hole 147.

Figure 20A:
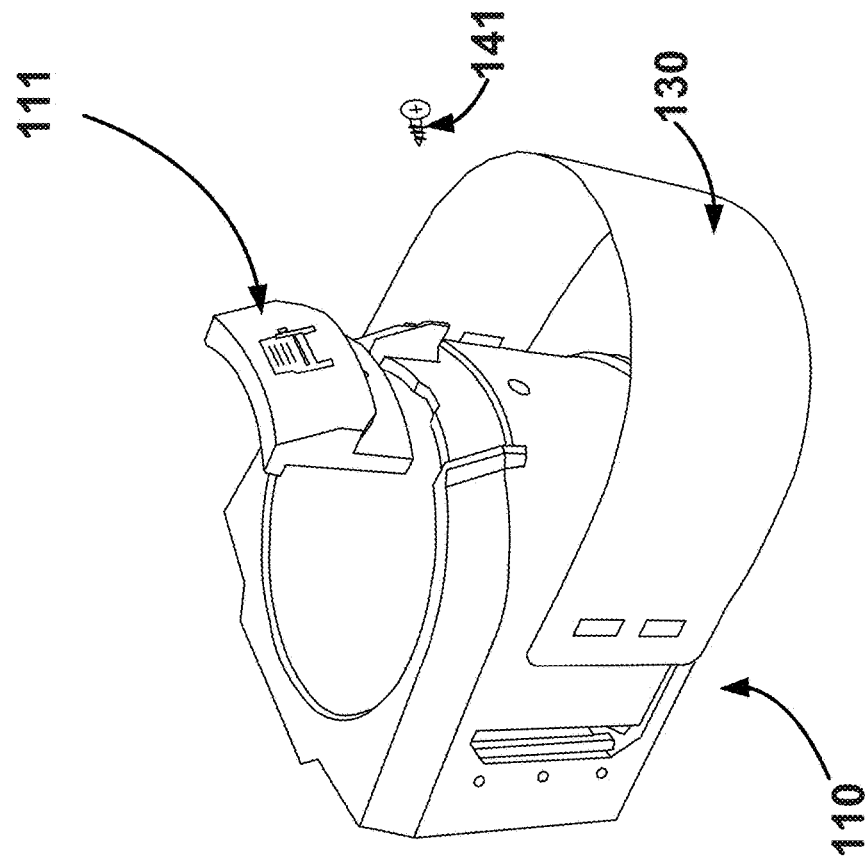
FIG. 20A provides an exploded isometric view of a mounting bracket with an unattached cupholder attachment including an advertising apparatus with an appurtenant panel and an advertising emblem member.
Figure 20A:
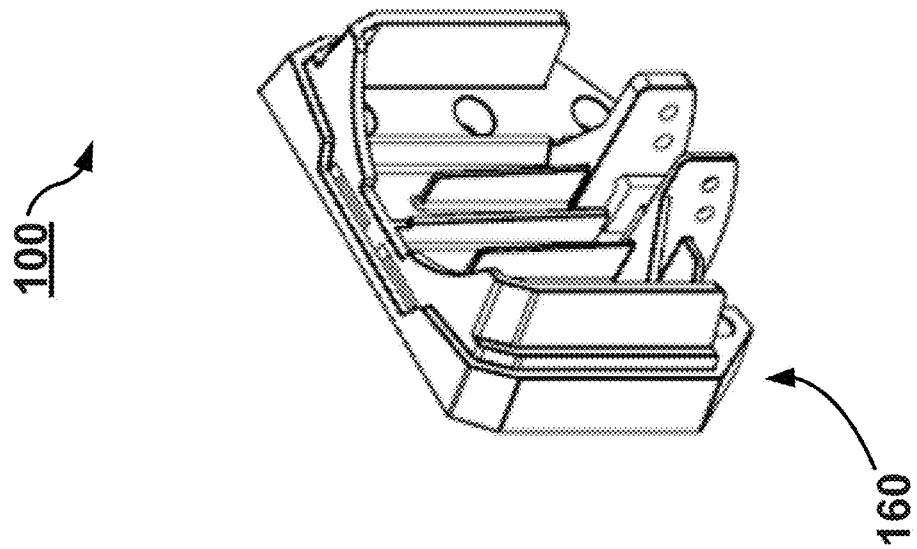

What is shown in FIGS. 20A-20F are views of a mounting bracket and advertising apparatus and tools related to installation of an implementation hereof. Particularly, FIG. 20A provides an isometric view of an adjustable mounting bracket 100 including an exploded pre-mount of a cupholder attachment 110 in a position for which it may be adapted to be connected to a flat backed mounting bracket 160 (note, that the cupholder attachment or other attachments described may be connected or disposed on or with an angled body mounting bracket as well). FIG. 20A shows also that the appurtenant panel 130 may be detachable from the attachment apparatus 110, noting that this appurtenant panel 130 may be attached to the attachment apparatus 110 by a variety of methods and/or devices. Further an emblem member 111 is shown which may also be adapted or integrated with or attached to the attachment portion 110 (note the mounting screws 141 which may be used for this purpose) to complete an assembly of a mounting bracket apparatus 100 according hereto to provide additional advertising space.

Figure 20C:
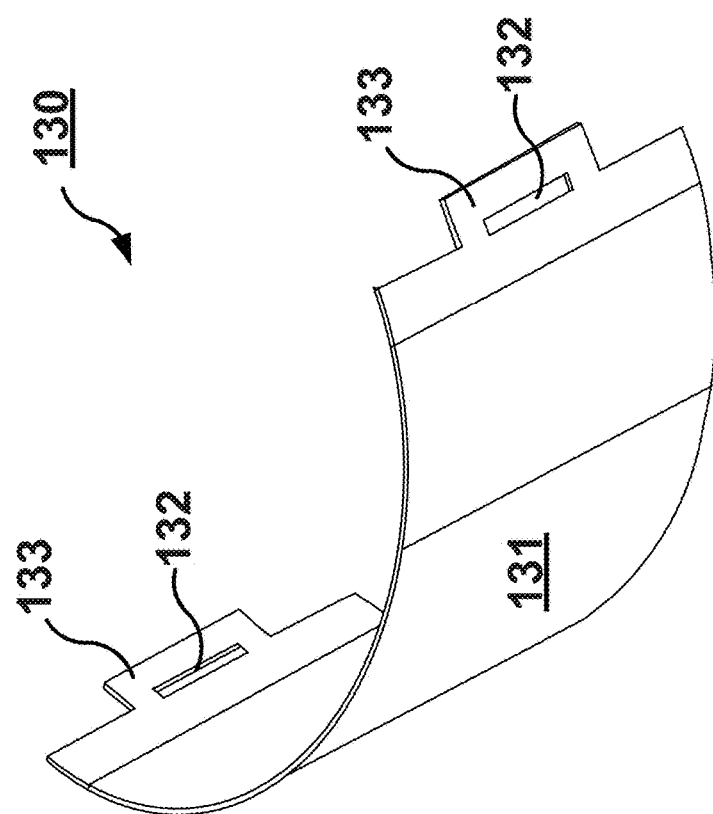
Figure 20B:
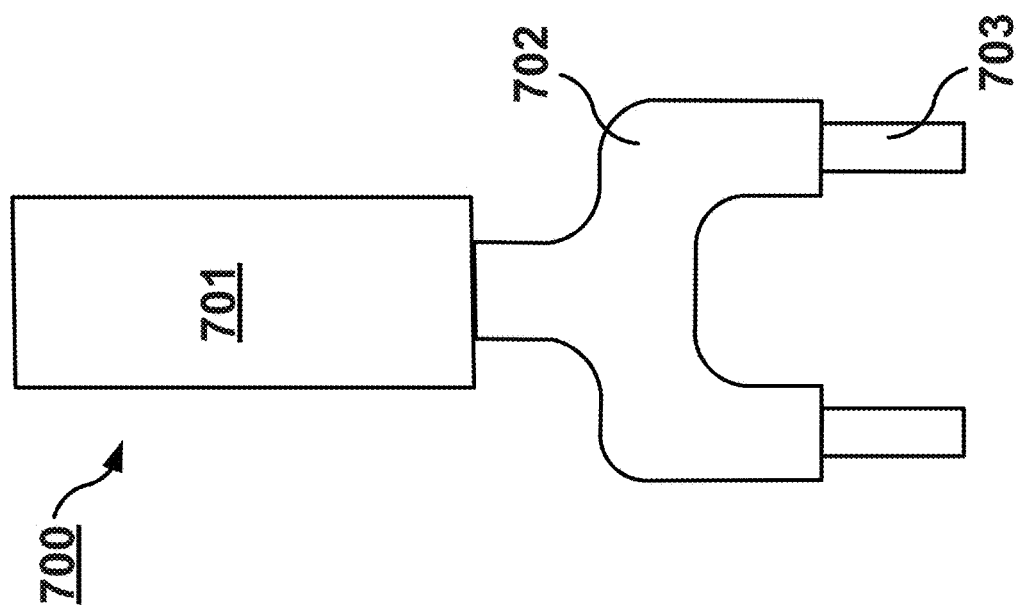
FIG. 20B provides an elevational view of a tool for use in applying and/or removing an advertising apparatus such as that of FIG. 20A.
Figure 20D:
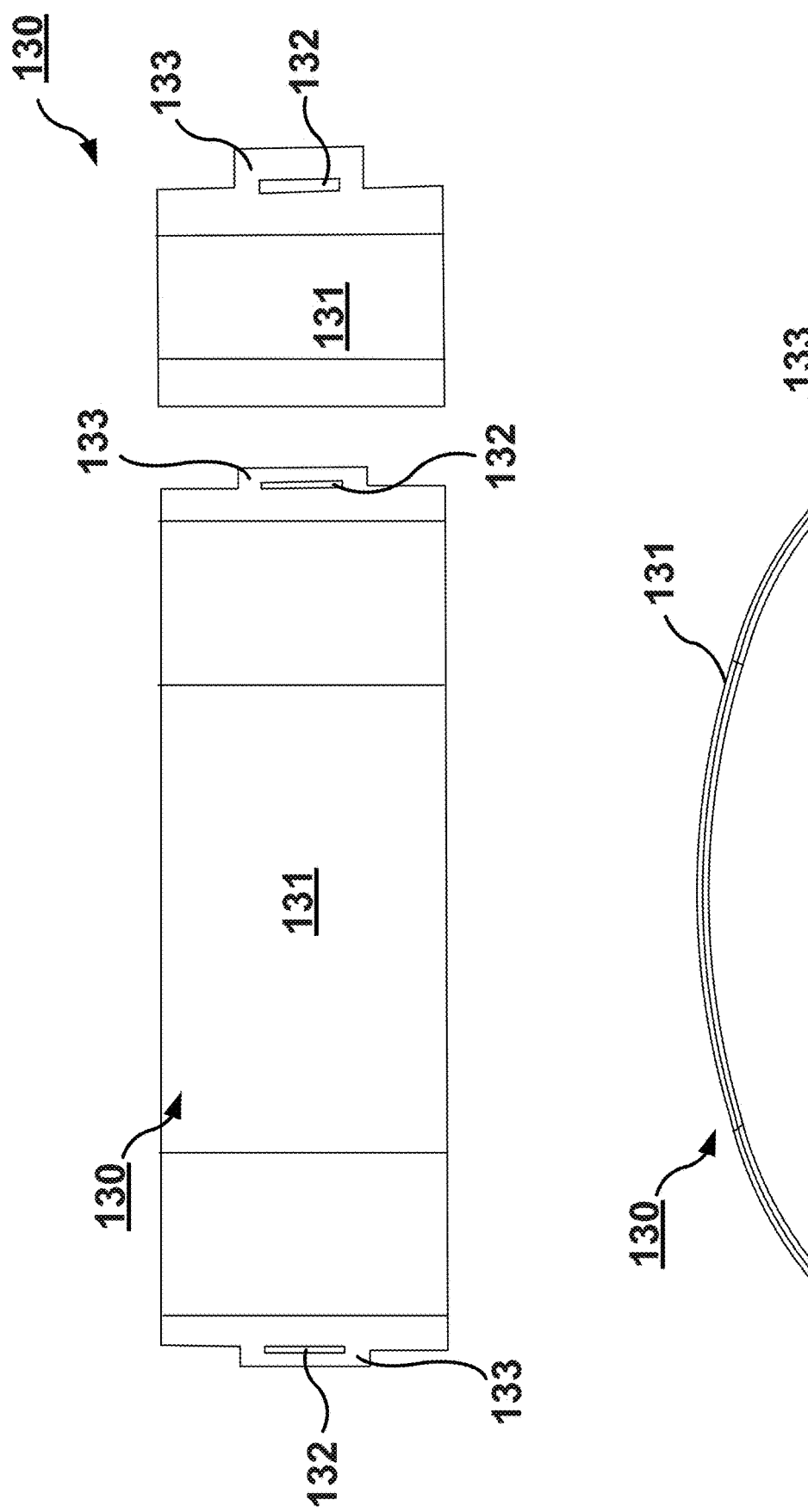

FIG. 20B provides views of tool 700 which may be used with the attaching or removing an advertising apparatus 130. In general, and as shown in FIG. 20B, the tool 700 includes a handle 701, one or more legs 702 connected to the handle 701 and one or more respective clip-engaging portions 703 connected to the respective leg portion 702.

FIGS. 20C, D, E, and F provide some more detail of one type of replaceable advertising device, e.g., an appurtenant panel 130. Portions of note include the face surface 131 which might be used for indicia, particularly, though not necessarily of an advertising type, and may be of a variety of alternative forms, whether integrally formed with or removably or irremovably set thereon or therein. A potential advantage of an appurtenant panel 130 may be that it could be relatively easily removable (though perhaps preferably with a particular tool to avert undesirable, vandalistic removal) and replaceable with an alternative panel (not shown), differing primarily (if perhaps solely) in the indicia displayed on or as a part of the panel 130. Fast and efficient removal, installation and/or replacement may thus be achievable. Note, though stickers such as those often used previously may also be used here, many typical implementations would not use stickers and use instead interchangeable, replaceable panels 130 which each have discrete presentations screen printed directly thereunto or molded directly thereinto, the discrete presentations often being of different branding or sponsorship, venue or team affiliation or the like. Moreover, the front face of the panel 130 may be of different shapes, sizes and/or may include alternative messaging types, as for example, electronic or electromagnetic presentations such as light emitting diode (LED) presentations, or other electronic presentation forms providing visual or aural (or other sensory) signals (as for example, liquid crystal display (LCD), e-paper, e-ink, plasma or other presentation forms), such presentations perhaps providing scrolling, static, flashing, random and/or updateable custom messaging, such messaging alternatively being re-programmable on particular panels 130 or being set such that alternative messaging is provided by replacing the LED or other electronic presentation panel 130. Re-programmability might include an ability to broadcast or near-cast a re-programming signal to one or more electronic presentation panels 130 simultaneously or serially. Radio Frequency (RF) signals could be usable here. RF Identification (RFID) could be useable herefor. Presentations aurally could be sent via one or more advertising apparatuses to an individual patron via the airspace between the patron and the advertising device, or to listening device such as a headset or an earbud. The listening device could be radio frequency enabled to receive radio frequency signals from the advertising apparatus, such as being an AM or FM or like radio device. Any of these could be used for general advertising, general announcements, play-by-play announcements along or alternatively involving provision of player statistics, or the like or venue advertisements.

Functional portions of the panel 130 which might provide for detachable attachment of a panel to a cupholder attachment 110 (or other mounting bracket attachment described herein, e.g. flag holder, phone holder, etc.) might include one or more slots 132, and, may in some implementations be on one or, as shown in FIG. 20C, on both lateral sides of the panel 130. In some cases, as for example shown in FIG. 20C, among others, the slots 132 may be in or adjacent a respective one or more tongues 133. As shown in FIG. 20E, a tongue 133 may be inserted into a receiving area 155 of an attachment 110. The tongue 133 may then ride up a ramped catch 160 (see e.g. FIG. 20F) until the slot 132 may be engaged thereby (a dashed line representation of a tongue caught on/by a catch 156 is shown in FIG. 20F). This would provide for holding the appurtenant panel 130 in place relative to the attachment 110 and thereby provide a desirable visibility for the replaceable advertising indicia on the panel 130, if any, and thereby provide an advertising function of the overall combination.

In some implementations, a removal of an appurtenant panel 130 may be effected by releasing the tongue and slot combination 133/132 from the catch 156. In the implementations in FIGS. 20D and 20E and 20F, one or more holes 161 (three shown in FIG. 20E) may be established for the purpose of receiving a tool 700 with a tongue-engaging portion 701. The tongue-engaging portion 701 may then engage the tongue 133 moving it so that the slot 132 will no longer by caught by the catch 160. The tongue and slot combination 133/132 may then be removed from the receiving area 155. Note, in a variety of implementations like this, the panel or a part thereof, as for example, the tongue, or part of the panel adjacent to the tongue, might be resiliently deformable so that the panel and the tongue will return to or toward their original disposition after having been forced to move either by the ramped catch 160 during installation, or by a tool 700 at removal. A tool 700 may have different sized or spaced prongs for insertion in the respective apertures or holes 161.

Figure 21A:
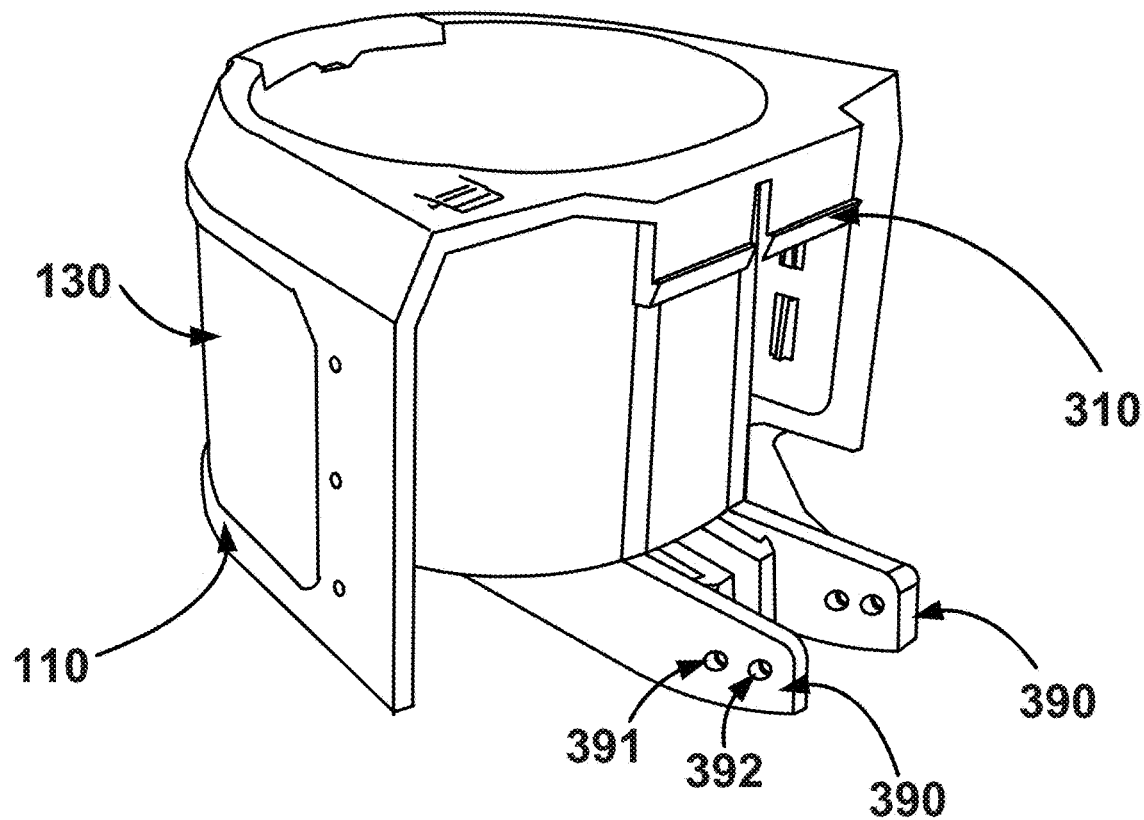
FIG. 21A provides an isometric view of yet another version of a cupholder attachment and FIG. 21B provides an isometric view of a mounting bracket used with an attachment of FIG. 21A.
Figure 21B:
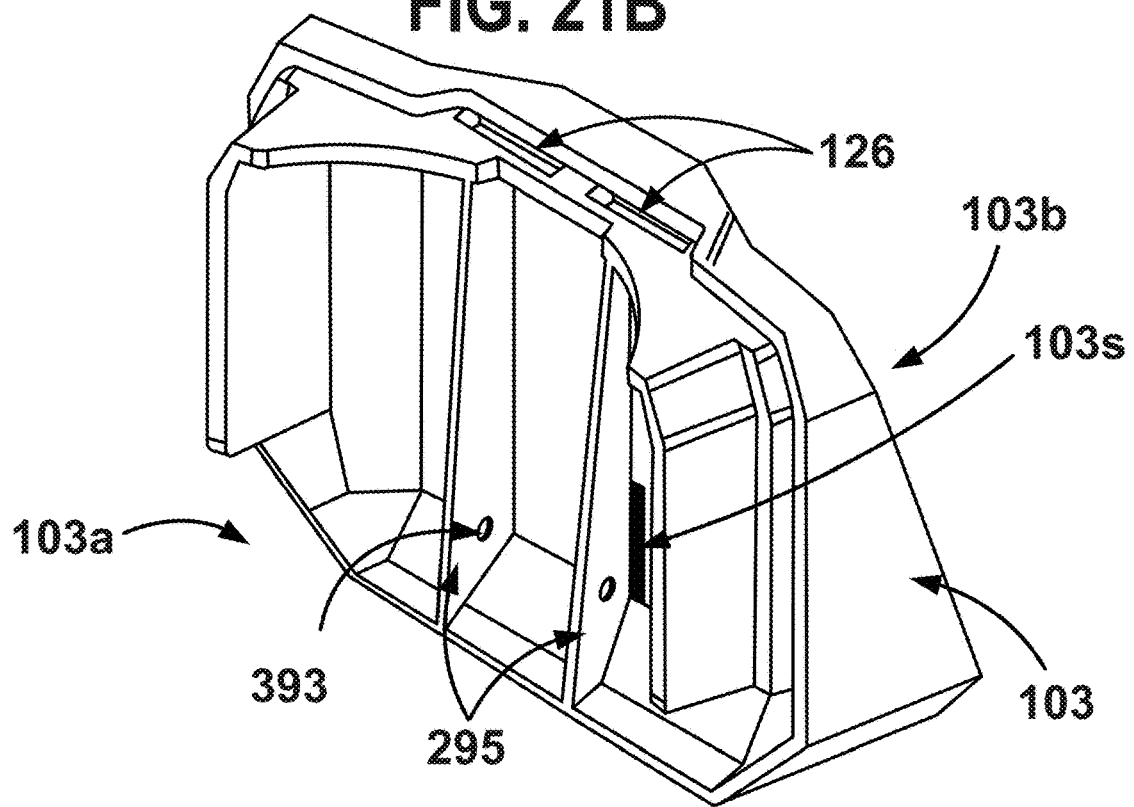
FIG. 21 includes sub-parts FIGS. 21A, 21B, 21C, and 21D.
FIG. 21C provides another isometric view of yet another alternative cupholder attachment and FIG. 21D provides an isometric view of a mounting bracket configured for use with an attachment of FIG. 21C.

FIGS. 21A, 21B, 21C, and 21D provide yet another alternative version and implementation of the developments of an adjustable mounting bracket and attachment apparatus hereof. FIG. 21A provides an isometric view of an advertising apparatus hereof, wherein the advertising apparatus 130 is adapted to be affixed to a support structure such as a cupholder 110. Note, however, in this implementation, the attachment 110 has projecting members 390 that are used to connect to a body portion or base portion 103 that has support flanges 295, such as that of FIG. 21B. It should be noted that in this implementation the attachment apparatus 110 may still possess an upper attachment flange 310 to secure and connect the top of the attachment to the top of the base portion 103, via connection slots 126. One optional feature for an implementation such as that of FIGS. 21A and 21B is that the base portion 103 may have slots 103s visible on the front side 103a that provide an opening for the projecting members 390 to extend through and beyond the surface of the back side 103b. The projecting members 390 may have one or more bolt support holes 391, 392 which may be used to position the cant or tilt of the attachment relative to the base 103. A support bolt (not shown in FIG. 21A or FIG. 21B) may pass through bolt hole 391 or 392 of the projecting member 390 and then pass through the bolt hole 393 on the support flange 295 of the base portion 103. In this way, the attachment 110 may be positioned at one of several positions to adjust the cant or tilt of the attachment.

Figure 21C:
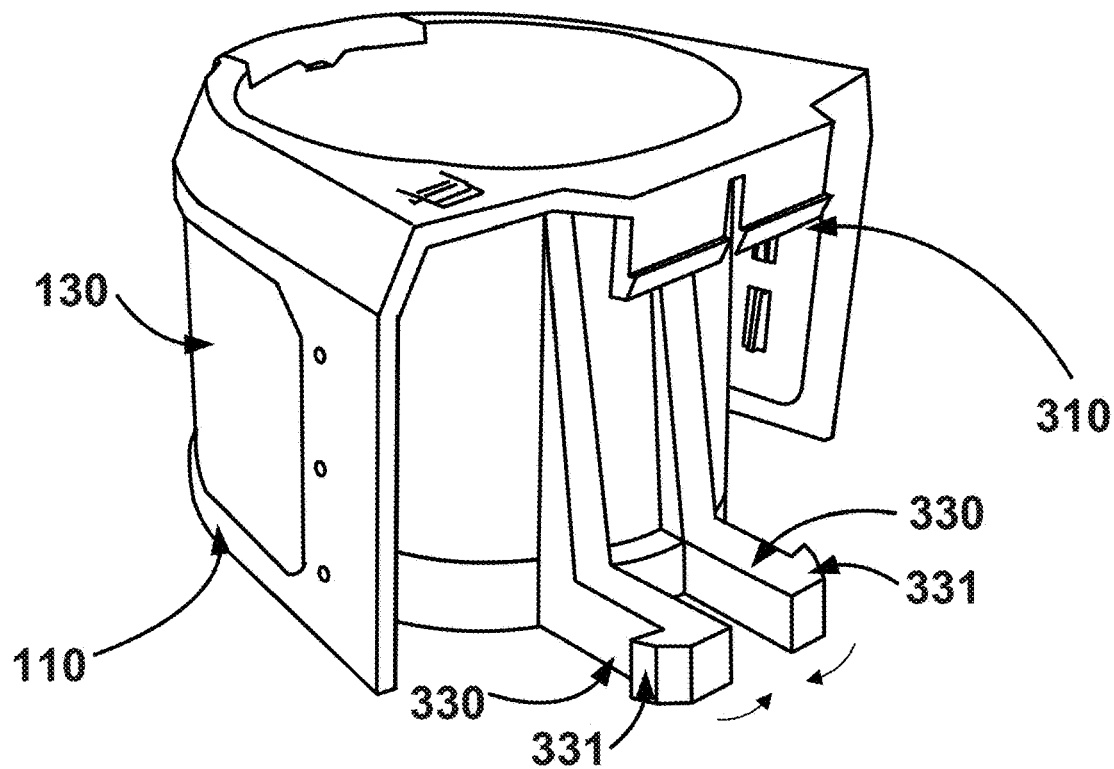
Figure 21D:
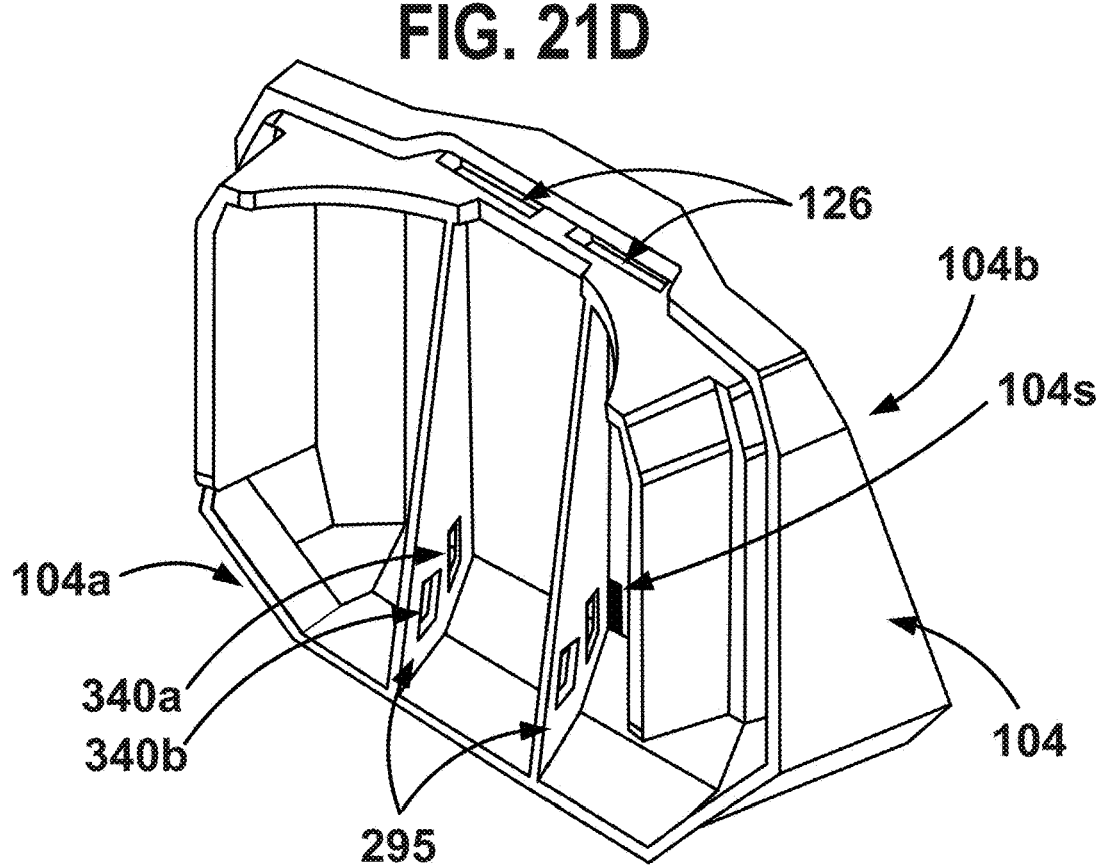

FIG. 21C provides an isometric view of an advertising apparatus hereof, wherein the advertising apparatus 130 is adapted to be affixed to a support structure or attachment such as a cupholder attachment 110. Note, however, in this implementation the attachment 110 has securing tabs or locking tabs 330 that extend from the back of the attachment 110. These securing tabs/locking tabs 330 may be used to connect to a body portion 104 that has support flanges 295, such as those of FIG. 21D. In the implementation of FIGS. 21C and 21D, the attachment apparatus 110 may still have an upper attachment flange 310 to secure and connect the top of the attachment 110 to the top of the base portion 104, via connection slots 126. The securing tabs/locking tabs 330 may be used to attach the attachment 110 to the base portion 104 by squeezing or pinching the securing tabs/locking tabs 330 towards each other and placing the tabs ends (or spurs) 331 through the support holes 340a, 340b located on the support flange 295 of the base portion 104. In this way, the attachment 110 may be positioned and supported at one of several positions to adjust the cant or tilt of the attachment.

The developments hereof include an adjustable mounting bracket comprising:

a body portion having a front side, a back side, and at least one mounting hole defined therein, the body portion being adapted to be connected or disposed on a support structure via the at least one mounting hole;

the body portion having a projecting member connected thereto and projecting therefrom, the projecting member being adapted to receive and support an attachment element which is one or more of removable, interchangeable, and replaceable relative to the body portion and projecting member, the projecting member having one or more holes or attachment members and the attachment element having one or more attachment members or holes configured to be corresponding to one or more holes or attachment members of the projecting member, and said projecting member thereby being configured to receive and support the attachment element via a cooperative connectability of the one or more holes members to secure the attachment to element the projecting member.

Advertising apparatuses such as a seat attachment apparatus, adjustable modular mounting bracket, digital display, cupholder, personal effects holder, or a combination of two or more of these apparatuses may thus provide convenient and attractive ways to display advertising in such a manner as to make it highly visible to the consumer. In some instances, such as with an attachment apparatus base configured to be easily mounted and secured in a visible location, and often having one or more detachable advertising devices, either or both of a front portion for display of the advertising, and/or optionally an advertising emblem member portion for interchangeable display of advertising or other indicia. An ease and/or quickness of changing or replacing the front or emblem members can be attractive features for changing advertising or other indicia, either in semi- or substantially permanently installed dispositions of the base unit, and/or for the advantage of mass producing base members or units on a larger scale for alternative locale usage, with production of fewer of each of different advertising/indicia devices for different locales. Thus, molds would not need to be changed for base members carrying locale-specific information/advertising/indicia. Note, exemplar locales or markets for use hereof may including places where the seating envelope plays a role in creating a consumer's experience such as, stadiums and arenas (municipal, local, college or professional sports venues, raceways and e-gaming arenas, e.g.), churches, movie theatres, casinos, concert venues or mass transit.

As introduced above, a variety of alternative structures may implement the advertising/indicia changing methods and/or apparatuses hereof. Support structures may come in different forms, including but not limited to seat back structures of a variety of sizes, shapes and/or styles, cup-holders, a portable device or mobile device attachment apparatus, a pole holder, or other storage or holding apparatus, armrests, and other structures that may be present or available in the seating envelope of a venue. Thus, the support structure may be free-standing or may be pre-attached to or may simply be a seat structure, such as a seat back or arm or another portion of a seat. Support structures may be on structures other than seats or otherwise. Free-standing structures may take many shapes depending upon a particular locale. Moreover, though retrofit apparatuses have been described in some implementations of the developments hereof, the scope and content hereof is not so limited, and instead may include base structures which may incorporate the typically relative "quick" change advertising replacement options described herein. Still furthermore, the connection mechanisms hereof are illustrative only as well and not limitative of the scope and content hereof. Other connection mechanisms for either display panels or emblem members may be used to the same or substantially the same effect, and thus be covered hereby.

Apparatuses hereof may be made by any of a variety of methods and/or of a variety of materials. In many instances, impact resistant and/or ultraviolet (UV) stable resin or material may be selected. Plastics molded to integral or unitary forms as shown herein may be typical, though other forms and materials may be used as well. Sonic welding and/or glues and epoxies may be used to achieve certain combinations of shapes as well. Moreover, any of many alternative colors and/or color schemes may be used, whether for matching team or other affiliation, or for matching locale usage. The developments hereof also contemplate using glow-in-the-dark resins or material, either for the advertising inserts or as part, or incorporated in specific locations on the mounting bracket or attachment, for example, on the rim of the cupholder attachment, or along the top back edge of an attachment. Shapes and sizes are not limited to those shown and described here either, as sizes and shapes may be selected to adapt to any of many alternative support structures. Also, embossing and/or debossing of messages, logos or alternative communicative or decorative features, as part of the manufacturing process on any one or more surfaces may also be used, as for one example on the top surface adjacent or in lieu of the emblem member. If plural parts are used, different colors and/or embossing or other schema may be used to enhance interchangeability.

Furthermore, the developments hereof in some instances and implementations contemplate the use and integration of fragrances, scents, or aromas into any of the molded plastic products that are utilized for the apparatuses described. These fragrances may be utilized to impart a desired scent into the general area of the seating envelope and generally improve the olfaction observed, perceived, and/or detected by the patrons of the venue or establishment. In some instances, the fragrance or aroma may be embedded in the molded plastics for the critical components of the advertising apparatus or body member. In other implementations the fragrance or scent may be embedded in a discrete attachable, detachable, and removable strip that is designed to be placed and secured in concealed, unobtrusive, inconspicuous, low-key, or other hidden positions such under a horizontal member of the seat structure, under a seat back, or under an arm or other portion of a seat. The developments hereof contemplate using scents such as fresh cut grass, popcorn, or other desirable scents that may improve the ambiance and environment observed and experienced by the patron. Moreover, in some settings the implementations contemplate the use of a discrete attachable, securable, and subsequently detachable strip that is designed to absorb malodors. These deodorizing strips may be similarly placed and secured in concealed, unobtrusive, inconspicuous, or other hidden locations within the seating envelope.

Although the present developments have been described with reference to preferred implementations, workers skilled in the art will recognize that one or more changes may be made in form and/or detail without departing from the spirit and scope of the claimed inventions.

What is claimed is:
1. An adjustable mounting bracket comprising:
a body portion having a front side, a back side, and at least one mounting hole defined therein, the body portion being adapted to be connected or disposed on a support structure via the at least one mounting hole;
an attachment element which is one or more of adjustable, removable, interchangeable, and replaceable relative to the body portion;
the body portion having a projecting member connected thereto and projecting therefrom, the projecting member being adapted to receive and support the attachment element at an adjustable cant relative to the body portion;
the attachment element being one or more of adjustable, removable, interchangeable, and replaceable relative to the body portion and projecting member, in that the projecting member is defined as having two or more adjustment holes and the attachment element is defined as having one or more receiving holes configured to be corresponding in an operable relationship to a selected one adjustment hole of the two or more adjustment holes of the projecting member to provide the adjustable cant, and
said projecting member thereby being configured to support the attachment element via an insertion member providing cooperative connectability of a receiving hole of the one or more receiving holes and an adjustment hole to secure the attachment element to the projecting member at a cant relative to the body portion.

2. The apparatus of claim 1, the attachment element being selected from a group comprising a cupholder, a portable device or mobile device attachment apparatus, a pole holder, a hook, a light, an electronic digital display, an illuminated digital advertising device, an illuminated or non-illuminated static advertising device and a tray.

3. The apparatus of claim 1, the support structure one or more of a seatback, seat stanchion, armrest, a seat support, and a freestanding structure.

4. The apparatus of claim 1, further comprising an advertising device adapted to be one or both of removably connected to or disposed on the attachment element.

5. The apparatus of claim 4, the advertising device further having one or both of an appurtenant panel and an emblem member.

6. The apparatus of claim 4, the advertisement device being readily adapted for display of advertising material including one or more of printed material, reverse printed material, or material imaged on the back side of clear advertising device, adhesive material, stickers, an electronic or electromagnetic presentation, an LED, LCD or plasma presentation, e-paper display, an electronic digital display, or removal material or materially integrally formed thereon, or as a part thereof.

7. The apparatus of claim 1, the body portion being flat or angled.

8. The apparatus of claim 7, the body portion further comprising a technology storage cavity.

9. The apparatus of claim 1, further comprising resiliently deformable securing tabs that project one or both horizontally or vertically from the mounting bracket and further secure the attachment element to the body portion.

10. The apparatus of claim 1, the body portion and the attachment element being each made of one or the other of a moldable material and a die-cut material.

11. An adjustable mounting bracket comprising:
a body portion having a front side, a back side, and at least one mounting hole defined therein, the body portion being adapted to be connected or disposed on a support structure via the at least one mounting hole;
an attachment element which is one or more of adjustable, removable, interchangeable, and replaceable relative to the body portion;
the attachment element having one or more projecting members connected thereto and projecting therefrom, the projecting member being adapted to connect to and receive support from the body portion, the projecting member having two or more adjustment holes and the body portion having one or more receiving holes configured to be corresponding to one of the two or more adjustment holes of the projecting member, and
said projecting member thereby being configured to provide support to the attachment element via an insertion member providing cooperative connectability of the adjustment holes of the projecting member of the attachment element with a receiving hole of the body portion to secure the attachment at a cant relative to the body portion.

12. The apparatus of claim 11, the attachment member being selected from a group comprising a cupholder, a portable device or mobile device attachment apparatus, a pole holder, a hook, a light, an electronic digital display, an illuminated digital advertising device, an illuminated or non-illuminated static advertising device and a tray.

13. The apparatus of claim 11, the support structure being one or more of a seatback, seat stanchion, armrest, a seat support, and a freestanding structure.

14. The apparatus of claim 11, further comprising an advertising device adapted to be one or both of removably connected to or disposed on the attachment element.

15. The apparatus of claim 14, the advertising device including one or both of an appurtenant panel and an emblem member.

16. The apparatus of claim 14, the advertisement device being readily adapted for display of advertising material including one or more of printed material, reverse printed material, or material imaged on the back side of clear advertising device, adhesive material, stickers, an electronic or electromagnetic presentation, an LED, LCD or plasma presentation, e-paper display, an electronic digital display, or removal material or materially integrally formed thereon, or as a part thereof.

17. The apparatus of claim 11, the back side of the body portion being flat or angled.

18. The apparatus of claim 17, the body portion further comprising a technology storage cavity.

19. The apparatus of claim 11, further comprising resiliently deformable securing tabs that project one or both horizontally or vertically from the mounting bracket and further secure the attachment to the body portion.

20. The apparatus of claim 11, the body portion and the attachment each being made of one or the other of a moldable material and a die-cut material.

* * * * *